United States Patent
Ogawa

(10) Patent No.: US 10,719,758 B2
(45) Date of Patent: Jul. 21, 2020

(54) INTERACTION APPARATUS, INTERACTION METHOD, NON-TRANSITORY RECORDING MEDIUM, AND ROBOT

(71) Applicant: Panasonic Intellectual Property Management Co., Ltd., Osaka (JP)

(72) Inventor: Kento Ogawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 272 days.

(21) Appl. No.: 15/944,849

(22) Filed: Apr. 4, 2018

(65) Prior Publication Data

US 2018/0307965 A1    Oct. 25, 2018

(30) Foreign Application Priority Data

Apr. 19, 2017    (JP) .................... 2017-082734

(51) Int. Cl.
*B25J 9/16*     (2006.01)
*G05D 1/02*     (2020.01)
(Continued)

(52) U.S. Cl.
CPC ............ *G06N 3/008* (2013.01); *B25J 9/1679* (2013.01); *G05B 19/042* (2013.01); *G05D 1/0016* (2013.01); *G05D 1/0227* (2013.01); *G05D 1/0246* (2013.01); *G05D 1/0255* (2013.01); *G05D 1/0268* (2013.01);
(Continued)

(58) Field of Classification Search
CPC ... B25J 9/1679; B25J 11/0005; G05B 19/042; G05B 2219/2666; G05B 2219/40411; G05D 1/0016; G05D 1/0227; G05D 1/0246; G05D 1/0255; G05D 1/0268;
(Continued)

(56) References Cited

U.S. PATENT DOCUMENTS

2002/0081937 A1    6/2002    Yamada et al.
2017/0296935 A1    10/2017   Motomura
(Continued)

FOREIGN PATENT DOCUMENTS

JP    2002-307354    10/2002
JP    2016-067834    5/2016

*Primary Examiner* — Robert T Nguyen
(74) *Attorney, Agent, or Firm* — Greenblum & Bernstein, P.L.C.

(57) ABSTRACT

If an interaction target includes a child and adult, if a remaining power amount is less than or equal to a first threshold, and if an interaction amount is greater than or equal to a second threshold, a robot asks the adult if the adult allows the robot to move to a charger. If the target includes the child and adult, if the remaining power amount is less than or equal to the first threshold, and if the interaction amount is less than the second threshold, the robot asks the child if the child allows the robot to move to the charger. If the target includes only the child, if the remaining power amount is less than or equal to the first threshold, and if the interaction amount is greater than or equal to the second threshold, the robot moves to the charger. If the target includes only the child, if the remaining power amount is greater than the first threshold, and if the interaction amount is greater than or equal to the second threshold, the robot stops interacting with the child.

22 Claims, 27 Drawing Sheets

(51) Int. Cl.
*G06N 3/00* (2006.01)
*G05D 1/00* (2006.01)
*G05B 19/042* (2006.01)
*H02J 7/00* (2006.01)

(52) U.S. Cl.
CPC ......... *G05B 2219/2666* (2013.01); *G05B 2219/40411* (2013.01); *H02J 7/00* (2013.01); *Y10S 901/01* (2013.01); *Y10S 901/46* (2013.01); *Y10S 901/47* (2013.01)

(58) Field of Classification Search
CPC .......... G06N 3/008; H02J 7/00; Y10S 901/01; Y10S 901/46; Y10S 901/47
See application file for complete search history.

(56) References Cited

U.S. PATENT DOCUMENTS

| | | | | |
|---|---|---|---|---|
| 2018/0304470 | A1* | 10/2018 | Ogawa | G05B 19/042 |
| 2018/0307966 | A1* | 10/2018 | Ogawa | B25J 9/1679 |
| 2019/0300185 | A1* | 10/2019 | Tang | G08G 5/00 |
| 2020/0042018 | A1* | 2/2020 | Chiba | G05D 1/0274 |

\* cited by examiner

INTERACTION APPARATUS, INTERACTION METHOD, NON-TRANSITORY RECORDING MEDIUM, AND ROBOT

BACKGROUND

1. Technical Field

The present disclosure relates to an interaction apparatus, an interaction method, a non-transitory recording medium, and a robot that are for interacting a human to communicate with the human.

2. Description of the Related Art

Hitherto, methods for controlling actions of various types of robots have been proposed.

For example, Japanese Unexamined Patent Application Publication No. 2002-307354 discloses a robot control method for controlling a robot so that the robot reacts to external information. According to Japanese Unexamined Patent Application Publication No. 2002-307354, the robot includes an action mechanism that implements mechanical motions, an input unit that obtains external information, a determining unit that determines whether a target is present around the robot, and a control unit that selects, based on a determination result, a control parameter for controlling the action mechanism in accordance with the external information from among a plurality of control parameters, and that controls an action of the action mechanism (for example, paragraph [0010]). For example, according to Japanese Unexamined Patent Application Publication No. 2002-307354, the robot takes a predetermined action, such as a getting-up action or a seeing-off action, based on information obtained from the outside, such as a current time, when a user is present (for example, paragraphs [0161] to [0167]).

For example, Japanese Unexamined Patent Application Publication No. 2016-67834 discloses a robot control method for notifying a user of the occurrence of a notification event in a notification posture suitable for enabling the user to recognize the occurrence. According to Japanese Unexamined Patent Application Publication No. 2016-67834, the robot includes a shift-to-notification-posture determining unit that determines whether or not a posture of the robot can be shifted to a notification posture suitable for enabling the user to recognize the occurrence of a notification event, which is an event that the user needs to cope with in response to a notification from the robot, and a notification method determining unit that determines, based on a determination result obtained by the shift-to-notification-posture determining unit, a notification method for notifying the user of the notification event (for example, paragraph [0005]). For example, according to Japanese Unexamined Patent Application Publication No. 2016-67834, the robot notifies the user of the occurrence of a notification event only by using screen display or sound output without shifting to a notification posture if there is an obstacle around the robot (for example, paragraphs [0035] and [0036]).

SUMMARY

In the above-described related art, further improvements are required.

In one general aspect, the techniques disclosed here feature an apparatus that interacts with a human to communicate with the human. The apparatus includes a camera that obtains an image of a target around the apparatus; a microphone that obtains a sound around the apparatus; a sensor that detects a touching of the apparatus; a power source that is charged with power by an external charger and supplies the power to the apparatus; and a processor. The processor determines, based on either the image that has been obtained by the camera or the sound that has been obtained by the microphone, whether the target that the apparatus is interacting with includes a child and an adult, or only the child. The processor detects, based on any one of the image that has been obtained by the camera, the sound that has been obtained by the microphone, and the touching detected by the sensor, an amount of interaction between the apparatus and the target. The processor detects a remaining amount of power of the power source. If the target includes the child and the adult, if the remaining amount of power is smaller than or equal to a first threshold, and if the amount of interaction is larger than or equal to a second threshold, the processor causes the apparatus to execute a first process for asking the adult if the adult allows the apparatus to move to the charger. If the target includes the child and the adult, if the remaining amount of power is smaller than or equal to the first threshold, and if the amount of interaction is smaller than the second threshold, the processor causes the apparatus to execute a second process for asking the child if the child allows the apparatus to move to the charger. If the target includes the child and the adult, if the remaining amount of power is larger than the first threshold, and if the amount of interaction is larger than or equal to the second threshold, the processor causes the apparatus to execute a third process for asking the adult if the adult allows the apparatus to continue interacting with the child. If the target includes the child and the adult, if the remaining amount of power is larger than the first threshold, and if the amount of interaction is smaller than the second threshold, the processor causes the apparatus to execute a fourth process for requesting to the adult that the adult and the child continue interacting with the apparatus. If the target includes only the child, if the remaining amount of power is smaller than or equal to the first threshold, and if the amount of interaction is larger than or equal to the second threshold, the processor causes the apparatus to execute a fifth process for moving to the charger. If the target includes only the child, if the remaining amount of power is smaller than or equal to the first threshold, and if the amount of interaction is smaller than the second threshold, the processor causes the apparatus to execute a sixth process for requesting the child to move the apparatus to the charger. If the target includes only the child, if the remaining amount of power is larger than the first threshold, and if the amount of interaction is larger than or equal to the second threshold, the processor causes the apparatus to execute a seventh process for stopping interacting with the child. If the target includes only the child, if the remaining amount of power is larger than the first threshold, and if the amount of interaction is smaller than the second threshold, the processor causes the apparatus to execute an eighth process for leading the child to continue interacting with the apparatus.

According to the foregoing aspect, further improvements can be achieved.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features

DETAILED DESCRIPTION

Figure 1:
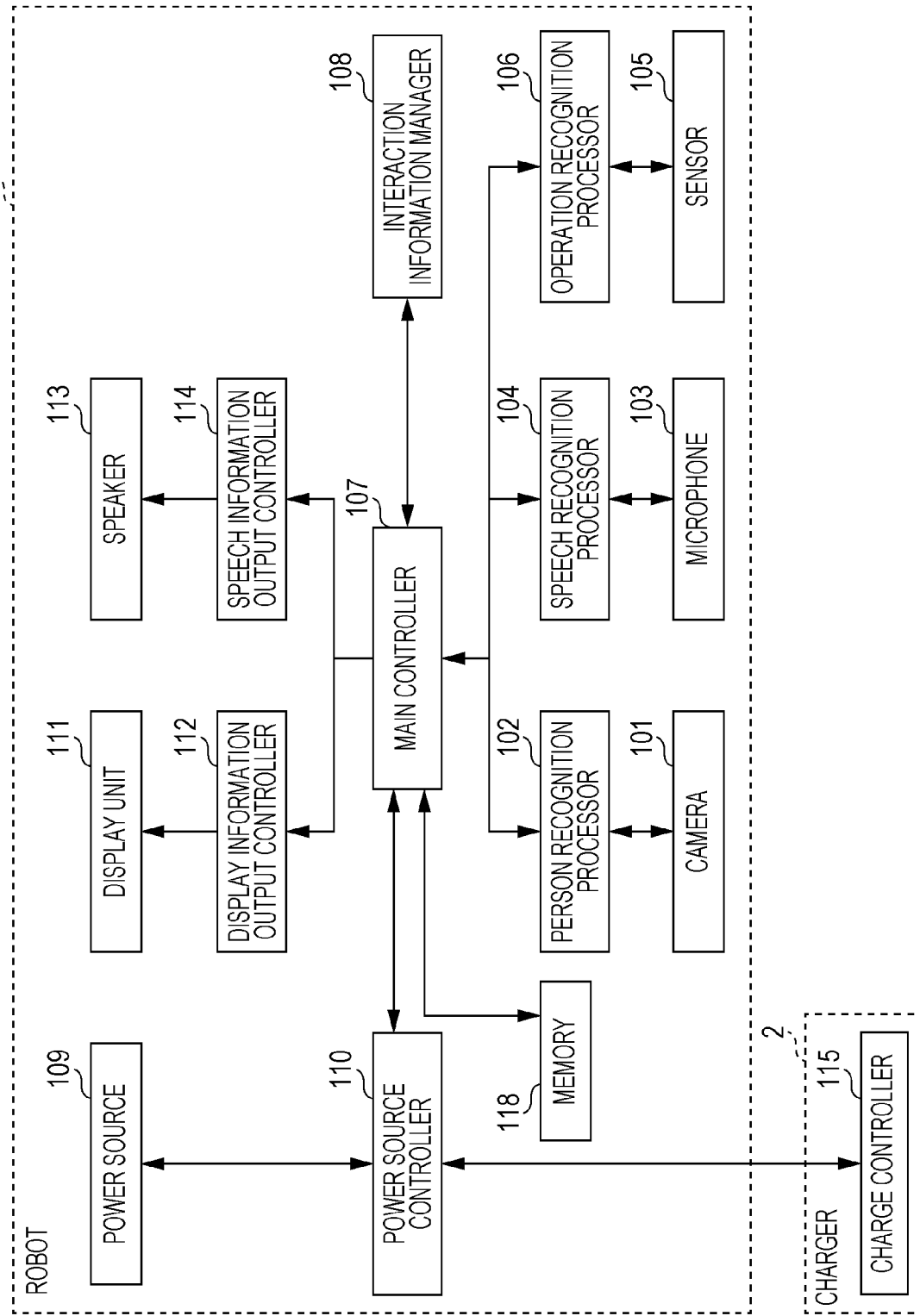
FIG. 1 is a block diagram illustrating the configurations of a robot and a charger according to a first embodiment of the present disclosure.

Underlying Knowledge Forming Basis of Aspect of the Present Disclosure

First, a description will be given of a viewpoint from which an aspect of the present disclosure has been conceived of. Japanese Unexamined Patent Application Publications No. 2002-307354 and No. 2016-67834 relate to an action control method for a robot that interacts with a user.

In Japanese Unexamined Patent Application Publication No. 2002-307354, when a user is present, a robot takes a predetermined action, such as a getting-up action or a seeing-off action, based on information obtained from the outside, such as a current time, as described above.

In Japanese Unexamined Patent Application Publication No. 2016-67834, when an obstacle is present around a robot, the robot notifies a user of the occurrence of a notification event only by using screen display or sound output without shifting to a notification posture, as described above.

However, in Japanese Unexamined Patent Application Publication No. 2002-307354, the robot controls an action of an action mechanism in accordance with a determination result indicating whether or not a user is present, and does not control the action of the action mechanism in accordance with a relationship with the user (for example, an attribute of the user or a history of actions with the user).

Likewise, in Japanese Unexamined Patent Application Publication No. 2016-67834, the robot determines whether or not to shift to the notification posture in accordance with whether or not an obstacle is present around the robot, and does not control an action in accordance with a relationship with the user (for example, an attribute of the user or a history of actions with the user).

Therefore, in Japanese Unexamined Patent Application Publications No. 2002-307354 and No. 2016-67834, it is not possible to control an action in accordance with a relationship between the robot and the user, for example, it is not possible to prevent the robot from playing too much with a child while promoting play with the child and reflecting the intention of a parent. With these considerations, the inventors have conceived of an aspect of the present disclosure described below.

An apparatus according to an aspect of the present disclosure is an apparatus that interacts with a human to communicate with the human. The apparatus includes a camera that obtains an image of a target around the apparatus; a microphone that obtains a sound around the apparatus; a sensor that detects a touching of the apparatus; a power source that is charged with power by an external charger and supplies the power to the apparatus; and a processor. The processor determines, based on either the image that has been obtained by the camera or the sound that has been obtained by the microphone, whether the target that the apparatus is interacting with includes a child and an adult, or only the child. The processor detects, based on any one of the image that has been obtained by the camera, the sound that has been obtained by the microphone, and the touching detected by the sensor, an amount of interaction between the apparatus and the target. The processor detects a remaining amount of power of the power source. If the target includes the child and the adult, if the remaining amount of power is smaller than or equal to a first threshold, and if the amount of interaction is larger than or equal to a second threshold, the processor causes the apparatus to execute a first process for asking the adult if the adult allows the apparatus to move to the charger. If the target includes the child and the adult, if the remaining amount of power is smaller than or equal to the first threshold, and if the amount of interaction is smaller than the second threshold, the processor causes the apparatus to execute a second process for asking the child if the child allows the apparatus to move to the charger. If the target includes the child and the adult, if the remaining amount of power is larger than the first threshold, and if the amount of interaction is larger than or equal to the second threshold, the processor causes the apparatus to execute a third process for asking the adult if the adult allows the apparatus to continue interacting with the child. If the target includes the child and the adult, if the remaining amount of power is larger than the first threshold, and if the amount of interaction is smaller than the second threshold, the processor causes the apparatus to execute a fourth process for requesting to the adult that the adult and the child continue interacting with the apparatus. If the target includes only the child, if the remaining amount of power is smaller than or equal to the first threshold, and if the amount of interaction is larger than or equal to the second threshold, the processor causes the apparatus to execute a fifth process for moving to the charger. If the target includes only the child, if the remaining amount of power is smaller than or equal to the first threshold, and if the amount of interaction is smaller than the second threshold, the processor causes the apparatus to execute a sixth process for requesting the child to move the apparatus to the charger. If the target includes only the child, if the remaining amount of power is larger than the first threshold, and if the amount of interaction is larger than or equal to the second threshold, the processor causes the apparatus to execute a seventh process for stopping interacting with the child. If the target includes only the child, if the remaining amount of power is larger than the first threshold, and if the amount of interaction is smaller than the second threshold, the processor causes the apparatus to execute an eighth process for leading the child to continue interacting with the apparatus.

According to this aspect, an action of the apparatus can be controlled based on a relationship between the apparatus and an interaction partner, and the interaction between the apparatus and the target that the apparatus is interacting with can be promoted or suppressed based on an amount of interaction between the apparatus and the target.

Hereinafter, a description will be given of embodiments of the present disclosure with reference to the attached drawings. In the drawings, the same elements are denoted by the same reference numerals. Each of the following embodiments is a specific example of the present disclosure. The values, shapes, elements, steps, order of steps, and so forth in the following embodiments are merely examples and do not limit the present disclosure. Among the elements in the following embodiments, an element that is not described in an independent claim reciting the broadest concept will be described as an optional element. In all the embodiments, any selective configurations may be combined.

First Embodiment

First, a description will be given of the details of the internal configuration of a robot 1 according to a first embodiment of the present disclosure with reference to FIG. 1. FIG. 1 is a block diagram illustrating the configurations of the robot 1 and a charger 2 according to the first embodiment of the present disclosure.

As illustrated in FIG. 1, the robot 1 includes a camera 101, a person recognition processor 102, a microphone 103, a speech recognition processor 104, a sensor 105, an operation recognition processor 106, a main controller 107, an interaction information manager 108, a power source 109, a power source controller 110, a display unit 111, a display information output controller 112, a speaker 113, a speech information output controller 114, and a memory 118. The charger 2 includes a charge controller 115.

The camera 101 obtains an image of an environment around the robot 1. The microphone 103 obtains a sound in the environment around the robot 1. The sensor 105 may be, for example, any one of a pressure sensitive sensor, an illuminance sensor, a gyro sensor, an acceleration sensor, a geomagnetic sensor, a proximity sensor, a fingerprint authentication sensor, and a vein authentication sensor. The sensor 105 obtains operation information about an operation performed on the robot 1 by a user. The sensor 105 detects a human touching the robot 1.

The person recognition processor 102 recognizes, based on an image obtained by the camera 101, whether or not a user is present, the position of the user, the size of the user, the type of facial expression of the user (for example, a facial expression expressing a positive reaction, such as a "smiling face" or "surprised face", or a facial expression expressing a negative reaction, such as a "sad face" or "displeased face"), and attribute information of the user (for example, a person ID for identifying the person and the age of the person), and manages a person recognition result.

The speech recognition processor 104 recognizes, based on a sound obtained by the microphone 103, whether or not there is speech of a user, the type of speech (for example, speech expressing a positive reaction, such as "like" or "let's play more", or speech expressing a negative reaction, such as "dislike" or "go away"), and attribute information of the user (for example, a person ID and age), and manages a speech recognition result.

The operation recognition processor 106 recognizes, based on operation information obtained by the sensor 105, an operation time of a user, the number of operations, the type of operation (for example, an operation expressing a positive reaction, such as "touch" or "stroke", or an operation expressing a negative reaction, such as "hit" or "flick"), and attribute information of the user (for example, a person ID and age), and manages an operation recognition result.

The interaction information manager 108 receives, from the main controller 107, interaction partner information representing an interaction partner of the robot 1 (for example, information indicating that the interaction partner includes a parent 11 (adult) and a child 12, or only the child 12) and interaction information representing the interaction with the interaction partner, and manages the received pieces of information. Here, "interaction" includes user's actions of being near the robot 1, looking at the robot 1, talking with the robot 1, touching the robot 1, and remote-controlling the robot 1 by operating a remote control or using a gesture or a sound of hands clapping.

The interaction information includes an element of amount and an element of quality of interaction. The element of amount in the interaction information is, for example, information representing the duration of interaction or the number of interactions between the robot 1 and the user. The element of quality in the interaction information is information representing the type of facial expression of the user (for example, a facial expression expressing a positive reaction, such as a "smiling face" or "surprised face", or a facial expression expressing a negative reaction, such as a "sad face" or "displeased face"), the type of speech (for example, speech expressing a positive reaction, such as "like" or "let's play more", or speech expressing a negative reaction, such as "dislike" or "go away"), or the type of operation (for example, an operation expressing a positive reaction, such as "touch" or "stroke", or an operation expressing a negative reaction, such as "hit" or "flick") in the interaction between the robot 1 and the user.

The robot 1 is charged by the charger 2. The power source 109 manages the power that is stored under control of the power source controller 110 of the robot 1 and the charge controller 115 of the charger 2. The power source 109 is charged with power by the charger 2, which is an external device, and supplies the power to the robot 1.

The power source controller 110 manages a charging flag, which indicates whether or not charging is in progress in the robot 1, and a remaining amount of power. The power source controller 110 outputs the charging flag and information representing the remaining amount of power to the main controller 107. Furthermore, the power source controller 110 stores power in the power source 109 of the robot 1 together with the charge controller 115 of the charger 2 when the robot 1 is connected to the charger 2.

The display unit 111 is constituted by, for example, a plurality of light-emitting diodes, and displays display information representing a facial expression of the robot 1. Specifically, the display unit 111 individually controls the illumination of the plurality of light-emitting diodes, thereby displaying part of the face of the robot 1, for example, the eyes and the mouth.

The display information output controller 112 outputs, to the display unit 111, display information representing a facial expression of the robot 1 in accordance with an action control command received from the main controller 107. Accordingly, the display unit 111 outputs the display information representing the facial expression of the robot 1.

The speech information output controller 114 outputs, to the speaker 113, speech information of the robot 1 in accordance with an action control command received from the main controller 107. Accordingly, the speaker 113 outputs the speech information of the robot 1.

The main controller 107 obtains a person recognition result about a user from the person recognition processor

102. The main controller 107 obtains a speech recognition result about the user from the speech recognition processor 104. The main controller 107 obtains an operation recognition result about the user from the operation recognition processor 106.

Based on the person recognition result, the speech recognition result, and the operation recognition result that have been obtained, the main controller 107 outputs interaction partner information of the robot 1 and interaction information representing the interaction with the interaction partner to the interaction information manager 108. Also, the main controller 107 obtains the interaction partner information and the interaction information from the interaction information manager 108 at the time of an action control process, which will be described below.

The main controller 107 obtains a charging flag indicating the power state of the power source 109 from the power source controller 110.

The main controller 107 generates, based on the information obtained from the interaction information manager 108 and the power source controller 110, various action control commands, and transmits the various action control commands to the display information output controller 112 and the speech information output controller 114. The details of the action control process for generating an action control command will be described below.

The main controller 107 periodically monitors the amount of interaction between the robot 1 and the child 12, which is managed by the interaction information manager 108. When the amount of interaction between the robot 1 and the child 12 is 0, the main controller 107 performs the action control process described below. Here, the amount of interaction being 0 means, for example, if the amount of interaction is the duration of interaction between the robot 1 and the child 12, that the duration of interaction is 0 seconds. If the amount of interaction is the number of interactions between the robot 1 and the child 12, the amount of interaction being 0 means that the number of interactions is 0. If the amount of interaction is the amount of positive expressions or negative expressions in the facial expression, speech, or operation of the child 12 in the interaction between the robot 1 and the child 12, the amount of interaction being 0 means that the amount of positive expressions or negative expressions in the facial expression, speech, or operation is 0.

The memory 118 stores a dictionary that includes positive expressions for the robot 1. The memory 118 also stores a program for causing the robot 1 to implement content with which the robot 1 plays with the child 12. The memory 118 further stores a program for causing the robot 1 to talk with the child 12 on a predetermined topic. The memory 118 further stores a program for causing the robot 1 to implement content with which the robot 1 plays with the child 12 and the parent 11.

Figure 2:
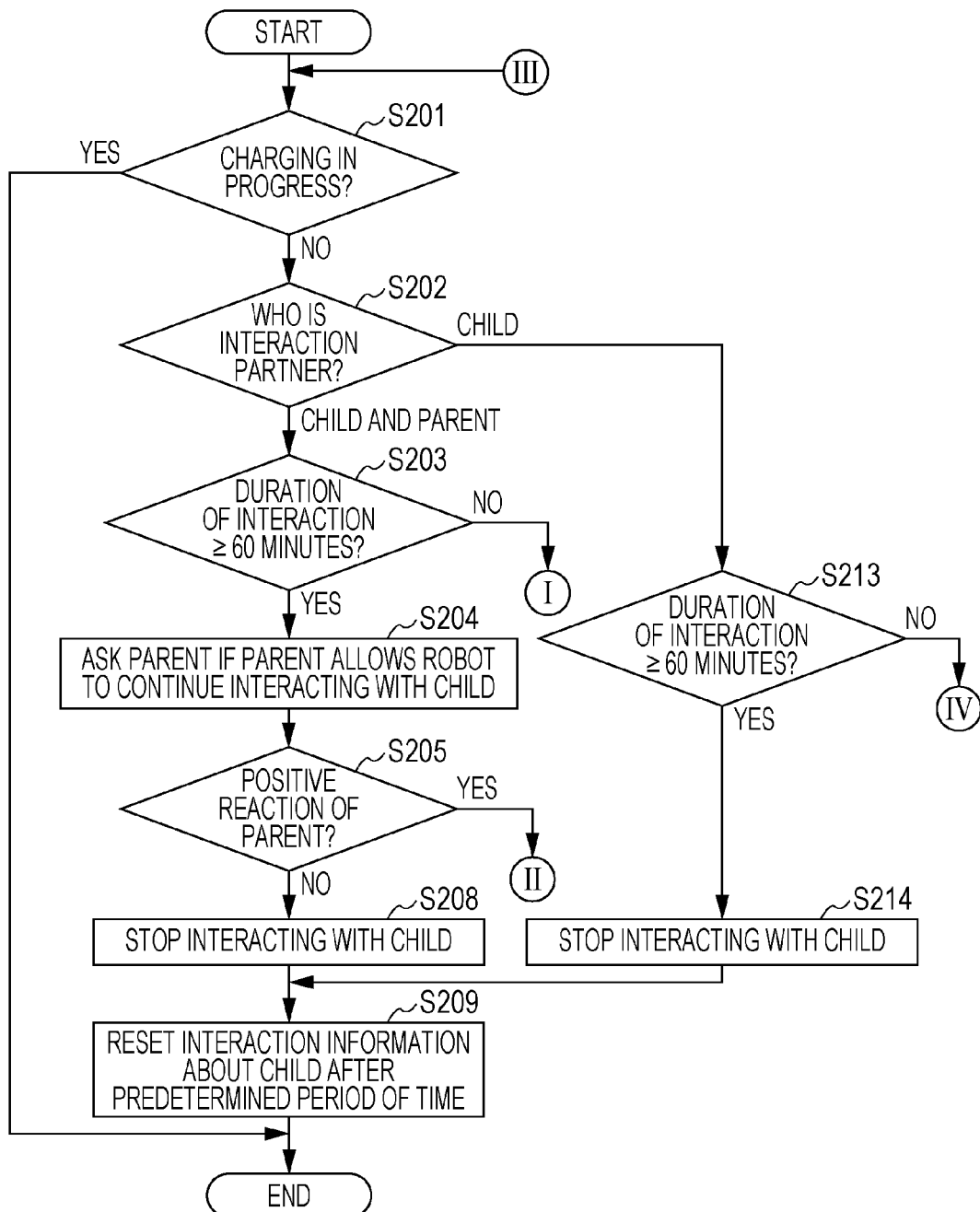
FIG. 2 is a first flowchart illustrating a first action control process in the robot according to the first embodiment of the present disclosure.
Figure 3:
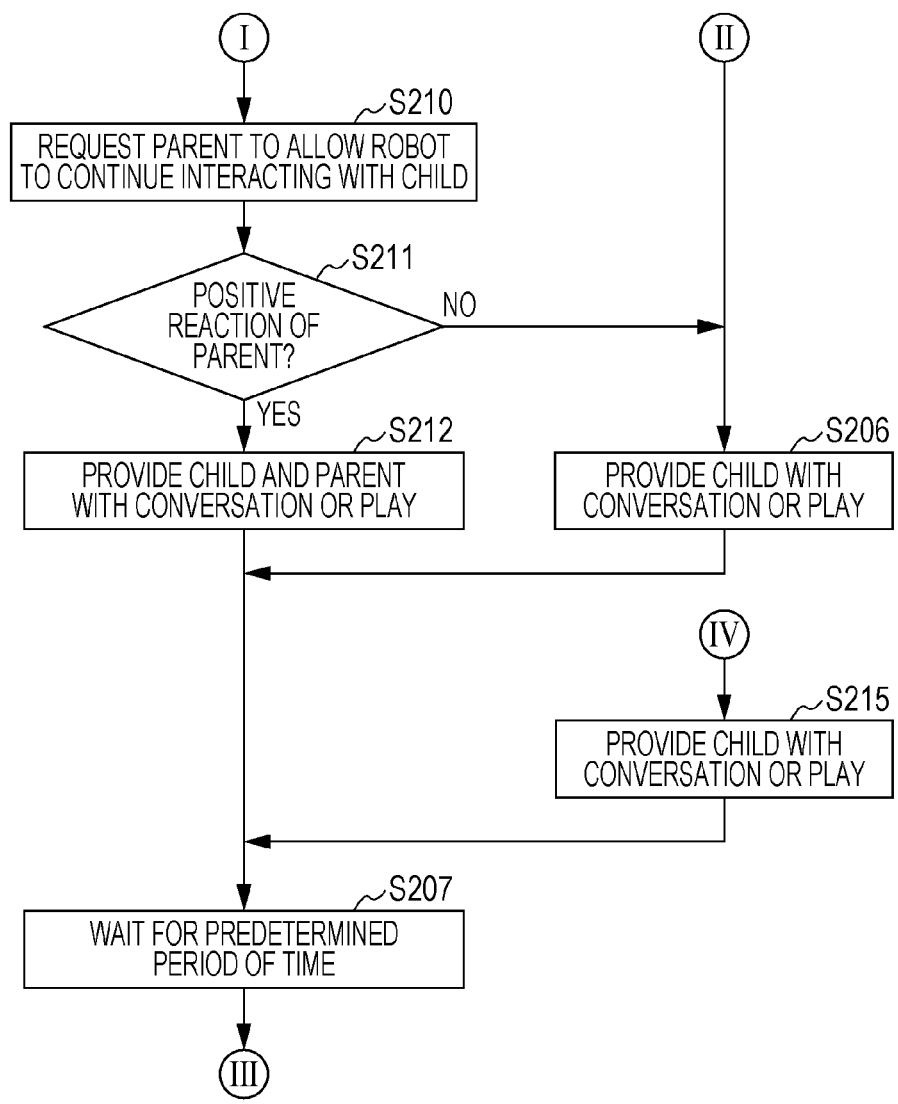
FIG. 3 is a second flowchart illustrating the first action control process in the robot according to the first embodiment of the present disclosure.

Next, a description will be given of a first action control process in the robot 1 according to the first embodiment of the present disclosure with reference to FIGS. 2 and 3. FIG. 2 is a first flowchart illustrating the first action control process in the robot 1 according to the first embodiment of the present disclosure, and FIG. 3 is a second flowchart illustrating the first action control process in the robot 1 according to the first embodiment of the present disclosure.

First, the main controller 107 determines, based on a charging flag received from the power source controller 110, whether or not charging is in progress in the robot 1 (step S201). When charging is in progress in the robot 1, the charging flag is ON. When charging is not in progress in the robot 1, the charging flag is OFF. If the charging flag received from the power source controller 110 is ON, the main controller 107 determines that charging is in progress in the robot 1. If the charging flag received from the power source controller 110 is OFF, the main controller 107 determines that charging is not in progress in the robot 1.

If charging is in progress in the robot 1, that is, if the charging flag is ON (YES in step S201), the main controller 107 ends the action control process. In this embodiment, when charging is in progress in the robot 1, priority is given to charging control of the robot 1 and thus the action control of the robot 1 is not particularly performed, but the embodiment is not limited thereto. For example, the main controller 107 may perform an action control process similar to that in a case where charging is not in progress in the robot 1, which will be described below, in a manner that the charging control of the robot 1 is not disturbed.

If charging is not in progress in the robot 1, that is, if the charging flag is OFF (NO in step S201), the main controller 107 determines whether a user as an interaction partner includes only the child 12 or the child 12 and the parent 11 (step S202). The main controller 107 determines, based on either an obtained image or an obtained sound, whether a target that the robot 1 is interacting with includes the child 12 and the parent 11 or only the child 12.

In an embodiment of the present disclosure, an action control process is not particularly performed if there is no interaction partner or if an interaction partner includes only the parent 11. An embodiment of the present disclosure is directed to preventing the robot 1 from playing too much with the child 12 while promoting play with the child 12 and reflecting the intention of the parent 11. If there is no interaction partner or if an interaction partner includes only the parent 11 and there is not the child 12, an action control process is not particularly performed so that the power of the robot 1 is saved.

The main controller 107 may determine a person who is within a predetermined range from the robot 1 to be a target that the robot 1 is interacting with. The person who is within the predetermined range from the robot 1 can be specified by recognizing the person who is around the robot 1 by the person recognition processor 102.

The main controller 107 may determine a person who is looking at the robot 1 to be a target that the robot 1 is interacting with. The person who is looking at the robot 1 can be specified by recognizing a line of sight of the person who is around the robot 1 by the person recognition processor 102.

The main controller 107 may determine a person whom the robot 1 is talking with to be a target that the robot 1 is interacting with. The person whom the robot 1 is talking with can be specified by recognizing speech of the person who is around the robot 1 by the speech recognition processor 104.

The main controller 107 may determine a person who is touching the robot 1 to be a target that the robot 1 is interacting with. The person who is touching the robot 1 can be specified by recognizing the person who is touching the robot 1 by the operation recognition processor 106.

The main controller 107 may determine a person who generates a predetermined sound around the robot 1 to be a target that the robot 1 is interacting with. The person who generates the predetermined sound around the robot 1 can be specified by recognizing the predetermined sound generated around the robot 1 by the speech recognition processor 104. The predetermined sound (including a voice) may be stored as text data in the memory 118 in advance.

The main controller 107 may determine a person who makes a predetermined gesture around the robot 1 to be a target that the robot 1 is interacting with. The person who makes the predetermined gesture around the robot 1 can be specified by recognizing the predetermined gesture made around the robot 1 by the person recognition processor 102. The predetermined gesture may be stored in the memory 118 in advance.

Here, if it is determined that a user as an interaction partner of the robot 1 includes the child 12 and the parent 11 ("child and parent" in step S202), the main controller 107 determines, as interaction information about the robot 1 and the child 12, whether or not the duration of interaction between the robot 1 and the child 12 is longer than or equal to 60 minutes, for example (step S203). The predetermined value (threshold), which is 60 minutes, may be freely set by the parent 11 in advance or may be automatically set by the robot 1. In this embodiment, the predetermined value of the duration of interaction between the robot 1 and the child 12 is 60 minutes, but the predetermined value is not limited thereto. The main controller 107 detects, based on any one of an obtained image, an obtained sound, and a detection result obtained by the sensor 105, the amount of interaction between the robot 1 and the target that the robot 1 is interacting with. The amount of interaction includes a time over which the robot 1 continues interacting with the target. The amount of interaction may include a total time over which the robot 1 interacts with the target within a predetermined period.

In this embodiment, a time over which the robot 1 continues interacting with the child 12 is used as the amount of interaction between the robot 1 and the child 12. The amount of interaction is not limited thereto, and the amount of interaction may include the number of times the robot 1 interacts with the target within a predetermined period. For example, the number of interactions between the robot 1 and the child 12 (for example, 100) may be used as the amount of interaction. In step S203, the main controller 107 may determine whether or not the number of interactions between the robot 1 and the child 12 is 100 or more.

The amount of interaction may include the number of times the target has a predetermined facial expression within a predetermined period, a total time over which the target has a predetermined facial expression within a predetermined period, or a continuous time over which the target has a predetermined facial expression within a predetermined period. The predetermined facial expression is, for example, at least one of a smiling face and a surprised face. In addition, the amount of interaction may include the number of times the target makes a predetermined utterance within a predetermined period. The predetermined utterance is an utterance with a positive expression given to the robot 1 and included in the dictionary stored in the memory 118. Furthermore, the amount of interaction may include a time over which the robot 1 is continuously touched by the target within a predetermined period, and the size of a region at which the robot 1 is continuously touched by the target within a predetermined period.

That is, the number of positive expressions (for example, 100) in the facial expressions, speech, or operations of the child 12 during the interaction between the robot 1 and the child 12 may be used as interaction information. In step S203, the main controller 107 may determine whether or not the number of positive expressions in the facial expressions, speech, or operations of the child 12 during the interaction between the robot 1 and the child 12 is 100 or more. The positive expressions include, for example, facial expressions such as a "smiling face" and "surprised face", speech such as "like" and "let's play more", or operations such as "touch" and "stroke".

If it is determined that the duration of interaction between the robot 1 and the child 12 is longer than or equal to 60 minutes (YES in step S203), the main controller 107 asks the parent 11 if the parent 11 allows the robot 1 to continue interacting with the child 12 (step S204). If the target that the robot 1 is interacting with includes the child 12 and the parent 11 and if the amount of interaction is larger than or equal to the threshold (for example, 60 minutes), the main controller 107 causes the robot 1 to execute an asking process for asking the parent 11 if the parent 11 allows the robot 1 to continue interacting with the child 12.

Figure 4:
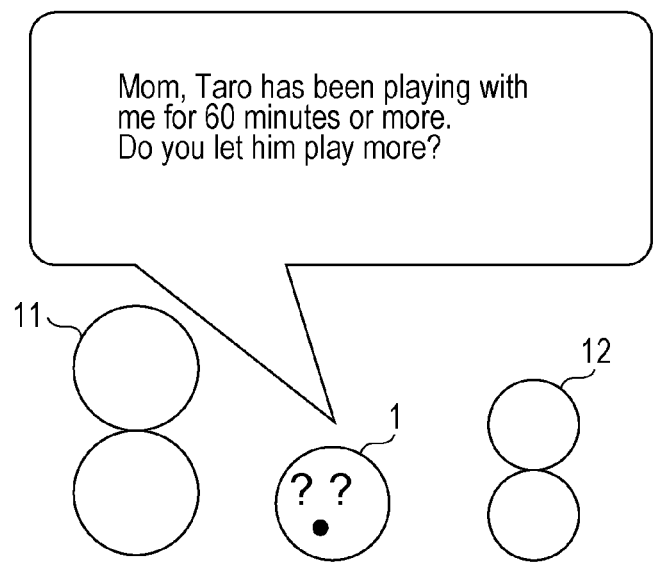
FIG. 4 is a diagram illustrating an example of speech information output from a speaker and display information displayed on a display unit at the time of asking a parent if the parent allows the robot to continue interacting with a child in step S204 in FIG. 2.

FIG. 4 is a diagram illustrating an example of speech information output from the speaker 113 and display information displayed on the display unit 111 at the time of asking the parent 11 if the parent 11 allows the robot 1 to continue interacting with the child 12 in step S204 in FIG. 2.

As illustrated in FIG. 4, the main controller 107 outputs, to the display information output controller 112, an action control command for turning on a plurality of light-emitting diodes located at the coordinates where a facial expression of asking a question can be expressed, for example. The facial expression of asking a question is, for example, a facial expression including two question marks aligned side by side with a predetermined gap therebetween (for example, "? ?"). That is, the main controller 107 displays, on the display unit 111 and in the direction of the parent 11, an indication symbolically representing an action of the robot 1 by using both eyes and a mouth. The indication represents an action in which the robot 1 is asking a question. The indication includes two question marks aligned side by side with a predetermined gap therebetween. The two question marks correspond to both eyes of the robot 1.

In addition, as illustrated in FIG. 4, the main controller 107 outputs, to the speech information output controller 114, an action control command for causing the robot 1 to output speech for asking the parent 11 if the parent 11 allows the robot 1 to continue interacting with the child 12. The speech is, for example, "Mom, Taro (the name of the child set by the child or parent in advance) has been playing with me for 60 minutes or more. Do you let him play more?" That is, the main controller 107 outputs, from the speaker 113, speech for asking the parent 11 if the parent 11 allows the robot 1 to continue interacting with the child 12.

In this case, if the duration of interaction between the robot 1 and the child 12 is longer than or equal to the threshold (for example, 60 minutes) and if the parent 11 is with the child 12, it is determined whether or not the robot 1 is allowed to promote play with the child 12 while reflecting the latest intention of the parent 11 (whether or not to allow the robot 1 to continue interacting with the child 12).

The facial expression and speech of the robot 1 described here are merely examples, and the embodiment is not limited thereto. The main controller 107 may output only an action control command for causing the robot 1 to output speech to the speech information output controller 114, and may cause the robot 1 to ask, by using only the speech output from the speaker 113, the interaction partner if the interaction partner allows the robot 1 to continue the interaction.

The main controller 107 may output only an action control command for displaying a character string representing speech in the text format to the display information output controller 112, and may cause the robot 1 to ask, by using only an input/output operation in the display unit 111, the interaction partner if the interaction partner allows the robot 1 to continue the interaction. Alternatively, the main controller 107 may cause the robot 1 to ask, by using both speech and a character string representing the speech in the text format, the interaction partner if the interaction partner allows the robot 1 to continue the interaction. That is, the main controller 107 may display, on the display unit 111, a character string corresponding to speech for asking the parent 11 if the parent 11 allows the robot 1 to continue interacting with the child 12.

Furthermore, when the robot 1 asks the parent 11 his/her intention, the main controller 107 may output, to the display information output controller 112, an action control command for displaying the facial expression of the robot 1 in the direction of the face of the parent 11, so that the parent 11 can easily determine an action of the robot 1.

Referring back to FIG. 2, subsequently, the main controller 107 determines whether or not a positive reaction is received from the parent 11 within a predetermined period of time (for example, 1 minute) in response to the action of the robot 1 of asking if the parent 11 allows the robot 1 to continue interacting with the child 12 (step S205). If there is a positive response with speech, for example, "Yes, I let him continue playing" or if there is a positive response with a gesture of shaking the head vertically, the main controller 107 determines that a positive reaction is received from the parent 11.

In this way, the main controller 107 causes the robot 1 to execute an asking process for asking if the parent 11 allows the robot 1 to continue interacting with the child 12, and then determines, based on an obtained sound or image, whether or not the parent 11 has a positive reaction. After causing the robot 1 to execute the asking process, the main controller 107 determines whether an obtained sound includes an utterance of the parent 11 including a positive word, whether an obtained sound includes an utterance of the parent 11 including a negative word, or whether an obtained sound includes no utterance of the parent 11. If the main controller 107 determines that an obtained sound includes an utterance of the parent 11 including a positive word, the main controller 107 determines that the parent 11 has a positive reaction. In addition, after causing the robot 1 to execute the asking process, the main controller 107 determines, based on an obtained image, whether the parent 11 is shaking the head vertically, whether the parent 11 is shaking the head horizontally, or whether the parent 11 has no reaction. If the main controller 107 determines that the parent 11 is shaking the head vertically, the main controller 107 determines that the parent 11 has a positive reaction.

If it is determined that a positive reaction is received from the parent 11 in response to the action of the robot 1 of asking if the parent 11 allows the robot 1 to continue interacting with the child 12 (YES in step S205), the main controller 107 outputs an action control command for providing the child 12 with conversation or play to the display information output controller 112 and the speech information output controller 114 (step S206). If there is a positive response with speech "Yes, I let him continue playing" or if there is a positive response with a gesture of shaking the head vertically, for example, the main controller 107 determines that a positive reaction is received.

After causing the robot 1 to execute the asking process, the main controller 107 determines, based on an obtained sound or image, whether or not the parent 11 has a positive reaction. If the main controller 107 determines that the parent 11 has a positive reaction, the main controller 107 causes the robot 1 to execute a lead-child-to-interact process for leading the child 12 to continue interacting with the robot 1.

The lead-child-to-interact process may include executing a program that is stored in the memory 118 and that corresponds to content with which the robot 1 plays with the child 12, thereby outputting speech corresponding to the content from the speaker 113. The content includes any one of Shiritori (Japanese word game), quiz, rock-paper-scissors, doll play, book reading, singing, promotion of lifestyle behavior, and hide-and-seek. In addition, the lead-child-to-interact process may include executing a program that is stored in the memory 118 and that causes the robot 1 to talk with the child 12 on a predetermined topic, thereby outputting speech including the predetermined topic from the speaker 113. The predetermined topic includes any one of greeting to the child 12, current weather, self-introduction by the robot 1, a schedule of the child 12 set by the parent 11 in advance, and miscellaneous topics.

Specifically, the main controller 107 executes a program, which is installed in the memory 118, of a conversation constituted by a predetermined facial expression and speech (for example, self-introduction, greeting, checking of weather, checking of schedule, or chat targeted to the child 12) or play (for example, Shiritori, quiz, rock-paper-scissors, book reading, doll play, singing, hide-and-seek, or promotion of lifestyle behavior targeted to the child 12). In response to a reaction of the child 12, the main controller 107 outputs, to the display information output controller 112 and the speech information output controller 114, an action control command for turning on a plurality of light-emitting diodes located at the coordinates where a predetermined facial expression (for example, a smiling face, a surprised face, or a sad face) is expressed and an action control command for causing the robot 1 to output predetermined speech, respectively. The predetermined speech is, for example, "Let's talk more with me," "Taro (the name of the child set by the child or parent in advance), let's play Shiritori with me," or "I want to play more with Taro (the name of the child set by the child or parent in advance)."

Figure 5:
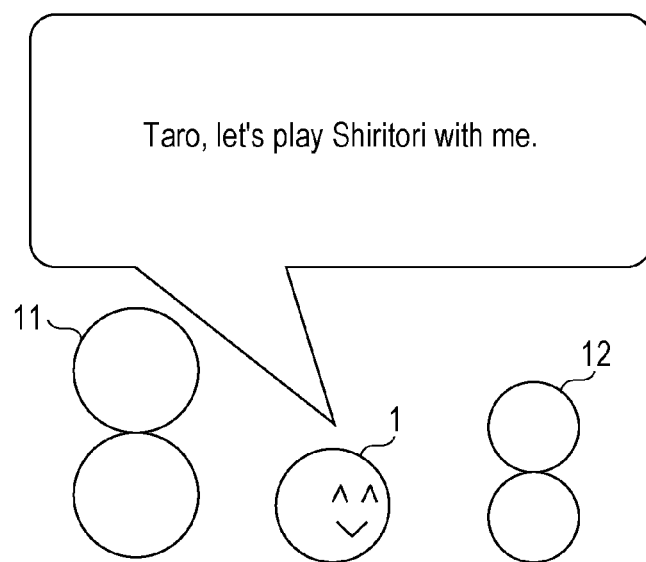
FIG. 5 is a diagram illustrating an example of speech information output from the speaker and display information displayed on the display unit at the time of providing the child with conversation or play in step S206 in FIG. 3.

FIG. 5 is a diagram illustrating an example of speech information output from the speaker 113 and display information displayed on the display unit 111 at the time of providing the child 12 with conversation or play in step S206 in FIG. 3.

As illustrated in FIG. 5, the main controller 107 executes a program that is stored in the memory 118 and corresponds to content with which the robot 1 plays Shiritori with the child 12, thereby outputting an action control command for causing the robot 1 to output speech corresponding to Shiritori. The speech is, for example, "Taro, let's play Shiritori with me."

In this case, if the duration of interaction between the robot 1 and the child 12 is longer than or equal to the threshold (for example, 60 minutes) and if the parent 11 is with the child 12, the robot 1 promotes interaction with the child 12 while reflecting the latest intention of the parent 11 (whether or not to allow the robot 1 to continue interacting with the child 12).

The facial expression and speech of the robot 1 described here are merely examples, and the embodiment is not limited thereto. The main controller 107 may output only an action control command for causing the robot 1 to output speech to the speech information output controller 114, and may cause the robot 1 to provide the interaction partner with conversation or play by using only the speech output from the speaker 113. That is, the lead-child-to-interact process may include outputting, from the speaker 113, speech for leading the child 12 to continue interacting with the robot 1.

The main controller 107 may output only an action control command for displaying a character string representing speech in the text format to the display information output controller 112, and may cause the robot 1 to provide the interaction partner with conversation or play by using only an input/output operation in the display unit 111. Alternatively, the main controller 107 may cause the robot 1 to provide the interaction partner with conversation or play by using both speech and a character string representing the speech in the text format. That is, the lead-child-to-interact process may include displaying a character string corresponding to speech on the display unit 111.

Furthermore, when the robot 1 provides the child 12 with conversation or play, the main controller 107 may output, to the display information output controller 112, an action control command for displaying the facial expression of the robot 1 in the direction of the face of the child 12, so that the child 12 can easily determine an action of the robot 1.

Referring back to FIG. 3, subsequently, the main controller 107 waits for a predetermined period of time (for example, 5 minutes) (step S207). After that, the process returns to step S201, where the main controller 107 determines again, based on the charging flag received from the power source controller 110, whether or not charging is in progress in the robot 1. The predetermined period of time, which is 5 minutes, may be freely set by the parent 11 in advance or may be automatically set by the robot 1. Here, a description has been given of the case where the predetermined period of time is 5 minutes, but the embodiment is not limited thereto.

On the other hand, if it is determined that a positive reaction is not received from the parent 11 in response to the action of the robot 1 of asking if the parent 11 allows the robot 1 to continue interacting with the child 12 (NO in step S205), the main controller 107 outputs an action control command for causing the robot 1 to stop interacting with the child 12 to the display information output controller 112 and the speech information output controller 114 (step S208). If there is a negative response with speech "No, I don't let him continue playing", if there is no response, or if there is a negative response with a gesture of shaking the head horizontally, for example, the main controller 107 determines that a positive reaction is not received from the parent 11.

That is, the main controller 107 causes the robot 1 to execute the process of asking if the parent 11 allows the robot 1 to continue interacting with the child 12, and then determines, based on an obtained sound or image, whether or not the parent 11 has a positive reaction. If the main controller 107 determines that the parent 11 has a negative reaction, the main controller 107 causes the robot 1 to execute an interaction stop process for stopping interacting with the child 12. If the main controller 107 determines that the obtained sound includes an utterance of the parent 11 including a negative word or that the obtained sound does not include an utterance of the parent 11, the main controller 107 may determine that the parent 11 has a negative reaction. If the main controller 107 determines that the parent 11 is shaking the head horizontally or that the parent 11 has no reaction, the main controller 107 may determine that the parent 11 has a negative reaction.

The interaction stop process may include displaying, on the display unit 111 and in the direction of the child 12, an indication symbolically representing the state of the robot 1 by using both eyes and a mouth. The indication represents a state in which the robot 1 is sleeping. The indication includes two minus signs aligned side by side with a predetermined gap therebetween, and the two minus signs correspond to both eyes of the apparatus. In addition, the interaction stop process may include outputting a sound effect representing a snoring noise from the speaker 113. In addition, the interaction stop process may include outputting speech for notifying the child 12 that the robot 1 will fall asleep soon from the speaker 113.

Furthermore, the interaction stop process may include displaying, on the display unit 111, an indication symbolically representing a facial expression or action of the robot 1 by using both eyes and a mouth. The indication represents an action in which the robot 1 keeps both eyes closed.

Specifically, the main controller 107 outputs, to the display information output controller 112, an action control command for turning on a plurality of light-emitting diodes located at the coordinates where a facial expression with the eyes closed can be expressed, for example. The facial expression with the eyes closed is, for example, an indication represented by two minus signs aligned side by side with a predetermined gap therebetween (for example, "- -"). In addition, the main controller 107 outputs, to the speech information output controller 114, an action control command for causing the robot 1 to output speech for notifying that the robot 1 will fall asleep or representing a state in which the robot 1 is sleeping, for example, "I'm getting sleepy" or "Zzz" (snoring noise).

Figure 6:
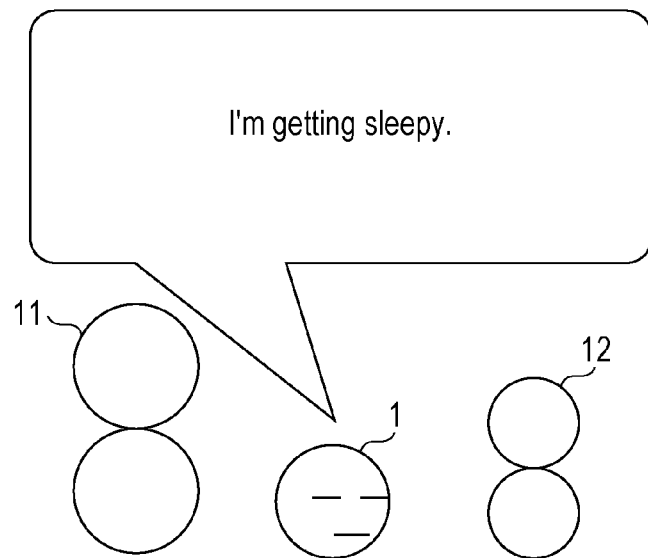
FIG. 6 is a diagram illustrating an example of speech information output from the speaker and display information displayed on the display unit at the time of stopping the interaction with the child in step S208 in FIG. 2.

FIG. 6 is a diagram illustrating an example of speech information output from the speaker 113 and display information displayed on the display unit 111 at the time of stopping the interaction with the child 12 in step S208 in FIG. 2.

As illustrated in FIG. 6, the main controller 107 stops the interaction between the robot 1 and the child 12. At this time, the main controller 107 displays, in the direction of the child 12, an indication symbolically representing the state of the robot 1 by using both eyes and a mouth. The indication includes two minus signs aligned side by side with a predetermined gap therebetween and represents a state in which the robot 1 is sleeping. In addition, the main controller 107 outputs, from the speaker 113, speech for notifying the child 12 that the robot 1 will fall asleep. The speech is, for example, "I'm getting sleepy."

In this case, the duration of interaction between the robot 1 and the child 12 is longer than or equal to the threshold (for example, 60 minutes), and the parent 11 does not have an intention to allow the robot 1 to continue interacting with the child 12. Thus, the robot 1 suppresses the interaction with the child 12.

The facial expression and speech of the robot 1 described here are merely examples, and the embodiment is not limited thereto. The main controller 107 may output only an action control command for causing the robot 1 to output speech to the speech information output controller 114, and may cause the robot 1 to notify, by using only the speech output from the speaker 113, the interaction partner that the robot 1 will stop the interaction.

The main controller 107 may output only an action control command for displaying a character string representing speech in the text format to the display information output controller 112, and may cause the robot 1 to notify, by using only an input/output operation in the display unit 111, the interaction partner that the robot 1 will stop the interaction. Alternatively, the main controller 107 may cause the robot 1 to notify, by using both speech and a character string representing the speech in the text format, the interaction partner that the robot 1 will stop the interaction. That is, the main controller 107 may display, on the display unit 111, a character string corresponding to speech for notifying the interaction partner that the robot 1 will stop the interaction.

Furthermore, when the robot 1 notifies the child 12 that the robot 1 will stop the interaction (expresses a sleeping state), the main controller 107 may output, to the display information output controller 112, an action control command for displaying the facial expression of the robot 1 in the direction of the face of the child 12, so that the child 12 can easily determine an action of the robot 1.

Referring back to FIG. 2, subsequently, the main controller 107 outputs a command for resetting the interaction information about the child 12 to the interaction information manager 108 after a predetermined period of time (for example, 3 hours) elapses (step S209), and ends the action control process. The command is, for example, a command for changing the duration of interaction, which is 60 minutes or more, to 0 minutes. That is, after the predetermined period of time elapses from when the duration of interaction between the robot 1 and the child 12 exceeds the threshold and the robot 1 suppresses the interaction with the child 12, the robot 1 becomes able to promote the interaction with the child 12. The predetermined period of time, which is 3 hours, may be freely set by the parent 11 in advance or may be automatically set by the robot 1. Here, a description has been given of the case where the predetermined period of time is 3 hours, but the embodiment is not limited thereto.

If it is determined that the duration of interaction between the robot 1 and the child 12 is shorter than 60 minutes (NO in step S203), the main controller 107 requests the parent 11 to allow the robot 1 to continue interacting with the child 12 (step S210). If the target that the robot 1 is interacting with includes the child 12 and the parent 11 and if the amount of interaction is smaller than the threshold, the main controller 107 causes the robot 1 to execute a request process for requesting to the parent 11 that the parent 11 and child 12 continue interacting with the robot 1.

Figure 7:
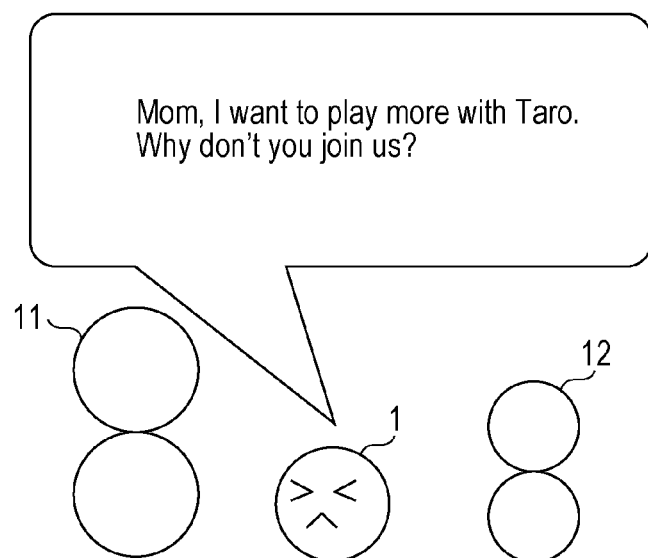
FIG. 7 is a diagram illustrating an example of speech information output from the speaker and display information displayed on the display unit at the time of requesting the continuation of the interaction with the child to the parent in step S210 in FIG. 3.

FIG. 7 is a diagram illustrating an example of speech information output from the speaker 113 and display information displayed on the display unit 111 at the time of requesting the continuation of the interaction with the child 12 to the parent 11 in step S210 in FIG. 3.

As illustrated in FIG. 7, the main controller 107 outputs, to the display information output controller 112, an action control command for turning on a plurality of light-emitting diodes located at the coordinates where a facial expression of making a request can be expressed, for example. The facial expression of making a request is, for example, an indication represented by two inequality signs aligned side by side with a predetermined gap therebetween (for example, "> <"). That is, the main controller 107 displays, on the display unit 111 and in the direction of the parent 11, an indication symbolically representing an action of the robot 1 by using both eyes and a mouth. The indication represents an action in which the robot 1 is making a request. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

In addition, as illustrated in FIG. 7, the main controller 107 outputs, to the speech information output controller 114, an action control command for causing the robot 1 to output speech for requesting the continuation of the interaction between the robot 1 and the child 12. The speech is, for example, "Mom, I want to play more with Taro (the name of the child set by the child or parent in advance). Why don't you join us?" That is, the main controller 107 outputs, from the speaker 113, speech for requesting to the parent 11 that the parent 11 and the child 12 continue interacting with the robot 1.

In this case, if the duration of interaction between the robot 1 and the child 12 does not exceed the threshold (for example, 60 minutes) and if the child 12 and the parent 11 are together as the interaction partner of the robot 1, the parent 11 joins the interaction, so that the robot 1 can further promote the interaction with the child 12.

The facial expression and speech of the robot 1 described here are merely examples, and the embodiment is not limited thereto. The main controller 107 may output only an action control command for causing the robot 1 to output speech to the speech information output controller 114, and may cause the robot 1 to request, by using only the speech output from the speaker 113, the continuation of the interaction with the child 12 to the interaction partner.

The main controller 107 may output only an action control command for displaying a character string representing speech in the text format to the display information output controller 112, and may cause the robot 1 to request, by using only an input/output operation in the display unit 111, the continuation of the interaction with the child 12 to the interaction partner. Alternatively, the main controller 107 may cause the robot 1 to request, by using both speech and a character string representing the speech in the text format, the continuation of the interaction with the child 12 to the interaction partner.

Furthermore, when the robot 1 makes a request to the parent 11, the main controller 107 may output, to the display information output controller 112, an action control command for displaying the facial expression of the robot 1 in the direction of the face of the parent 11, so that the parent 11 can easily determine an action of the robot 1.

Referring back to FIG. 3, subsequently, the main controller 107 determines whether or not a positive reaction is received from the parent 11 within a predetermined period of time (for example, 1 minute) in response to the action of the robot 1 of requesting the continuation of the interaction between the robot 1 and the child 12 (step S211). If there is a positive response with speech, for example, "Yes, I'll join you" or if there is a positive response with a gesture of shaking the head vertically, the main controller 107 determines that a positive reaction is received from the parent 11.

In this way, the main controller 107 causes the robot 1 to execute a request process for requesting to the parent 11 that the parent 11 and the child 12 continue interacting with the robot 1, and then determines, based on an obtained sound or image, whether or not the parent 11 has a positive reaction. After causing the robot 1 to execute the request process, the main controller 107 determines whether an obtained sound includes an utterance of the parent 11 including a positive word, whether an obtained sound includes an utterance of the parent 11 including a negative word, or whether an obtained sound includes no utterance of the parent 11. If the main controller 107 determines that an obtained sound includes an utterance of the parent 11 including a positive word, the main controller 107 determines that the parent 11 has a positive reaction. In addition, after causing the robot 1 to execute the request process, the main controller 107 determines, based on an obtained image, whether the parent 11 is shaking the head vertically, whether the parent 11 is shaking the head horizontally, or whether the parent 11 has no reaction. If the main controller 107 determines that the parent 11 is shaking the head vertically, the main controller 107 determines that the parent 11 has a positive reaction.

If it is determined that a positive reaction is received from the parent 11 in response to the action of the robot 1 of requesting the continuation of the interaction between the robot 1 and the child 12 (YES in step S211), the main controller 107 outputs an action control command for providing the child 12 and the parent 11 with conversation or play to the display information output controller 112 and the speech information output controller 114 (step S212). If there is a positive response with speech "Yes, I'll join you" or if there is a positive response with a gesture of shaking the head vertically, for example, the main controller 107 determines that a positive reaction is received from the parent 11.

After causing the robot 1 to execute the request process, the main controller 107 determines, based on an obtained sound or image, whether or not the parent 11 has a positive reaction. If the main controller 107 determines that the parent 11 has a positive reaction, the main controller 107 causes the robot 1 to execute a lead-parent-and-child-to-interact process for leading the child 12 and the parent 11 to continue interacting with the robot 1.

The lead-parent-and-child-to-interact process may include executing a program that is stored in the memory 118 and that corresponds to content with which the robot 1 plays with the parent 11 and the child 12, thereby outputting speech corresponding to the content from the speaker 113. The content includes any one of Shiritori, quiz, rock-paper-scissors, doll play, book reading, singing, promotion of lifestyle behavior, and hide-and-seek. In addition, the lead-parent-and-child-to-interact process may include executing a program that is stored in the memory 118 and that causes the robot 1 to talk with the child 12 on a predetermined topic, thereby outputting speech including the predetermined topic from the speaker 113. The predetermined topic includes any one of greeting to the child 12, current weather, self-introduction by the robot 1, a schedule of the child 12 set by the parent 11 in advance, and miscellaneous topics.

Specifically, the main controller 107 executes a program, which is installed in the memory 118, of a conversation constituted by a predetermined facial expression and speech (for example, self-introduction, greeting, checking of weather, checking of schedule, or chat targeted to the child 12 and the parent 11) or play (for example, Shiritori, quiz, rock-paper-scissors, book reading, doll play, singing, hide-and-seek, or promotion of lifestyle behavior targeted to the child 12 and the parent 11). In response to reactions of the child 12 and the parent 11, the main controller 107 outputs, to the display information output controller 112 and the speech information output controller 114, an action control command for turning on a plurality of light-emitting diodes located at the coordinates where a predetermined facial expression (for example, a smiling face, a surprised face, or a sad face) is expressed and an action control command for causing the robot 1 to output predetermined speech, respectively. The predetermined speech is, for example, "Go ask mom," "Taro (the name of the child set by the child or parent in advance), let's play Shiritori with mom and me," or "I want to play more with Taro (the name of the child set by the child or parent in advance) and mom."

Figure 8:
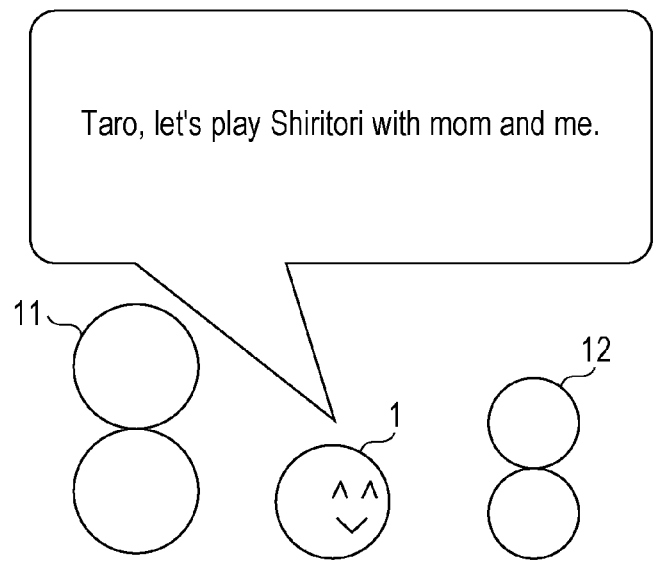
FIG. 8 is a diagram illustrating an example of speech information output from the speaker and display information displayed on the display unit at the time of providing the child and the parent with conversation or play in step S212 in FIG. 3.

FIG. 8 is a diagram illustrating an example of speech information output from the speaker 113 and display information displayed on the display unit 111 at the time of providing the child 12 and the parent 11 with conversation or play in step S212 in FIG. 3.

As illustrated in FIG. 8, the main controller 107 executes a program that is stored in the memory 118 and corresponds to content with which the robot 1 plays Shiritori with the child 12 and the parent 11, thereby outputting an action control command for causing the robot 1 to output speech corresponding to Shiritori. The speech is, for example, "Taro, let's play Shiritori with mom and me."

In this case, the duration of interaction between the robot 1 and the child 12 does not exceed the threshold (for example, 60 minutes), the child 12 and the parent 11 are together as the interaction partner of the robot 1, and the parent 11 joins the interaction. Accordingly, the robot 1 provides the child 12 and the parent 11 with conversation or play, and the robot 1 further promotes the interaction with the child 12 in which the parent 11 joins.

The facial expression and speech of the robot 1 described here are merely examples, and the embodiment is not limited thereto. The main controller 107 may output only an action control command for causing the robot 1 to output speech to the speech information output controller 114, and may cause the robot 1 to provide the interaction partner with conversation or play by using only the speech output from the speaker 113. That is, the lead-parent-and-child-to-interact process may include outputting, from the speaker 113, speech for leading the child 12 and the parent 11 to continue interacting with the robot 1.

The main controller 107 may output only an action control command for displaying a character string representing speech in the text format to the display information output controller 112, and may cause the robot 1 to provide the interaction partner with conversation or play by using only an input/output operation in the display unit 111. Alternatively, the main controller 107 may cause the robot 1 to provide the interaction partner with conversation or play by using both speech and a character string representing the speech in the text format. That is, the lead-parent-and-child-to-interact process may include displaying a character string corresponding to speech on the display unit 111.

Furthermore, when the robot 1 provides the child 12 and the parent 11 with conversation or play, the main controller 107 may output, to the display information output controller 112, an action control command for displaying the facial expression of the robot 1 in the direction of the face of the child 12 or the parent 11, so that the child 12 or the parent 11 can easily determine an action of the robot 1.

The difference between the conversation or play provided by the robot 1 to the child 12 and the parent 11 and the conversation or play provided by the robot 1 to only the child 12 is, for example, whether or not the conversation or play has an element in which the robot 1 allows the parent 11 to join. The element in which the robot 1 allows the parent 11 to join is, for example, talking to the parent 11 by the robot 1, requesting to the parent 11 by the robot 1, talking to the parent 11 by the robot 1 via the child 12, or requesting to the parent 11 by the robot 1 via the child 12.

Referring back to FIG. 3, subsequently, the main controller 107 waits for a predetermined period of time (for example, 5 minutes) (step S207). After that, the process returns to step S201, where the main controller 107 determines again, based on the charging flag received from the power source controller 110, whether or not charging is in progress in the robot 1. The predetermined period of time, which is 5 minutes, may be freely set by the parent 11 in advance or may be automatically set by the robot 1. Here, a description has been given of the case where the predetermined period of time is 5 minutes, but the embodiment is not limited thereto.

On the other hand, if it is determined that a positive reaction is not received from the parent 11 in response to the action of the robot 1 of requesting the continuation of the interaction between the robot 1 and the child 12 (NO in step S211), the main controller 107 outputs an action control command for providing the child 12 with conversation or play to the display information output controller 112 and the speech information output controller 114 (step S206). If there is a negative response with speech "No, I can't join you", if there is no response, or if there is a negative response with a gesture of shaking the head horizontally, for example, the main controller 107 determines that a positive reaction is not received from the parent 11.

The main controller 107 causes the robot 1 to execute a request process and then determines, based on an obtained sound or image, whether or not the parent 11 has a positive reaction. If the main controller 107 determines that the parent 11 has a negative reaction, the main controller 107 causes the robot 1 to execute a lead-child-to-interact process for leading the child 12 to continue interacting with the robot 1.

After causing the robot 1 to execute the request process, the main controller 107 may determine whether an obtained sound includes an utterance of the parent 11 including a positive word, whether an obtained sound includes an utterance of the parent 11 including a negative word, or whether an obtained sound includes no utterance of the parent 11. If the main controller 107 determines that an obtained sound includes an utterance of the parent 11 including a negative word or that an obtained sound includes no utterance of the parent 11, the main controller 107 may determine that the parent 11 has a negative reaction. In addition, after causing the robot 1 to execute the request process, the main controller 107 may determine, based on an obtained image, whether the parent 11 is shaking the head vertically, whether the parent 11 is shaking the head horizontally, or whether the parent 11 has no reaction. If the main controller 107 determines that the parent 11 is shaking the head horizontally or that the parent 11 has no reaction, the main controller 107 may determine that the parent 11 has a negative reaction.

Specifically, the main controller 107 executes a program, which is installed in the memory 118, of a conversation constituted by a predetermined facial expression and speech (for example, self-introduction, greeting, checking of weather, checking of schedule, or chat targeted to the child 12) or play (for example, Shiritori, quiz, rock-paper-scissors, book reading, doll play, singing, hide-and-seek, or promotion of lifestyle behavior targeted to the child 12). In response to a reaction of the child 12, the main controller 107 outputs, to the display information output controller 112 and the speech information output controller 114, an action control command for turning on a plurality of light-emitting diodes located at the coordinates where a predetermined facial expression (for example, a smiling face, a surprised face, or a sad face) is expressed and an action control command for causing the robot 1 to output predetermined speech, respectively. The predetermined speech is, for example, "Let's talk more with me," "Taro (the name of the child set by the child or parent in advance), let's play Shiritori with me," or "I want to play more with Taro (the name of the child set by the child or parent in advance)."

For example, as illustrated in FIG. 5, the main controller 107 executes a program that is stored in the memory 118 and corresponds to content with which the robot 1 plays Shiritori with the child 12, thereby outputting an action control command for causing the robot 1 to output speech corresponding to Shiritori. The speech is, for example, "Taro, let's play Shiritori with me."

In this case, the duration of interaction between the robot 1 and the child 12 does not exceed the threshold (for example, 60 minutes), the child 12 and the parent 11 are together as the interaction partner of the robot 1, and the parent 11 does not join the interaction. Accordingly, the robot 1 provides only the child 12 with conversation or play, and the robot 1 promotes the interaction with the child 12 without help from the parent 11.

The facial expression and speech of the robot 1 described here are merely examples, and the embodiment is not limited thereto. The main controller 107 may output only an action control command for causing the robot 1 to output speech to the speech information output controller 114, and may cause the robot 1 to provide the interaction partner with conversation or play by using only the speech output from the speaker 113.

The main controller 107 may output only an action control command for displaying a character string representing speech in the text format to the display information output controller 112, and may cause the robot 1 to provide the interaction partner with conversation or play by using only an input/output operation in the display unit 111. Alternatively, the main controller 107 may cause the robot 1 to provide the interaction partner with conversation or play by using both speech and a character string representing the speech in the text format.

Furthermore, when the robot 1 provides the child 12 with conversation or play, the main controller 107 may output, to the display information output controller 112, an action control command for displaying the facial expression of the robot 1 in the direction of the face of the child 12, so that the child 12 can easily determine an action of the robot 1.

Subsequently, the main controller 107 waits for a predetermined period of time (for example, 5 minutes) (step S207). After that, the process returns to step S201, where the main controller 107 determines again, based on the charging flag received from the power source controller 110, whether or not charging is in progress in the robot 1. The predetermined period of time, which is 5 minutes, may be freely set by the parent 11 in advance or may be automatically set by the robot 1. Here, a description has been given of the case where the predetermined period of time is 5 minutes, but the embodiment is not limited thereto.

If it is determined that the user as the interaction partner of the robot 1 is only the child 12 ("child" in step S202), the process proceeds to step S213 in FIG. 2. Step S213 is the same as step S203 in FIG. 2, and thus the description thereof is not given here.

If it is determined in step S213 that the duration of interaction between the robot 1 and the child 12 is longer than or equal to 60 minutes (YES in step S213), the main controller 107 outputs an action control command for causing the robot 1 to stop interacting with the child 12 to the display information output controller 112 and the speech information output controller 114 (step S214).

If the target that the robot 1 is interacting with includes only the child 12 and if the amount of interaction is larger than or equal to the threshold, the main controller 107 causes the robot 1 to execute an interaction stop process for stopping interacting with the child 12.

The interaction stop process may include displaying, on the display unit 111 and in the direction of the child 12, an indication symbolically representing the state of the robot 1 by using both eyes and a mouth. The indication represents a state in which the robot 1 is sleeping. The indication includes two minus signs aligned side by side with a predetermined gap therebetween, and the two minus signs correspond to both eyes of the apparatus. In addition, the interaction stop process may include outputting a sound effect representing a snoring noise from the speaker 113. In addition, the interaction stop process may include outputting speech for notifying the child 12 that the robot 1 will fall asleep soon from the speaker 113.

Specifically, the main controller 107 outputs, to the display information output controller 112, an action control command for turning on a plurality of light-emitting diodes located at the coordinates where a facial expression with the eyes closed can be expressed, for example. The facial expression with the eyes closed is, for example, an indication represented by two minus signs aligned side by side with a predetermined gap therebetween (for example, "- -"). In addition, the main controller 107 outputs, to the speech information output controller 114, an action control command for causing the robot 1 to output speech for notifying that the robot 1 will fall asleep or representing a state in which the robot 1 is sleeping, for example, "I'm getting sleepy" or "Zzz" (snoring noise).

Figure 9:
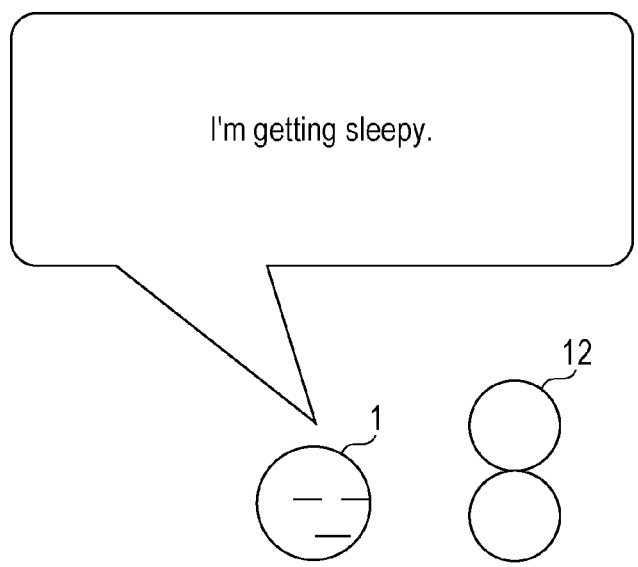
FIG. 9 is a diagram illustrating an example of speech information output from the speaker and display information displayed on the display unit at the time of stopping the interaction with the child in step S214 in FIG. 2.

FIG. 9 is a diagram illustrating an example of speech information output from the speaker 113 and display information displayed on the display unit 111 at the time of stopping the interaction with the child 12 in step S214 in FIG. 2.

As illustrated in FIG. 9, the main controller 107 stops the interaction between the robot 1 and the child 12. At this time, the main controller 107 displays, in the direction of the child 12, an indication symbolically representing the state of the robot 1 by using both eyes and a mouth. The indication includes two minus signs aligned side by side with a predetermined gap therebetween and represents a state in which the robot 1 is sleeping. In addition, the main controller 107 outputs, from the speaker 113, speech for notifying the child 12 that the robot 1 will fall asleep. The speech is, for example, "I'm getting sleepy."

In this case, the duration of interaction between the robot 1 and the child 12 is longer than or equal to the threshold (for example, 60 minutes), and thus the robot 1 suppresses the interaction with the child 12.

The facial expression and speech of the robot 1 described here are merely examples, and the embodiment is not limited thereto. The main controller 107 may output only an action control command for causing the robot 1 to output speech to the speech information output controller 114, and may cause the robot 1 to notify, by using only the speech output from the speaker 113, the interaction partner that the robot 1 will stop the interaction.

The main controller 107 may output only an action control command for displaying a character string representing speech in the text format to the display information output controller 112, and may cause the robot 1 to notify, by using only an input/output operation in the display unit 111, the interaction partner that the robot 1 will stop the interaction. Alternatively, the main controller 107 may cause the robot 1 to notify, by using both speech and a character string representing the speech in the text format, the interaction partner that the robot 1 will stop the interaction.

Furthermore, when the robot 1 notifies the child 12 that the robot 1 will stop the interaction (expresses a sleeping state), the main controller 107 may output, to the display information output controller 112, an action control command for displaying the facial expression of the robot 1 in the direction of the face of the child 12, so that the child 12 can easily determine an action of the robot 1.

Referring back to FIG. 2, subsequently, the main controller 107 outputs a command for resetting the interaction information about the child 12 to the interaction information manager 108 after a predetermined period of time (for example, 3 hours) elapses (step S209), and ends the action control process. The command is, for example, a command for changing the duration of interaction, which is 60 minutes or more, to 0 minutes. That is, after the predetermined period of time elapses from when the duration of interaction between the robot 1 and the child 12 exceeds the threshold and the robot 1 suppresses the interaction with the child 12, the robot 1 becomes able to promote the interaction with the child 12. The predetermined period of time, which is 3 hours, may be freely set by the parent 11 in advance or may be automatically set by the robot 1. Here, a description has been given of the case where the predetermined period of time is 3 hours, but the embodiment is not limited thereto.

If it is determined that the duration of interaction between the robot 1 and the child 12 is shorter than 60 minutes (NO in step S213), the main controller 107 outputs an action control command for providing the child 12 with conversation or play to the display information output controller 112 and the speech information output controller 114 (step S215).

If the target that the robot 1 is interacting with includes only the child 12 and if the amount of interaction is smaller than the threshold, the main controller 107 causes the robot 1 to execute a lead-child-to-interact process for leading the child 12 to continue interacting with the robot 1. The lead-child-to-interact process is the same as in step S206.

Specifically, the main controller 107 executes a program, which is installed in the memory 118, of a conversation constituted by a predetermined facial expression and speech (for example, self-introduction, greeting, checking of weather, checking of schedule, or chat targeted to the child 12) or play (for example, Shiritori, quiz, rock-paper-scissors, book reading, doll play, singing, hide-and-seek, or promotion of lifestyle behavior targeted to the child 12). In response to a reaction of the child 12, the main controller 107 outputs, to the display information output controller 112 and the speech information output controller 114, an action control command for turning on a plurality of light-emitting diodes located at the coordinates where a predetermined facial expression (for example, a smiling face, a surprised face, or a sad face) is expressed and an action control command for causing the robot 1 to output predetermined speech, respectively. The predetermined speech is, for example, "Let's talk more with me," "Taro (the name of the child set by the child or parent in advance), let's play Shiritori with me," or "I want to play more with Taro (the name of the child set by the child or parent in advance)."

Figure 10:
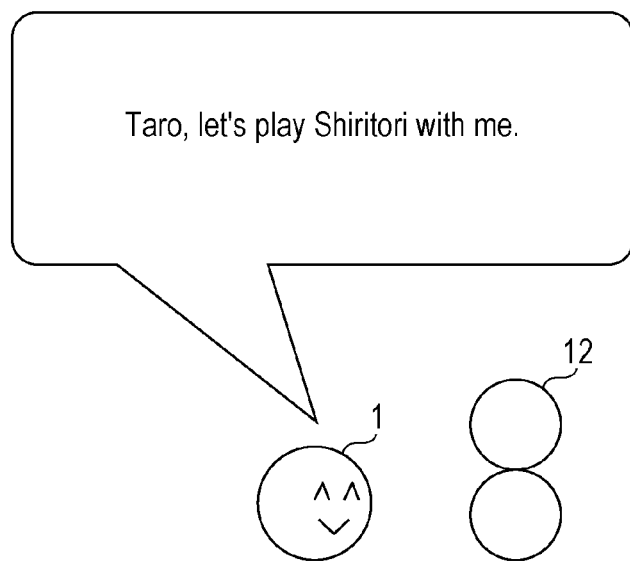
FIG. 10 is a diagram illustrating an example of speech information output from the speaker and display information displayed on the display unit at the time of providing the child 12 with conversation or play in step S215 in FIG. 3.

FIG. 10 is a diagram illustrating an example of speech information output from the speaker 113 and display information displayed on the display unit 111 at the time of providing the child 12 with conversation or play in step S215 in FIG. 3.

As illustrated in FIG. 10, the main controller 107 executes a program that is stored in the memory 118 and corresponds to content with which the robot 1 plays Shiritori with the child 12, thereby outputting an action control command for causing the robot 1 to output speech corresponding to Shiritori. The speech is, for example, "Taro, let's play Shiritori with me."

In this case, the duration of interaction between the robot 1 and the child 12 does not exceed the threshold (for example, 60 minutes), and thus the robot 1 promotes the interaction with the child 12.

The facial expression and speech of the robot 1 described here are merely examples, and the embodiment is not limited thereto. The main controller 107 may output only an action control command for causing the robot 1 to output speech to the speech information output controller 114, and may cause the robot 1 to provide the interaction partner with conversation or play by using only the speech output from the speaker 113.

The main controller 107 may output only an action control command for displaying a character string representing speech in the text format to the display information output controller 112, and may cause the robot 1 to provide the interaction partner with conversation or play by using only an input/output operation in the display unit 111. Alternatively, the main controller 107 may cause the robot 1 to provide the interaction partner with conversation or play by using both speech and a character string representing the speech in the text format.

Furthermore, when the robot 1 provides the child 12 with conversation or play, the main controller 107 may output, to the display information output controller 112, an action control command for displaying the facial expression of the robot 1 in the direction of the face of the child 12, so that the child 12 can easily determine an action of the robot 1.

Referring back to FIG. 3, subsequently, the main controller 107 waits for a predetermined period of time (for example, 5 minutes) (step S207). After that, the process returns to step S201, where the main controller 107 determines again, based on the charging flag received from the power source controller 110, whether or not charging is in progress in the robot 1. The predetermined period of time, which is 5 minutes, may be freely set by the parent 11 in advance or may be automatically set by the robot 1. Here, a description has been given of the case where the predetermined period of time is 5 minutes, but the embodiment is not limited thereto.

In the first action control process of the first embodiment, the main controller 107 causes the robot 1 to execute any one of the asking process, the request process, the interaction stop process, and the lead-child-to-interact process when the robot 1 is not being charged with power by the charger 2.

In the first embodiment, the main controller 107 obtains only a charging flag indicating the power state of the power source 109 from the power source controller 110, and generates an action control command by using the information received from the interaction information manager 108 and the power source controller 110. Alternatively, the main controller 107 may obtain information representing a remaining amount of power from the power source controller 110 in addition to the charging flag indicating the power state of the power source 109, and may generate an action control command by using the information obtained from the interaction information manager 108 and the power source controller 110.

Figure 11:
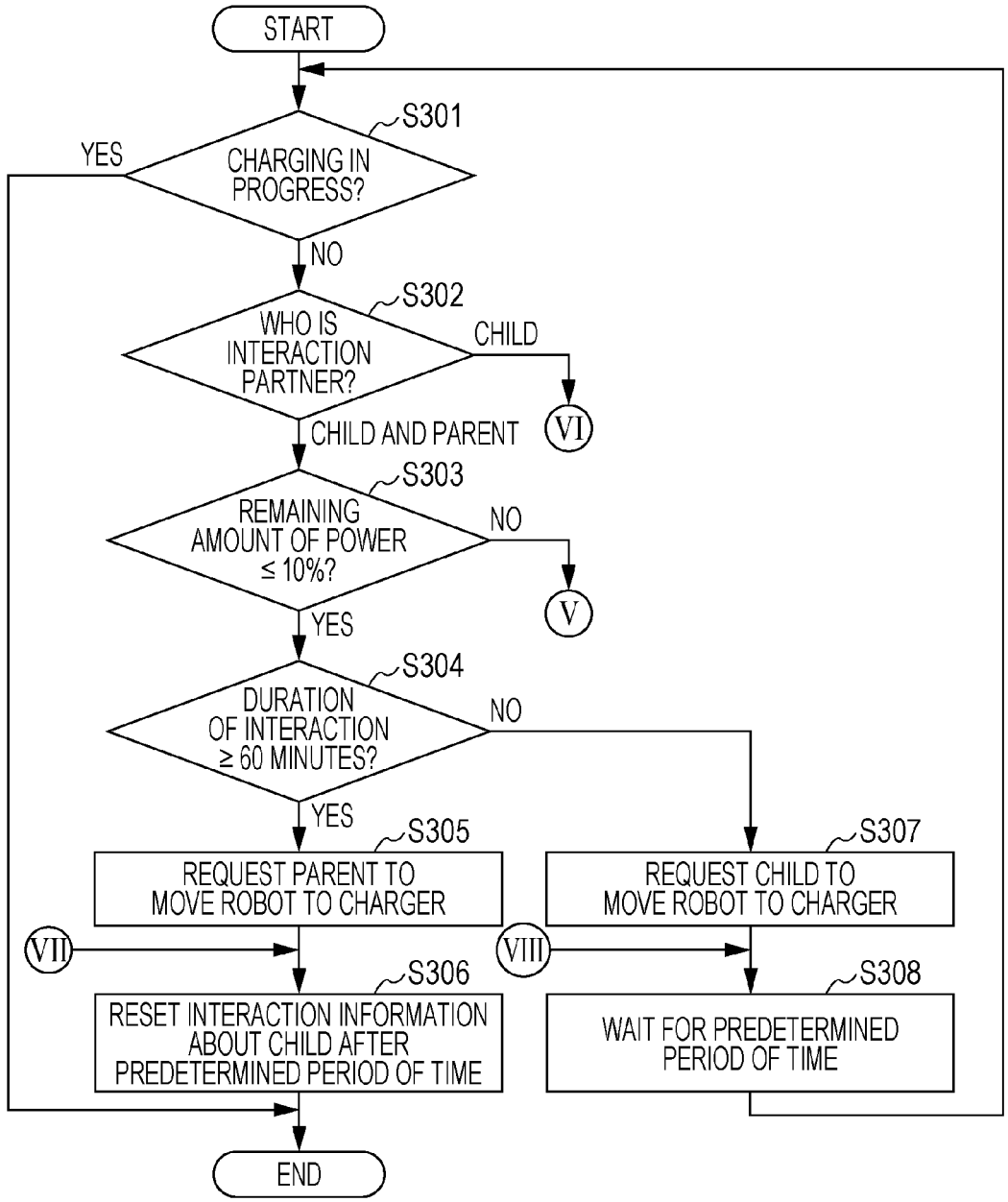
FIG. 11 is a first flowchart illustrating a second action control process in the robot according to the first embodiment of the present disclosure.
Figure 12:
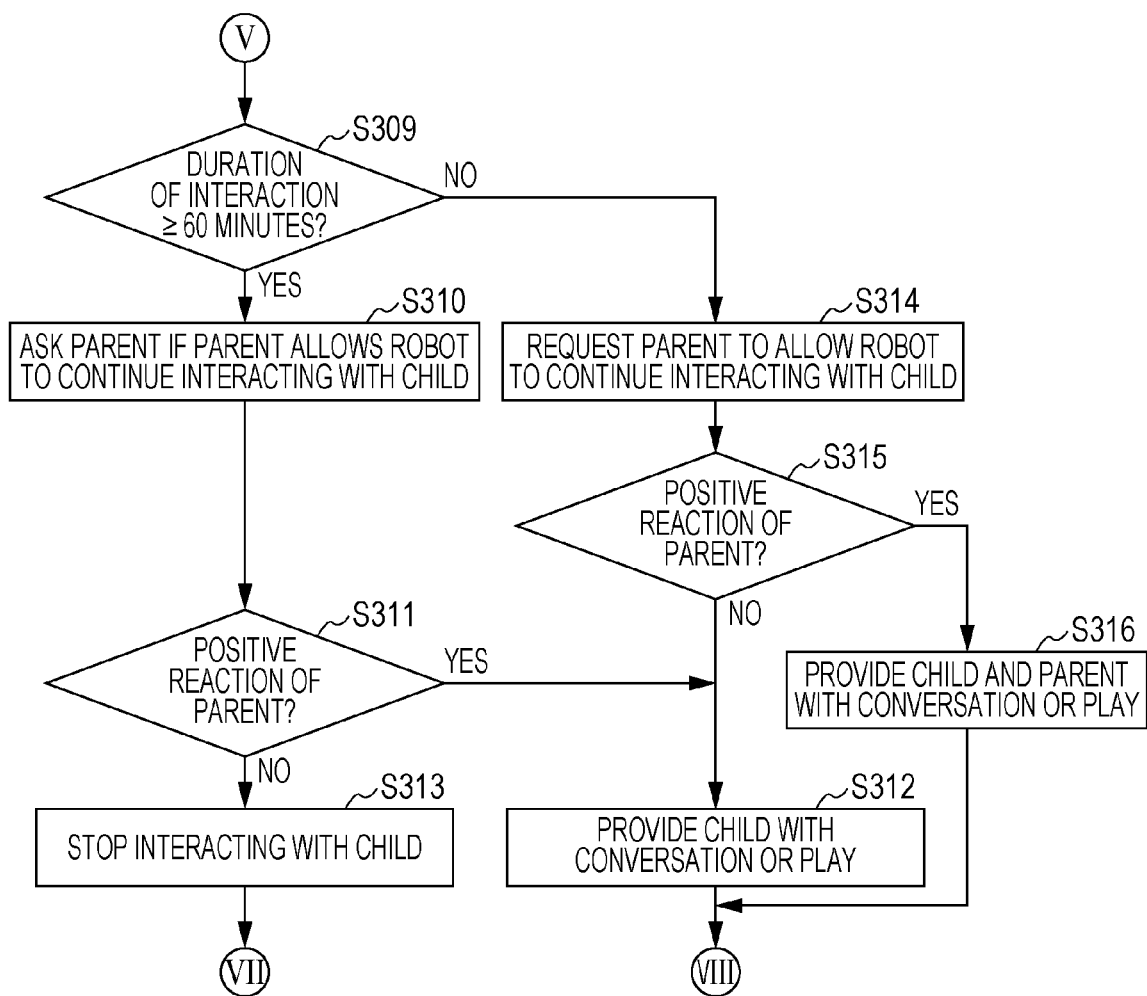
FIG. 12 is a second flowchart illustrating the second action control process in the robot according to the first embodiment of the present disclosure.
Figure 13:
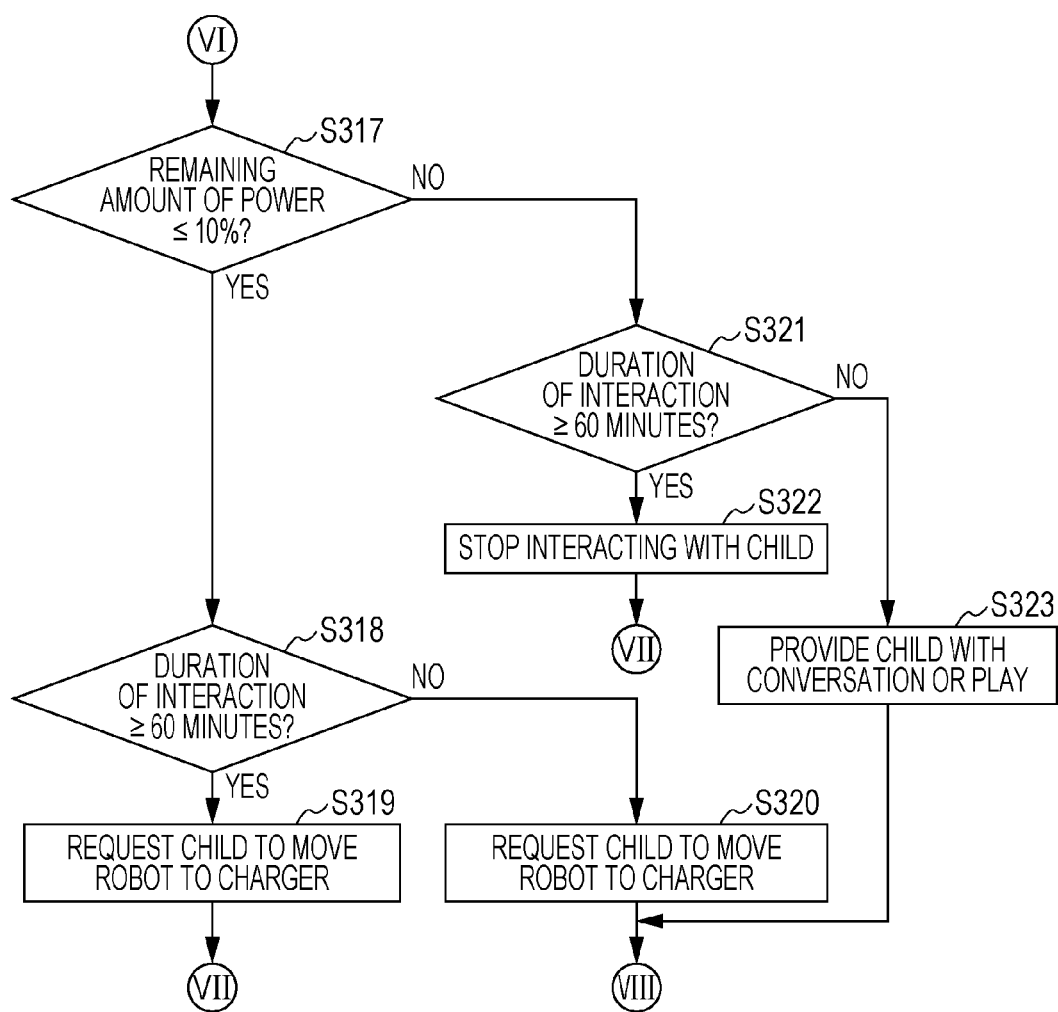
FIG. 13 is a third flowchart illustrating the second action control process in the robot according to the first embodiment of the present disclosure.

Next, a description will be given of a second action control process in the robot 1 according to the first embodiment of the present disclosure with reference to FIGS. 11 to 13. FIG. 11 is a first flowchart illustrating the second action control process in the robot 1 according to the first embodiment of the present disclosure, FIG. 12 is a second flowchart illustrating the second action control process in the robot 1 according to the first embodiment of the present disclosure, and FIG. 13 is a third flowchart illustrating the second action control process in the robot 1 according to the first embodiment of the present disclosure.

Steps S301 and S302 in FIG. 11 are the same as steps S201 and S202 in FIG. 2, and thus the description thereof is not given here.

If it is determined in step S302 that the user as the interaction partner of the robot 1 includes the child 12 and the parent 11 ("child and parent" in step S302), the main controller 107 determines whether or not the remaining amount of power of the power source 109 of the robot 1 is smaller than or equal to 10% (step S303). This step is performed to determine the remaining amount of power in the power source 109 and to determine whether or not the robot 1 needs to be charged. The predetermined value, which is 10%, may be freely set by the parent 11 in advance or may be automatically set by the robot 1. Here, a description has been given of the case where the predetermined value of the remaining amount of power of the power source 109 of the robot 1 is 10%, but the embodiment is not limited thereto.

Subsequently, if it is determined that the remaining amount of power of the power source 109 of the robot 1 is smaller than or equal to 10% (YES in step S303), the process proceeds to step S304 in FIG. 11. Step S304 is the same as step S203 in FIG. 2, and thus the description thereof is not given here.

If it is determined in step S304 that the duration of interaction between the robot 1 and the child 12 is longer than or equal to 60 minutes (YES in step S304), the main controller 107 requests the parent 11 to move the robot 1 to the charger 2 (step S305).

If the target that the robot 1 is interacting with includes the child 12 and parent 11, if the remaining amount of power is smaller than or equal to a first threshold (for example, 10%), and if the amount of interaction is larger than or equal to a second threshold (for example, 60 minutes), the main controller 107 causes the robot 1 to execute a first movement request process for requesting the parent 11 to move the robot 1 to the charger 2.

Figure 14:
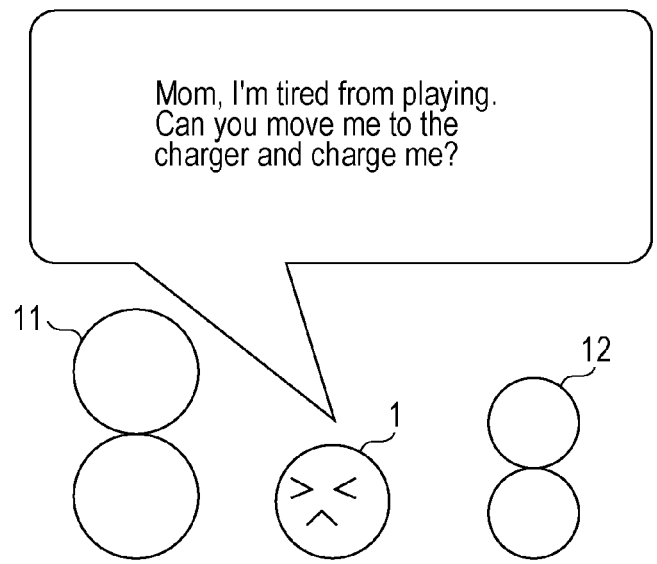
FIG. 14 is a diagram illustrating an example of speech information output from the speaker and display information displayed on the display unit when the robot requests the parent to move the robot to the charger in step S305 in FIG. 11.

FIG. 14 is a diagram illustrating an example of speech information output from the speaker 113 and display information displayed on the display unit 111 when the robot 1 requests the parent 11 to move the robot 1 to the charger 2 in step S305 in FIG. 11.

As illustrated in FIG. 14, the main controller 107 outputs, to the display information output controller 112, an action control command for turning on a plurality of light-emitting diodes located at the coordinates where a facial expression of making a request can be expressed, for example. The facial expression of making a request is, for example, an indication represented by two inequality signs aligned side by side with a predetermined gap therebetween (for example, "> <"). That is, the main controller 107 displays, on the display unit 111 and in the direction of the parent 11, an indication symbolically representing an action of the robot 1 by using both eyes and a mouth. The indication represents an action in which the robot 1 is making a request. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

As illustrated in FIG. 14, the main controller 107 outputs, to the speech information output controller 114, an action control command for causing the robot 1 to output speech for requesting the parent 11 to move the robot 1 to the charger 2. The speech is, for example, "Mom, I'm tired from playing. Can you move me to the charger and charge me?" That is, the main controller 107 outputs, from the speaker 113, speech for requesting the parent 11 to move the robot 1 to the charger 2.

In this way, if the duration of interaction between the robot 1 and the child 12 is longer than or equal to the second threshold (for example, 60 minutes), if the remaining amount of power of the power source 109 of the robot 1 is smaller than or equal to the first threshold (for example, 10%), and if the child 12 and the parent 11 are together as the interaction partner of the robot 1, the robot 1 requests the parent 11 to move the robot 1 to the charger 2, so that the robot 1 is charged to recover the power of the power source 109. By requesting the parent 11 to move the robot 1 to the charger 2, the interaction between the robot 1 and the child 12 is suppressed.

The facial expression and speech of the robot 1 described here are merely examples, and the embodiment is not limited thereto. The main controller 107 may output only an action control command for causing the robot 1 to output speech to the speech information output controller 114, and may cause the robot 1 to request, by using only the speech output from the speaker 113, the interaction partner to move the robot 1 to the charger 2.

The main controller 107 may output only an action control command for displaying a character string representing speech in the text format to the display information output controller 112, and may cause the robot 1 to request, by using only an input/output operation in the display unit 111, the interaction partner to move the robot 1 to the charger 2. Alternatively, the main controller 107 may cause the robot 1 to request, by using both speech and a character string representing the speech in the text format, the interaction partner to move the robot 1 to the charger 2. That is, the main controller 107 may display, on the display unit 111, an indication including a character string corresponding to speech.

Furthermore, when the robot 1 makes a request to the parent 11, the main controller 107 may output, to the display information output controller 112, an action control command for displaying the facial expression of the robot 1 in the direction of the face of the parent 11, so that the parent 11 can easily determine an action of the robot 1.

If the power source 109 of the robot 1 is not a rechargeable battery but is a primary battery, the main controller 107 may perform, for example, action control for requesting the parent 11 to replace the battery of the robot 1.

After step S305, the process proceeds to step S306 in FIG. 11. Step S306 is the same as step S209 in FIG. 2, and thus the description thereof is not given here.

On the other hand, if it is determined in step S304 that the duration of interaction between the robot 1 and the child 12 is shorter than 60 minutes (NO in step S304), the main controller 107 requests the child 12 to move the robot 1 to the charger 2 (step S307).

If the target that the robot 1 is interacting with includes the child 12 and parent 11, if the remaining amount of power is smaller than or equal to the first threshold (for example, 10%), and if the amount of interaction is smaller than the second threshold (for example, 60 minutes), the main controller 107 causes the robot 1 to execute a second movement request process for requesting the child 12 to move the robot 1 to the charger 2.

Figure 15:
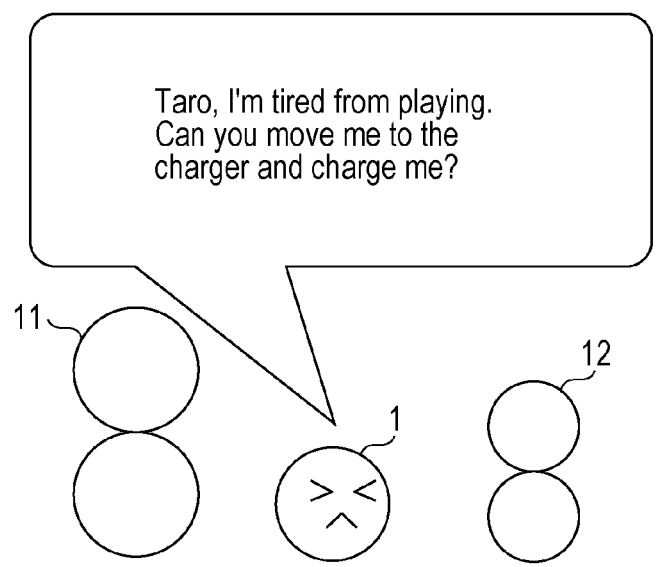
FIG. 15 is a diagram illustrating an example of speech information output from the speaker and display information displayed on the display unit when the robot requests the child to move the robot to the charger in step S307 in FIG. 11.

FIG. 15 is a diagram illustrating an example of speech information output from the speaker 113 and display information displayed on the display unit 111 when the robot 1 requests the child 12 to move the robot 1 to the charger 2 in step S307 in FIG. 11.

As illustrated in FIG. 15, the main controller 107 outputs, to the display information output controller 112, an action control command for turning on a plurality of light-emitting diodes located at the coordinates where a facial expression of making a request can be expressed, for example. The facial expression of making a request is, for example, an indication represented by two inequality signs aligned side by side with a predetermined gap therebetween (for example, "> <"). That is, the main controller 107 displays, on the display unit 111 and in the direction of the child 12, an indication symbolically representing an action of the robot 1 by using both eyes and a mouth. The indication represents an action in which the robot 1 is making a request. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

As illustrated in FIG. 15, the main controller 107 outputs, to the speech information output controller 114, an action control command for causing the robot 1 to output speech for requesting the child 12 to move the robot 1 to the charger 2. The speech is, for example, "Taro (the name of the child set by the child or parent in advance), I'm tired from playing. Can you move me to the charger and charge me?" That is, the main controller 107 outputs, from the speaker 113, speech for requesting the child 12 to move the robot 1 to the charger 2.

In this way, since the remaining amount of power of the power source 109 of the robot 1 is smaller than or equal to the first threshold (for example, 10%) although the duration of interaction between the robot 1 and the child 12 does not exceed the second threshold (for example, 60 minutes), the robot 1 requests the child 12 to move the robot 1 to the charger 2, so that the robot 1 is charged to recover the power of the power source 109. By requesting the child 12 to move the robot 1 to the charger 2, the interaction between the robot 1 and the child 12 is promoted.

The facial expression and speech of the robot 1 described here are merely examples, and the embodiment is not limited thereto. The main controller 107 may output only an action control command for causing the robot 1 to output speech to the speech information output controller 114, and may cause the robot 1 to request, by using only the speech output from the speaker 113, the interaction partner to move the robot 1 to the charger 2.

The main controller 107 may output only an action control command for displaying a character string representing speech in the text format to the display information output controller 112, and may cause the robot 1 to request, by using only an input/output operation in the display unit 111, the interaction partner to move the robot 1 to the charger 2. Alternatively, the main controller 107 may cause the robot 1 to request, by using both speech and a character string representing the speech in the text format, the interaction partner to move the robot 1 to the charger 2. That is, the main controller 107 may display, on the display unit 111, an indication including a character string corresponding to speech.

Furthermore, when the robot 1 makes a request to the child 12, the main controller 107 may output, to the display information output controller 112, an action control command for displaying the facial expression of the robot 1 in the direction of the face of the child 12, so that the child 12 can easily determine an action of the robot 1. If the power source 109 of the robot 1 is not a rechargeable battery but is a primary battery, the main controller 107 may perform, for example, action control for requesting the child 12 to replace the battery of the robot 1.

After step S307, the process proceeds to step S308 in FIG. 11. Step S308 is the same as step S207 in FIG. 3, and thus the description thereof is not given here.

On the other hand, if it is determined that the remaining amount of power of the power source 109 of the robot 1 is larger than 10% (NO in step S303), the process proceeds to step S309 in FIG. 12. Steps S309 to S316 in FIG. 12 are the same as steps S203 to S206, step S208, and steps S210 to S212 illustrated in FIGS. 2 and 3 in this order, and thus the description thereof is not given here.

That is, if the target that the robot 1 is interacting with includes the child 12 and the parent 11, if the remaining amount of power is larger than the first threshold (for example, 10%), and if the amount of interaction is larger than or equal to the second threshold (for example, 60 minutes), the main controller 107 causes the robot 1 to execute an asking process for asking the parent 11 if the parent 11 allows the robot 1 to continue interacting with the child 12. The asking process is the same as the above-described asking process according to the first embodiment.

If the target that the robot 1 is interacting with includes the child 12 and the parent 11, if the remaining amount of power is larger than the first threshold (for example, 10%), and if the amount of interaction is smaller than the second threshold (for example, 60 minutes), the main controller 107 causes the robot 1 to execute an interaction request process for requesting the parent 11 that the parent 11 and the child 12 continue interacting with the robot 1. The interaction request process is the same as the above-described interaction request process according to the first embodiment.

In steps S309 to S316, the remaining amount of power of the power source 109 of the robot 1 is not smaller than the first threshold (for example, 10%), and it is not necessary to charge the robot 1 to recover the power of the power source 109. Thus, the robot 1 does not request the interaction partner to move the robot 1 to the charger 2. After step S312 or S316, the process proceeds to step S308 in FIG. 11. Step S308 is the same as step S207 in FIG. 3, and thus the description thereof is not given here. After step S313, the process proceeds to step S306 in FIG. 11. Step S306 is the same as step S209 in FIG. 2, and thus the description thereof is not given here.

If it is determined in step S302 that the user as the interaction partner of the robot 1 includes only the child 12 ("child" in step S302), the main controller 107 determines whether or not the remaining amount of power of the power source 109 of the robot 1 is smaller than or equal to 10% (step S317). This step is performed to determine the remaining amount of power in the power source 109 and to determine whether or not the robot 1 needs to be charged. The predetermined value, which is 10%, may be freely set by the parent 11 in advance or may be automatically set by the robot 1. Here, a description has been given of the case where the predetermined value of the remaining amount of power of the power source 109 of the robot 1 is 10%, but the embodiment is not limited thereto.

Subsequently, if it is determined that the remaining amount of power of the power source 109 of the robot 1 is smaller than or equal to 10% (YES in step S317), the process proceeds to step S318 in FIG. 13. Step S318 is the same as step S213 in FIG. 2, and thus the description thereof is not given here.

If it is determined in step S318 that the duration of interaction between the robot 1 and the child 12 is longer than or equal to 60 minutes (YES in step S318), the main controller 107 requests the child 12 to move the robot 1 to the charger 2 (step S319).

If the target that the robot 1 is interacting with includes only the child 12, if the remaining amount of power is smaller than or equal to the first threshold (for example, 10%), and if the amount of interaction is larger than or equal to the second threshold (for example, 60 minutes), the main controller 107 causes the robot 1 to execute the second movement request process for requesting the child 12 to move the robot 1 to the charger 2.

Figure 16:
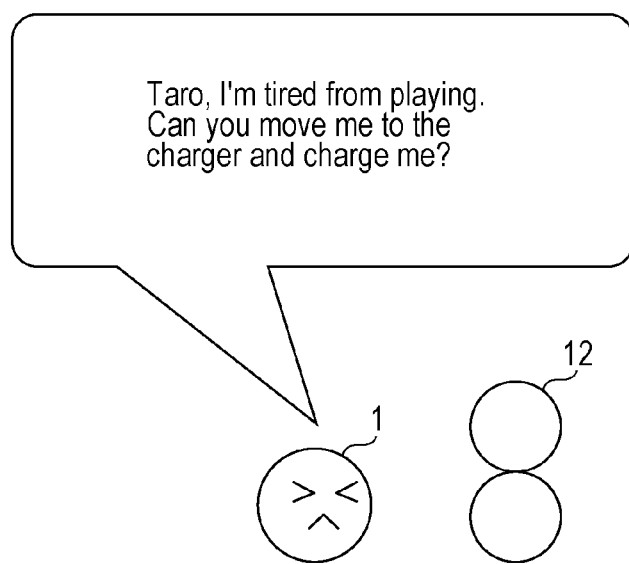
FIG. 16 is a diagram illustrating an example of speech information output from the speaker and display information displayed on the display unit when the robot requests the child to move the robot to the charger in step S319 in FIG. 13.

FIG. 16 is a diagram illustrating an example of speech information output from the speaker 113 and display information displayed on the display unit 111 when the robot 1 requests the child 12 to move the robot 1 to the charger 2 in step S319 in FIG. 13.

As illustrated in FIG. 16, the main controller 107 outputs, to the display information output controller 112, an action control command for turning on a plurality of light-emitting diodes located at the coordinates where a facial expression of making a request can be expressed, for example. The facial expression of making a request is, for example, an indication represented by two inequality signs aligned side by side with a predetermined gap therebetween (for example, "> <"). That is, the main controller 107 displays, on the display unit 111 and in the direction of the child 12, an indication symbolically representing an action of the robot 1 by using both eyes and a mouth. The indication represents an action in which the robot 1 is making a request. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

As illustrated in FIG. 16, the main controller 107 outputs, to the speech information output controller 114, an action control command for causing the robot 1 to output speech for requesting the child 12 to move the robot 1 to the charger 2. The speech is, for example, "Taro (the name of the child set by the child or parent in advance), I'm tired from playing. Can you move me to the charger and charge me?" That is, the main controller 107 outputs, from the speaker 113, speech for requesting the child 12 to move the robot 1 to the charger 2.

In this way, since the remaining amount of power of the power source 109 of the robot 1 is smaller than or equal to the first threshold (for example, 10%) although the duration of interaction between the robot 1 and the child 12 is longer than or equal to the second threshold (for example, 60 minutes), the robot 1 requests the child 12 to move the robot 1 to the charger 2, so that the robot 1 is charged to recover the power of the power source 109.

The facial expression and speech of the robot 1 described here are merely examples, and the embodiment is not limited thereto. The main controller 107 may output only an action control command for causing the robot 1 to output speech to the speech information output controller 114, and may cause the robot 1 to request, by using only the speech output from the speaker 113, the interaction partner to move the robot 1 to the charger 2.

The main controller 107 may output only an action control command for displaying a character string representing speech in the text format to the display information output controller 112, and may cause the robot 1 to request, by using only an input/output operation in the display unit 111, the interaction partner to move the robot 1 to the charger 2. Alternatively, the main controller 107 may cause the robot 1 to request, by using both speech and a character string representing the speech in the text format, the interaction partner to move the robot 1 to the charger 2. That is, the main controller 107 may display, on the display unit 111, an indication including a character string corresponding to speech.

Furthermore, when the robot 1 makes a request to the child 12, the main controller 107 may output, to the display information output controller 112, an action control command for displaying the facial expression of the robot 1 in the direction of the face of the child 12, so that the child 12 can easily determine an action of the robot 1. If the power source 109 of the robot 1 is not a rechargeable battery but is a primary battery, the main controller 107 may perform, for example, action control for requesting the child 12 to replace the battery of the robot 1.

After step S319, the process proceeds to step S306 in FIG. 11. Step S306 is the same as step S209 in FIG. 2, and thus the description thereof is not given here.

On the other hand, if it is determined in step S318 that the duration of interaction between the robot 1 and the child 12 is shorter than 60 minutes (NO in step S318), the process proceeds to step S320 in FIG. 13. Step S320 is the same as step S319 in FIG. 13, and thus the description thereof is not given here.

If the target that the robot 1 is interacting with includes only the child 12, if the remaining amount of power is smaller than or equal to the first threshold (for example, 10%), and if the amount of interaction is smaller than the second threshold (for example, 60 minutes), the main controller 107 causes the robot 1 to execute the second movement request process for requesting the child 12 to move the robot 1 to the charger 2.

After step S320, the process proceeds to step S308 in FIG. 11. Step S308 is the same as step S207 in FIG. 3, and thus the description thereof is not given here.

If it is determined that the remaining amount of power of the power source 109 of the robot 1 is larger than 10% (NO in step S317), the process proceeds to step S321 in FIG. 13. Step S321 is the same as step S213 in FIG. 2, and thus the description thereof is not given here.

Steps S322 and S323 in FIG. 13 are the same as steps S214 and S215 in FIGS. 2 and 3, and thus the description thereof is not given here.

If the target that the robot 1 is interacting with includes only the child 12, if the remaining amount of power is larger than the first threshold (for example, 10%), and if the amount of interaction is larger than or equal to the second threshold (for example, 60 minutes), the main controller 107 causes the robot 1 to execute an interaction stop process for stopping interacting with the child 12. The interaction stop process is the same as the above-described interaction stop process according to the first embodiment.

If the target that the robot 1 is interacting with includes only the child 12, if the remaining amount of power is larger than the first threshold (for example, 10%), and if the amount of interaction is smaller than the second threshold (for example, 60 minutes), the main controller 107 causes the robot 1 to execute a lead-child-to-interact process for leading the child 12 to continue interacting with the robot 1. The lead-child-to-interact process is the same as the above-described lead-child-to-interact process according to the first embodiment.

In steps S322 and S323, the remaining amount of power of the power source 109 of the robot 1 is not smaller than the first threshold (for example, 10%), and it is not necessary to charge the robot 1 to recover the power of the power source 109. Thus, the robot 1 does not request the interaction partner to move the robot 1 to the charger 2.

After step S322, the process proceeds to step S306 in FIG. 11. Step S306 is the same as step S209 in FIG. 2, and thus the description thereof is not given here.

After step S323, the process proceeds to step S308 in FIG. 11. Step S308 is the same as step S207 in FIG. 3, and thus the description thereof is not given here.

In the second action control process of the first embodiment, when the robot 1 is not being charged with power by the charger 2, the main controller 107 causes the robot 1 to execute any one of the first movement request process, the second movement request process, the asking process, the interaction request process, the interaction stop process, and the lead-child-to-interact process.

As described above, according to the first embodiment, the actions of the robot 1 with facial expressions and speech can be controlled based on the relationship between the robot 1 and a user as an interaction partner. For example, it is possible to prevent the robot 1 from playing too much with the child 12 while promoting play with the child 12 and reflecting the intention of the parent 11.

Second Embodiment

Figure 17:
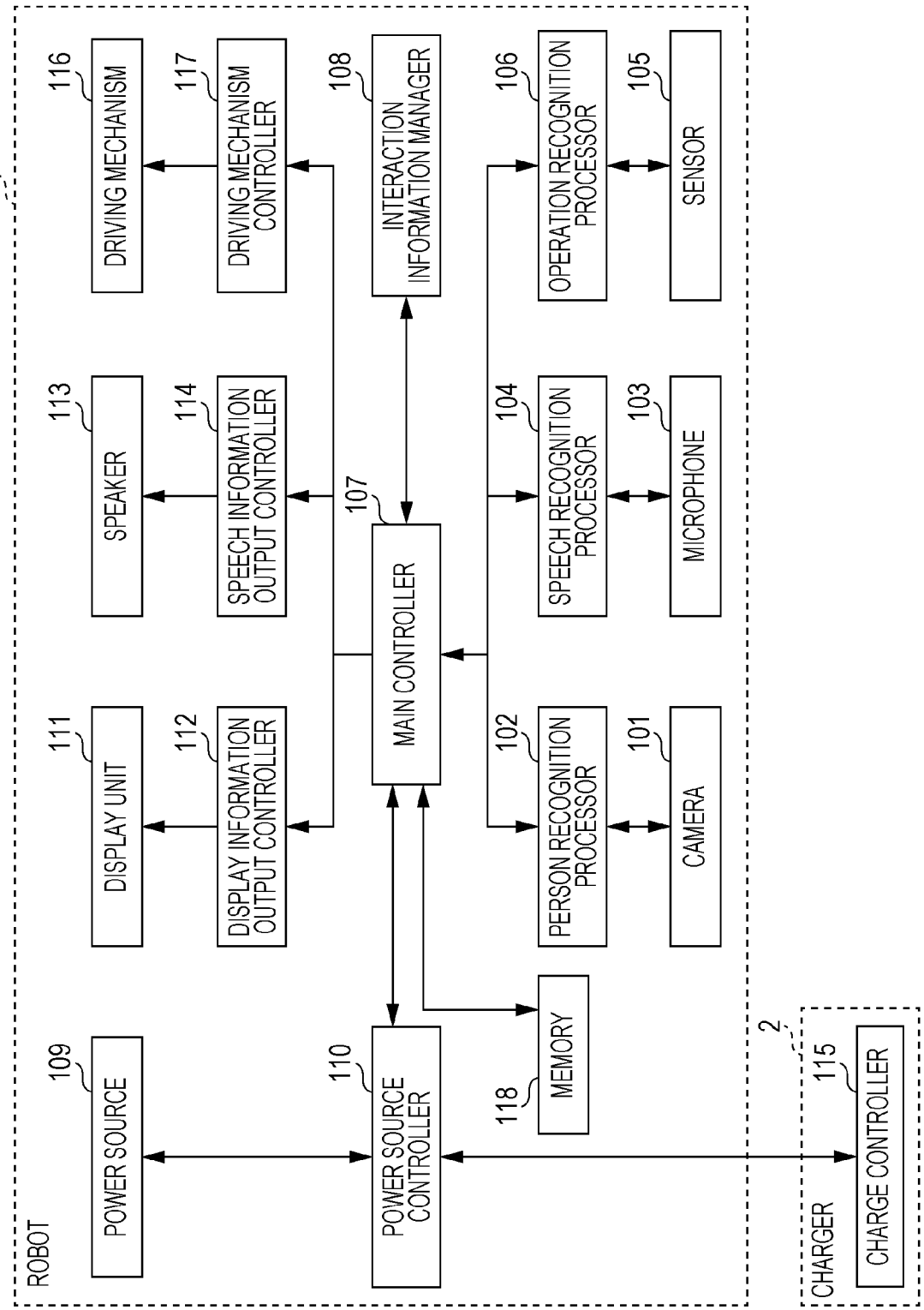
FIG. 17 is a block diagram illustrating the configurations of a robot and a charger according to a second embodiment of the present disclosure.

Next, a second embodiment will be described with reference to FIG. 17. FIG. 17 is a block diagram illustrating the configurations of the robot 1 and the charger 2 according to the second embodiment of the present disclosure. In FIG. 17, the same elements as those in FIG. 1 are denoted by the same reference numerals, and the description thereof is not given.

The robot 1 according to the second embodiment includes, unlike in the first embodiment, a driving mechanism 116 and a driving mechanism controller 117. In FIG. 17, the driving mechanism 116 is constituted by, for example, a plurality of motors, a frame, a gear, a driving belt, and a shaft, and drives the robot 1. Specifically, the driving mechanism 116 controls the plurality of motors, thereby moving the face and body of the robot 1.

The driving mechanism controller 117 outputs information for operating the driving mechanism 116 of the robot 1 to the driving mechanism 116 in accordance with an action control command received from the main controller 107. Accordingly, the driving mechanism 116 drives the robot 1.

In the second embodiment, the main controller 107 generates action control commands by using information obtained from the interaction information manager 108 and the power source controller 110, and transmits the action control commands to the display information output controller 112, the speech information output controller 114, and the driving mechanism controller 117. The details of an action control process for generating an action control command will be described below.

Figure 18:
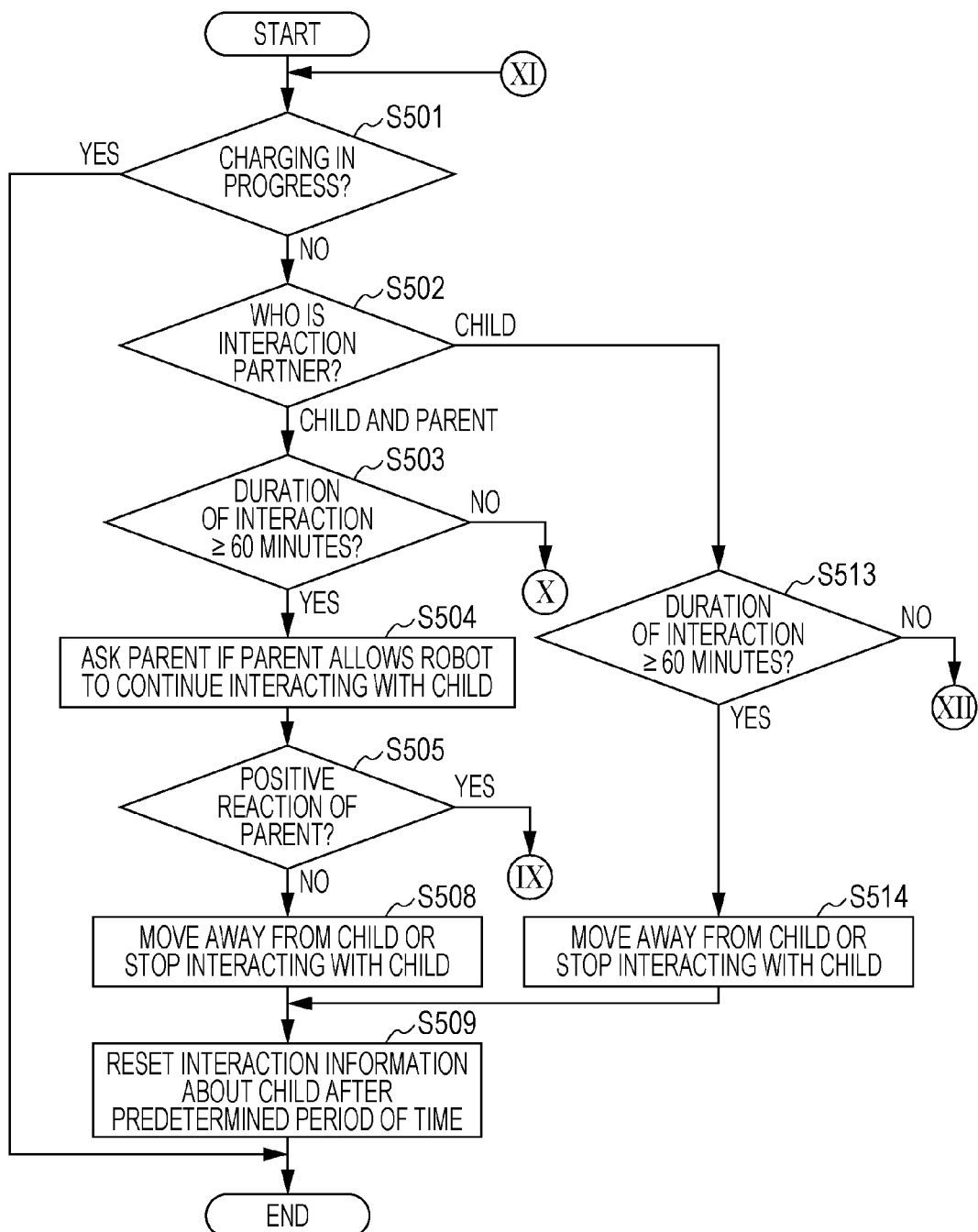
FIG. 18 is a first flowchart illustrating a first action control process in the robot according to the second embodiment of the present disclosure.
Figure 19:
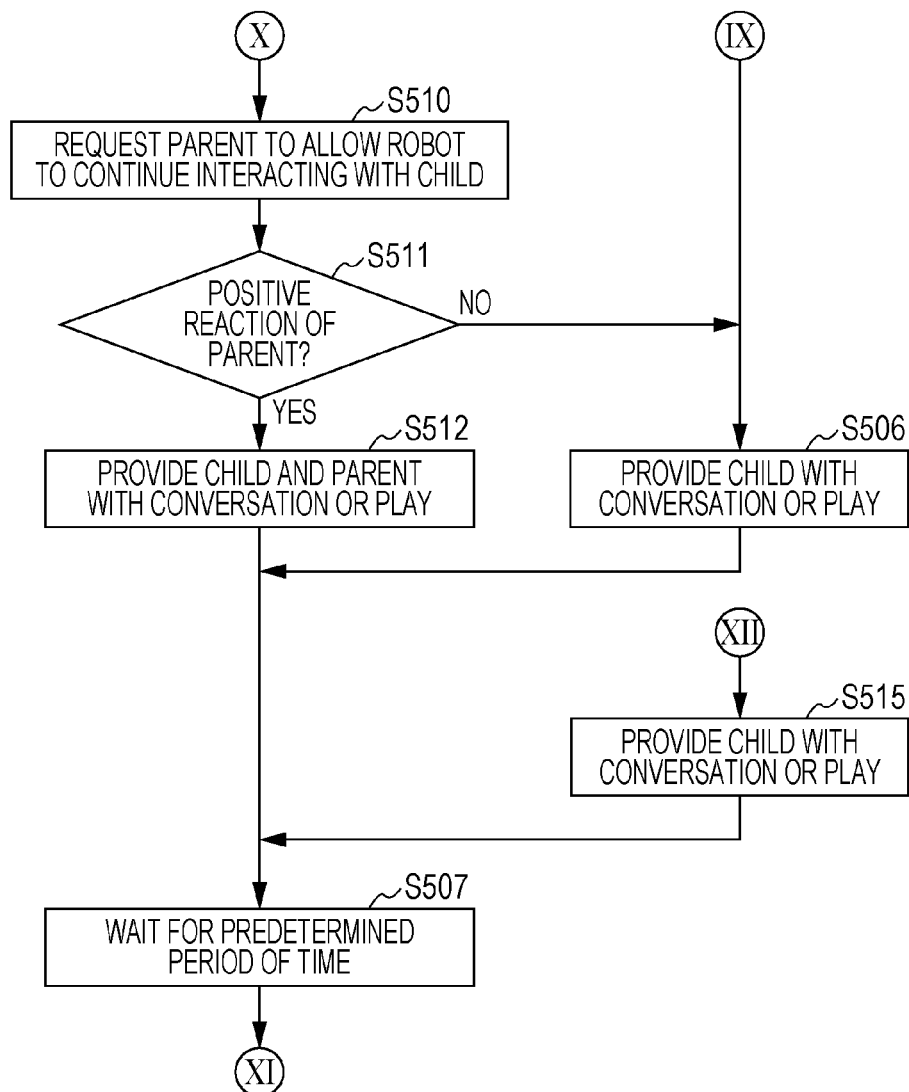
FIG. 19 is a second flowchart illustrating the first action control process in the robot according to the second embodiment of the present disclosure.

Next, a description will be given of a first action control process in the robot 1 according to the second embodiment of the present disclosure with reference to FIGS. 18 and 19. FIG. 18 is a first flowchart illustrating the first action control process in the robot 1 according to the second embodiment of the present disclosure, and FIG. 19 is a second flowchart illustrating the first action control process in the robot 1 according to the second embodiment of the present disclosure.

Steps S501 to S503 and step S513 in FIG. 18 are the same as steps S201 to S203 and step S213 in FIG. 2, and thus the description thereof is not given here.

If it is determined in step S503 in FIG. 18 that the duration of interaction between the robot 1 and the child 12 is longer than or equal to 60 minutes (YES in step S503), the main controller 107 asks the parent 11 if the parent 11 allows the robot 1 to continue interacting with the child 12 (step S504). If the target that the robot 1 is interacting with includes the child 12 and the parent 11 and if the amount of interaction is larger than or equal to the threshold (for example, 60 minutes), the main controller 107 causes the robot 1 to execute an asking process for asking the parent 11 if the parent 11 allows the robot 1 to continue interacting with the child 12.

Figure 20:
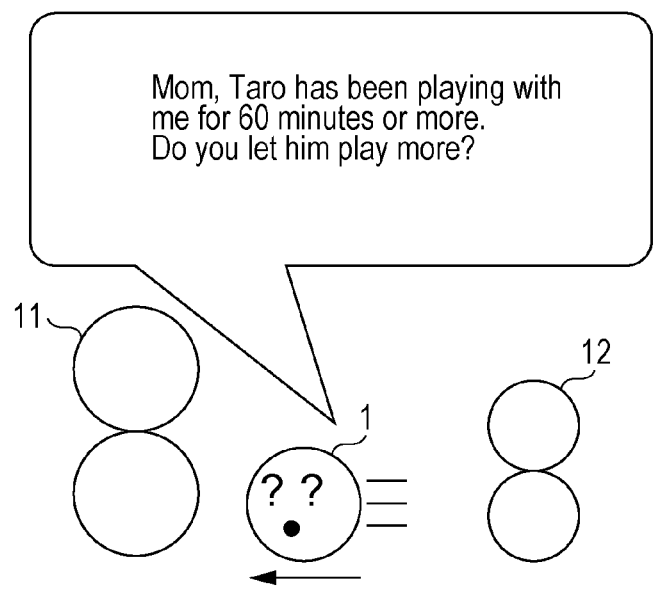
FIG. 20 is a diagram illustrating an example of speech information output from the speaker and display information displayed on the display unit at the time of asking the parent if the parent allows the robot to continue interacting with the child in step S504 in FIG. 18.

FIG. 20 is a diagram illustrating an example of speech information output from the speaker 113 and display information displayed on the display unit 111 at the time of asking the parent 11 if the parent 11 allows the robot 1 to continue interacting with the child 12 in step S504 in FIG. 18.

As illustrated in FIG. 20, the main controller 107 outputs, to the display information output controller 112, an action control command for turning on a plurality of light-emitting diodes located at the coordinates where a facial expression of asking a question can be expressed, for example. The facial expression of asking a question is, for example, a facial expression including two question marks aligned side by side with a predetermined gap therebetween (for example, "? ?"). That is, the main controller 107 displays, on the display unit 111, an indication symbolically representing an action of the robot 1 by using both eyes and a mouth. The indication represents an action in which the robot 1 is asking a question. The indication includes two question marks aligned side by side with a predetermined gap therebetween. The two question marks correspond to both eyes of the robot 1.

In addition, as illustrated in FIG. 20, the main controller 107 outputs, to the speech information output controller 114, an action control command for causing the robot 1 to output speech for asking the parent 11 if the parent 11 allows the robot 1 to continue interacting with the child 12. The speech is, for example, "Mom, Taro (the name of the child set by the child or parent in advance) has been playing with me for 60 minutes or more. Do you let him play more?" That is, the main controller 107 outputs, from the speaker 113, speech for asking the parent 11 if the parent 11 allows the robot 1 to continue interacting with the child 12.

Furthermore, the main controller 107 outputs, to the driving mechanism controller 117, an action control command for causing the robot 1 to move to a position that is a predetermined distance (for example, 50 cm) from the parent 11 and causing the robot 1 to move so that the display unit 111 is oriented toward the face of the parent 11. With this motion of the robot 1, the parent 11 can easily determine an action of the robot 1.

In this case, if the duration of interaction between the robot 1 and the child 12 is longer than or equal to the threshold (for example, 60 minutes) and if the parent 11 is with the child 12, it is determined whether or not the robot 1 is allowed to promote play with the child 12 while reflecting the latest intention of the parent 11 (whether or not to allow the robot 1 to continue interacting with the child 12).

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to ask, by using only the speech output from the speaker 113, the interaction partner if the interaction partner allows the robot 1 to continue the interaction.

The main controller 107 may output only an action control command for displaying a character string representing speech in the text format to the display information output controller 112, and may cause the robot 1 to ask, by using only an input/output operation in the display unit 111, the interaction partner if the interaction partner allows the robot 1 to continue the interaction. Alternatively, the main controller 107 may cause the robot 1 to ask, by using both speech and a character string representing the speech in the text format, the interaction partner if the interaction partner allows the robot 1 to continue the interaction.

After step S504, the process proceeds to step S505 in FIG. 5. Step S505 is the same as step S205 in FIG. 2, and thus the description thereof is not given here.

Subsequently, if it is determined that a positive reaction is received from the parent 11 in response to the action of the robot 1 of asking if the parent 11 allows the robot 1 to continue interacting with the child 12 (YES in step S505), the main controller 107 outputs an action control command for providing the child 12 with conversation or play to the display information output controller 112, the speech information output controller 114, and the driving mechanism controller 117 (step S506). If there is a positive response with speech "Yes, I let him continue playing" or if there is a positive response with a gesture of shaking the head vertically, for example, the main controller 107 determines that a positive reaction is received from the parent 11.

Specifically, the main controller 107 executes a program, which is installed in the memory 118, of a conversation constituted by a predetermined facial expression, speech, and motion (for example, self-introduction, greeting, checking of weather, checking of schedule, or chat targeted to the child 12) or play (for example, Shiritori, quiz, rock-paper-scissors, book reading, doll play, singing, hide-and-seek, or promotion of lifestyle behavior targeted to the child 12). In response to a reaction of the child 12, the main controller 107 outputs, to the display information output controller 112, the speech information output controller 114, and the driving mechanism controller 117, an action control command for turning on a plurality of light-emitting diodes located at the coordinates where a predetermined facial expression (for example, a smiling face, a surprised face, or a sad face) is expressed, an action control command for causing the robot 1 to output predetermined speech, and an action control command for causing the robot 1 to make a predetermined motion (a forward motion, a backward motion, a rightward motion, a leftward motion, an inclining motion, or a combination thereof), respectively. The predetermined speech is, for example, "Let's talk more with me," "Taro (the name of the child set by the child or parent in advance), let's play Shiritori with me," or "I want to play more with Taro (the name of the child set by the child or parent in advance)."

Figure 21:
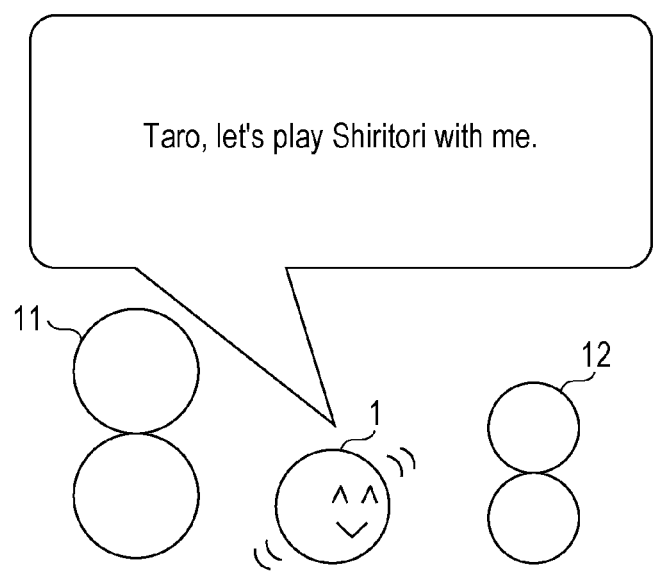
FIG. 21 is a diagram illustrating an example of speech information output from the speaker and display information displayed on the display unit at the time of providing the child with conversation or play in step S506 in FIG. 19.

FIG. 21 is a diagram illustrating an example of speech information output from the speaker 113 and display information displayed on the display unit 111 at the time of providing the child 12 with conversation or play in step S506 in FIG. 19.

As illustrated in FIG. 21, the main controller 107 executes a program that is stored in the memory 118 and corresponds to content with which the robot 1 plays Shiritori with the child 12, thereby outputting an action control command for causing the robot 1 to output speech corresponding to Shiritori. The speech is, for example, "Taro, let's play Shiritori with me."

In addition, the main controller 107 outputs, to the driving mechanism controller 117, an action control command for causing the robot 1 to move so that the display unit 111 is oriented toward the child 12.

In this case, if the duration of interaction between the robot 1 and the child 12 is longer than or equal to the threshold (for example, 60 minutes) and if the parent 11 is with the child 12, the robot 1 promotes interaction with the child 12 while reflecting the latest intention of the parent 11 (whether or not to allow the robot 1 to continue interacting with the child 12).

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to provide the interaction partner with conversation or play by using only the speech output from the speaker 113.

The main controller 107 may output only an action control command for displaying a character string representing speech in the text format to the display information output controller 112, and may cause the robot 1 to provide the interaction partner with conversation or play by using only an input/output operation in the display unit 111. Alternatively, the main controller 107 may cause the robot 1 to provide the interaction partner with conversation or play by using both speech and a character string representing the speech in the text format.

After step S506, the process proceeds to step S507 in FIG. 19. Step S507 is the same as step S207 in FIG. 3, and thus the description thereof is not given here.

On the other hand, if it is determined that a positive reaction is not received from the parent 11 in response to the action of the robot 1 of asking if the parent 11 allows the robot 1 to continue interacting with the child 12 (NO in step S505), the main controller 107 outputs an action control command for causing the robot 1 to move away from the child 12 or to stop interacting with the child 12 to the display information output controller 112, the speech information output controller 114, and the driving mechanism controller 117 (step S508). If there is a negative response with speech "No, I don't let him continue playing", if there is no response, or if there is a negative response with a gesture of shaking the head horizontally, for example, the main controller 107 determines that a positive reaction is not received from the parent 11.

Specifically, when the robot 1 moves away from the child 12, the main controller 107 outputs, to the display information output controller 112, an action control command for turning on a plurality of light-emitting diodes located at the coordinates where a displeased facial expression can be expressed, for example. The displeased facial expression is, for example, an indication represented by two inequality signs aligned side by side with a predetermined gap therebetween (for example, "> <"). When the robot 1 stops interacting with the child 12, the main controller 107 outputs, to the display information output controller 112, an action control command for turning on a plurality of light-emitting diodes located at the coordinates where a facial expression with the eyes closed can be expressed, for example. The facial expression with the eyes closed is, for example, an indication represented by two minus signs aligned side by side with a predetermined gap therebetween (for example, "- -").

In addition, when the robot 1 moves away from the child 12, the main controller 107 outputs, to the speech information output controller 114, an action control command for causing the robot 1 to output speech for notifying the child 12 that the robot 1 will move away from the child 12, for example, "I'm tired and need some rest" or "I have played too much and need some rest." In addition, when the robot 1 stops interacting with the child 12, the main controller 107 outputs, to the speech information output controller 114, an action control command for causing the robot 1 to output speech for notifying the child 12 that the robot 1 will fall asleep or for expressing a sleeping state, for example, "I'm getting sleepy" or "Zzz" (snoring noise).

Furthermore, when the robot 1 moves away from the child 12, the main controller 107 outputs, to the driving mechanism controller 117, an action control command for causing the robot 1 to move to a position that is a predetermined distance (for example, 300 cm) from the child 12 and causing the display unit 111 to be oriented in the direction opposite to the child 12. With this motion, the child 12 can easily determine that the robot 1 is going to move away. In addition, when the robot 1 stops interacting with the child 12, the main controller 107 outputs, to the driving mechanism controller 117, an action control command for causing the robot 1 to make a motion indicating that the robot 1 starts sleeping or that the robot 1 is sleeping, such as a motion of inclining the body forward, backward, leftward, or rightward at the position.

Figure 22:
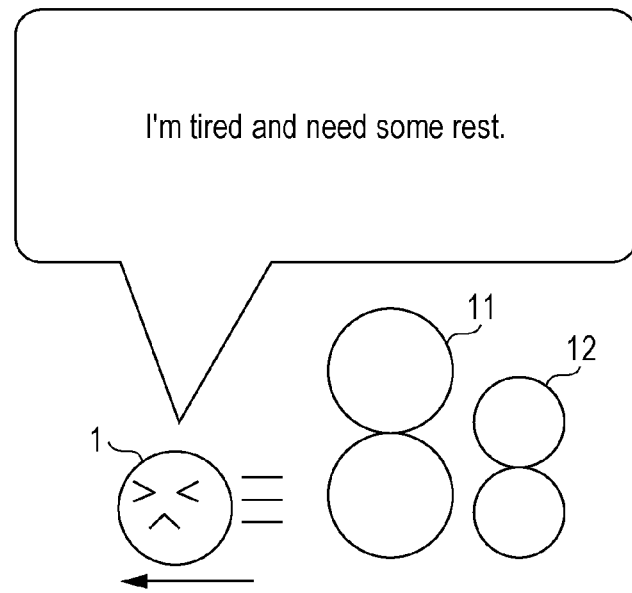
FIG. 22 is a diagram illustrating an example of speech information output from the speaker and display information displayed on the display unit at the time of moving away from the child in step S508 in FIG. 18.

FIG. 22 is a diagram illustrating an example of speech information output from the speaker 113 and display information displayed on the display unit 111 at the time of moving away from the child 12 in step S508 in FIG. 18.

As illustrated in FIG. 22, the main controller 107 causes the robot 1 to move away from the child 12. At this time, the main controller 107 displays an indication symbolically representing the state of the robot 1 by using both eyes and a mouth. The indication includes two inequality signs aligned side by side with a predetermined gap therebetween. Among the two inequality signs, a left-hand inequality sign opens leftward and a right-hand inequality sign opens rightward. The two inequality signs correspond to both eyes of the robot 1. In addition, the main controller 107 outputs, from the speaker 113, speech for notifying the parent 11 and the child 12 that the robot 1 will move away. The speech is, for example, "I'm tired and need some rest."

In this case, the duration of interaction between the robot 1 and the child 12 is longer than or equal to the threshold (for example, 60 minutes), and the parent 11 does not have an intention to allow the robot 1 to continue interacting with the child 12. Thus, the robot 1 suppresses the interaction with the child 12.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to notify, by using only the speech output from the speaker 113, the interaction partner that the robot 1 will move away from the child 12 or stop the interaction.

The main controller 107 may output only an action control command for displaying a character string representing speech in the text format to the display information output controller 112, and may cause the robot 1 to notify, by using only an input/output operation in the display unit 111, the interaction partner that the robot 1 will move away from the child 12 or stop the interaction. Alternatively, the main controller 107 may cause the robot 1 to notify, by using both speech and a character string representing the speech in the text format, the interaction partner that the robot 1 will move away from the child 12 or stop the interaction.

After step S508, the process proceeds to step S509 in FIG. 18. Step S509 is the same as step S209 in FIG. 2, and thus the description thereof is not given here.

On the other hand, if it is determined in step S503 in FIG. 18 that the duration of interaction between the robot 1 and the child 12 is shorter than 60 minutes (NO in step S503), the main controller 107 requests the parent 11 to allow the robot 1 to continue interacting with the child 12 (step S510).

Figure 23:
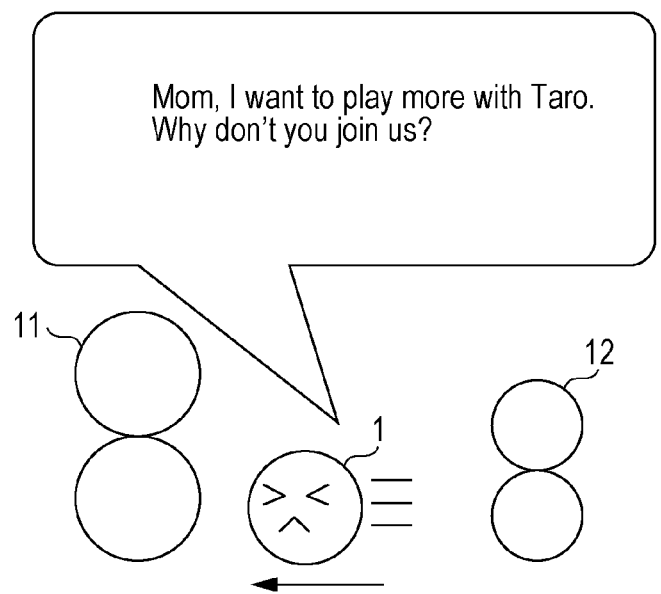
FIG. 23 is a diagram illustrating an example of speech information output from the speaker and display information displayed on the display unit at the time of requesting the continuation of the interaction with the child to the parent in step S510 in FIG. 19.

FIG. 23 is a diagram illustrating an example of speech information output from the speaker 113 and display information displayed on the display unit 111 at the time of requesting the continuation of the interaction with the child 12 to the parent 11 in step S510 in FIG. 19.

As illustrated in FIG. 23, the main controller 107 outputs, to the display information output controller 112, an action control command for turning on a plurality of light-emitting diodes located at the coordinates where a facial expression of making a request can be expressed, for example. The facial expression of making a request is, for example, an indication represented by two inequality signs aligned side by side with a predetermined gap therebetween (for example, "> <").

In addition, as illustrated in FIG. 23, the main controller 107 outputs, to the speech information output controller 114, an action control command for causing the robot 1 to output speech for requesting the continuation of the interaction between the robot 1 and the child 12. The speech is, for example, "Mom, I want to play more with Taro (the name of the child set by the child or parent in advance). Why don't you join us?"

Furthermore, the main controller 107 outputs, to the driving mechanism controller 117, an action control command for causing the robot 1 to move to a position that is a predetermined distance (for example, 50 cm) from the parent 11 and causing the display unit 111 to be oriented toward the parent 11. With this motion, the parent 11 can easily determine an action of the robot 1.

In this case, if the duration of interaction between the robot 1 and the child 12 does not exceed the threshold (for example, 60 minutes) and if the child 12 and the parent 11 are together as the interaction partner of the robot 1, the parent 11 joins the interaction, so that the robot 1 can further promote the interaction with the child 12.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to request, by using only the speech output from the speaker 113, the continuation of the interaction with the child 12 to the interaction partner.

The main controller 107 may output only an action control command for displaying a character string representing speech in the text format to the display information output controller 112, and may cause the robot 1 to request, by using only an input/output operation in the display unit 111, the continuation of the interaction with the child 12 to the interaction partner. Alternatively, the main controller 107 may cause the robot 1 to request, by using both speech and a character string representing the speech in the text format, the continuation of the interaction with the child 12 to the interaction partner.

After step S510, the process proceeds to step S511 in FIG. 19. Step S511 is the same as step S211 in FIG. 3, and thus the description thereof is not given here.

Subsequently, if it is determined that a positive reaction is received from the parent 11 in response to the action of the robot 1 of requesting the continuation of the interaction between the robot 1 and the child 12 (YES in step S511), the main controller 107 outputs an action control command for providing the child 12 and the parent 11 with conversation or play to the display information output controller 112, the speech information output controller 114, and the driving mechanism controller 117 (step S512). If there is a positive response with speech "Yes, I'll join you" or if there is a positive response with a gesture of shaking the head vertically, for example, the main controller 107 determines that a positive reaction is received from the parent 11.

Specifically, the main controller 107 executes a program, which is installed in the memory 118, of a conversation constituted by a predetermined facial expression, speech, and motion (for example, self-introduction, greeting, checking of weather, checking of schedule, or chat targeted to the child 12 and the parent 11) or play (for example, Shiritori, quiz, rock-paper-scissors, book reading, doll play, singing, hide-and-seek, or promotion of lifestyle behavior targeted to the child 12 and the parent 11). In response to reactions of the child 12 and the parent 11, the main controller 107 outputs, to the display information output controller 112, the speech information output controller 114, and the driving mechanism controller 117, an action control command for turning on a plurality of light-emitting diodes located at the coordinates where a predetermined facial expression (for example, a smiling face, a surprised face, or a sad face) is expressed, an action control command for causing the robot 1 to output predetermined speech, and an action control command for causing the robot 1 to make a predetermined motion (a forward motion, a backward motion, a rightward motion, a leftward motion, an inclining motion, or a combination thereof), respectively. The predetermined speech is, for example, "Go ask mom," "Taro (the name of the child set by the child or parent in advance), let's play Shiritori with mom and me," or "I want to play more with Taro (the name of the child set by the child or parent in advance) and mom."

Figure 24:
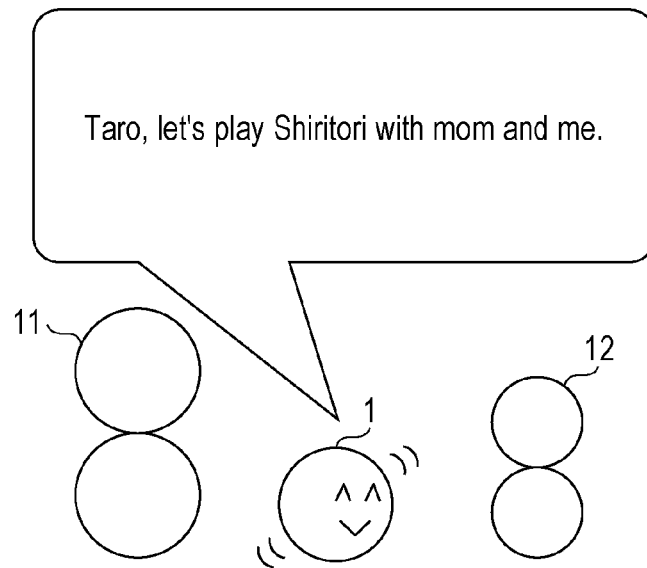
FIG. 24 is a diagram illustrating an example of speech information output from the speaker and display information displayed on the display unit at the time of providing the child and the parent with conversation or play in step S512 in FIG. 19.

FIG. 24 is a diagram illustrating an example of speech information output from the speaker 113 and display information displayed on the display unit 111 at the time of providing the child 12 and the parent 11 with conversation or play in step S512 in FIG. 19.

As illustrated in FIG. 24, the main controller 107 executes a program that is stored in the memory 118 and corresponds to content with which the robot 1 plays Shiritori with the child 12 and the parent 11, thereby outputting an action control command for causing the robot 1 to output speech corresponding to Shiritori. The speech is, for example, "Taro, let's play Shiritori with mom and me."

In addition, the main controller 107 outputs, to the display information output controller 112, an action control command for displaying on the display unit 111 an indication symbolically representing an action of the robot 1 by using both eyes and a mouth. Furthermore, the main controller 107 outputs, to the driving mechanism controller 117, an action control command for orienting the display unit 111 toward the child 12.

In this case, the duration of interaction between the robot 1 and the child 12 does not exceed the threshold (for example, 60 minutes), the child 12 and the parent 11 are together as the interaction partner of the robot 1, and the parent 11 joins the interaction, so that the robot 1 provides the child 12 and the parent 11 with conversation or play and that the robot 1 further promotes the interaction with the child 12 in which the parent 11 joins.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to provide the interaction partner with conversation or play by using only the speech output from the speaker 113.

The main controller 107 may output only an action control command for displaying a character string representing speech in the text format to the display information output controller 112, and may cause the robot 1 to provide the interaction partner with conversation or play by using only an input/output operation in the display unit 111. Alternatively, the main controller 107 may cause the robot 1 to provide the interaction partner with conversation or play by using both speech and a character string representing the speech in the text format.

The difference between the conversation or play provided by the robot 1 to the child 12 and the parent 11 and the conversation or play provided by the robot 1 to only the child 12 is, for example, whether or not the conversation or play has an element in which the robot 1 allows the parent 11 to join. The element in which the robot 1 allows the parent 11 to join is, for example, talking to the parent 11 by the robot 1, requesting to the parent 11 by the robot 1, talking to the parent 11 by the robot 1 via the child 12, or requesting to the parent 11 by the robot 1 via the child 12.

After step S512, the process proceeds to step S507 in FIG. 19. Step S507 is the same as step S207 in FIG. 3, and thus the description thereof is not given here.

On the other hand, if it is determined that a positive reaction is not received from the parent 11 in response to the action of the robot 1 of requesting the continuation of the interaction between the robot 1 and the child 12 (NO in step S511), the main controller 107 outputs an action control command for providing the child 12 with conversation or play to the display information output controller 112, the speech information output controller 114, and the driving mechanism controller 117 (step S506). If there is a negative response with speech "No, I can't join you", if there is no response, or if there is a negative response with a gesture of shaking the head horizontally, for example, the main controller 107 determines that a positive reaction is not received from the parent 11.

Specifically, the main controller 107 executes a program, which is installed in the memory 118, of a conversation constituted by a predetermined facial expression, speech, and motion (for example, self-introduction, greeting, checking of weather, checking of schedule, or chat targeted to the child 12) or play (for example, Shiritori, quiz, rock-paper-scissors, book reading, doll play, singing, hide-and-seek, or promotion of lifestyle behavior targeted to the child 12). In response to a reaction of the child 12, the main controller 107 outputs, to the display information output controller 112, the speech information output controller 114, and the driving mechanism controller 117, an action control command for turning on a plurality of light-emitting diodes located at the coordinates where a predetermined facial expression (for example, a smiling face, a surprised face, or a sad face) is expressed, an action control command for causing the robot 1 to output predetermined speech, and an action control command for causing the robot 1 to make a predetermined motion (a forward motion, a backward motion, a rightward motion, a leftward motion, an inclining motion, or a combination thereof), respectively. The predetermined speech is, for example, "Let's talk more with me," "Taro (the name of the child set by the child or parent in advance), let's play Shiritori with me," or "I want to play more with Taro (the name of the child set by the child or parent in advance)."

For example, as illustrated in FIG. 21, the main controller 107 executes a program that is stored in the memory 118 and corresponds to content with which the robot 1 plays Shiritori with the child 12, thereby outputting an action control command for causing the robot 1 to output speech corresponding to Shiritori. The speech is, for example, "Taro, let's play Shiritori with me."

In addition, the main controller 107 outputs, to the driving mechanism controller 117, an action control command for causing the robot 1 to move so that the display unit 111 is oriented toward the child 12.

In this case, the duration of interaction between the robot 1 and the child 12 does not exceed the threshold (for example, 60 minutes), the child 12 and the parent 11 are together as the interaction partner of the robot 1, and the parent 11 does not join the interaction. Accordingly, the robot 1 provides only the child 12 with conversation or play, and the robot 1 promotes the interaction with the child 12 without help from the parent 11.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to provide the interaction partner with conversation or play by using only the speech output from the speaker 113.

The main controller 107 may output only an action control command for displaying a character string representing speech in the text format to the display information output controller 112, and may cause the robot 1 to provide the interaction partner with conversation or play by using only an input/output operation in the display unit 111. Alternatively, the main controller 107 may cause the robot 1 to provide the interaction partner with conversation or play by using both speech and a character string representing the speech in the text format.

After step S506, the process proceeds to step S507 in FIG. 19. Step S507 is the same as step S207 in FIG. 3, and thus the description thereof is not given here.

If it is determined in step S513 in FIG. 18 that the duration of interaction between the robot 1 and the child 12 is longer than or equal to 60 minutes (YES in step S513), the main controller 107 outputs an action control command for causing the robot 1 to move away from the child 12 or to stop interacting with the child 12 to the display information output controller 112, the speech information output controller 114, and the driving mechanism controller 117 (step S514).

Specifically, when the robot 1 moves away from the child 12, the main controller 107 outputs, to the display information output controller 112, an action control command for turning on a plurality of light-emitting diodes located at the coordinates where a displeased facial expression can be expressed, for example. The displeased facial expression is, for example, an indication represented by two inequality signs aligned side by side with a predetermined gap therebetween (for example, "> <"). When the robot 1 stops interacting with the child 12, the main controller 107 outputs, to the display information output controller 112, an action control command for turning on a plurality of light-emitting diodes located at the coordinates where a facial expression with the eyes closed can be expressed. The facial expression with the eyes closed is, for example, an indication represented by two minus signs aligned side by side with a predetermined gap therebetween (for example, "- -").

In addition, when the robot 1 moves away from the child 12, the main controller 107 outputs, to the speech information output controller 114, an action control command for causing the robot 1 to output speech for notifying the child 12 that the robot 1 will move away from the child 12, for example, "I'm tired and need some rest" or "I have played too much and need some rest." In addition, when the robot 1 stops interacting with the child 12, the main controller 107 outputs, to the speech information output controller 114, an action control command for causing the robot 1 to output speech for notifying the child 12 that the robot 1 will fall asleep or for expressing a sleeping state, for example, "I'm getting sleepy" or "Zzz" (snoring noise).

Furthermore, when the robot 1 moves away from the child 12, the main controller 107 outputs, to the driving mechanism controller 117, an action control command for causing the robot 1 to move to a position that is a predetermined distance (for example, 300 cm) from the child 12 and causing the display unit 111 to be oriented in the direction opposite to the child 12. With this motion, the child 12 can easily determine that the robot 1 is going to move away. In addition, when the robot 1 stops interacting with the child 12, the main controller 107 outputs, to the driving mechanism controller 117, an action control command for causing the robot 1 to make a motion indicating that the robot 1 starts sleeping or that the robot 1 is sleeping, such as a motion of inclining the body forward, backward, leftward, or rightward at the position.

Figure 25:
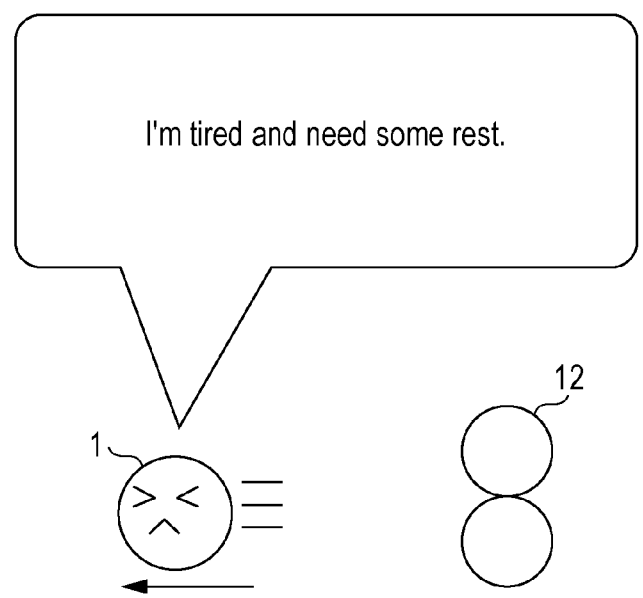
FIG. 25 is a diagram illustrating an example of speech information output from the speaker and display information displayed on the display unit at the time of moving away from the child in step S514 in FIG. 18.

FIG. 25 is a diagram illustrating an example of speech information output from the speaker 113 and display information displayed on the display unit 111 at the time of moving away from the child 12 in step S514 in FIG. 18.

As illustrated in FIG. 25, the main controller 107 causes the robot 1 to move away from the child 12. At this time, the main controller 107 displays an indication symbolically representing the state of the robot 1 by using both eyes and a mouth. The indication includes two inequality signs aligned side by side with a predetermined gap therebetween. Among the two inequality signs, a left-hand inequality sign opens leftward and a right-hand inequality sign opens rightward. The two inequality signs correspond to both eyes of the robot 1. In addition, the main controller 107 outputs, from the speaker 113, speech for notifying the child 12 that the robot 1 will move away. The speech is, for example, "I'm tired and need some rest."

In this case, the duration of interaction between the robot 1 and the child 12 is longer than or equal to the threshold (for example, 60 minutes), and thus the robot 1 suppresses the interaction with the child 12.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to notify, by using only the speech output from the speaker 113, the interaction partner that the robot 1 will move away from the child 12 or stop the interaction.

The main controller 107 may output only an action control command for displaying a character string representing speech in the text format to the display information output controller 112, and may cause the robot 1 to notify, by using only an input/output operation in the display unit 111, the interaction partner that the robot 1 will move away from the child 12 or stop the interaction. Alternatively, the main controller 107 may cause the robot 1 to notify, by using both speech and a character string representing the speech in the text format, the interaction partner that the robot 1 will move away from the child 12 or stop the interaction.

After step S514, the process proceeds to step S509 in FIG. 18. Step S509 is the same as step S209 in FIG. 2, and thus the description thereof is not given here.

On the other hand, if it is determined in step S513 in FIG. 18 that the duration of interaction between the robot 1 and the child 12 is shorter than 60 minutes (NO in step S513), the main controller 107 outputs an action control command for providing the child 12 with conversation or play to the display information output controller 112, the speech information output controller 114, and the driving mechanism controller 117 (step S515).

Specifically, the main controller 107 executes a program, which is installed in the memory 118, of a conversation constituted by a predetermined facial expression, speech, and motion (for example, self-introduction, greeting, checking of weather, checking of schedule, or chat targeted to the child 12) or play (for example, Shiritori, quiz, rock-paper-scissors, book reading, doll play, singing, hide-and-seek, or promotion of lifestyle behavior targeted to the child 12). In response to a reaction of the child 12, the main controller 107 outputs, to the display information output controller 112, the speech information output controller 114, and the driving mechanism controller 117, an action control command for turning on a plurality of light-emitting diodes located at the coordinates where a predetermined facial expression (for example, a smiling face, a surprised face, or a sad face) is expressed, an action control command for causing the robot 1 to output predetermined speech, and an action control command for causing the robot 1 to make a predetermined motion (a forward motion, a backward motion, a rightward motion, a leftward motion, an inclining motion, or a combination thereof), respectively. The predetermined speech is, for example, "Let's talk more with me," "Taro (the name of the child set by the child or parent in advance), let's play Shiritori with me," or "I want to play more with Taro (the name of the child set by the child or parent in advance)."

Figure 26:
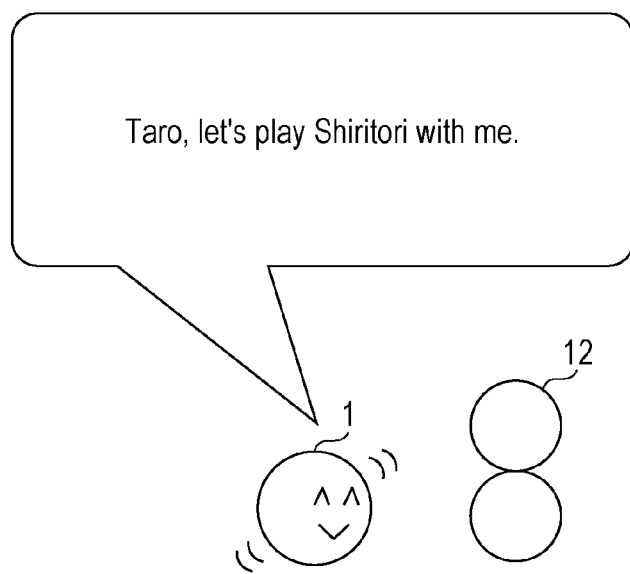
FIG. 26 is a diagram illustrating an example of speech information output from the speaker and display information displayed on the display unit at the time of providing the child with conversation or play in step S515 in FIG. 19.

FIG. 26 is a diagram illustrating an example of speech information output from the speaker 113 and display information displayed on the display unit 111 at the time of providing the child 12 with conversation or play in step S515 in FIG. 19.

As illustrated in FIG. 26, the main controller 107 executes a program that is stored in the memory 118 and corresponds to content with which the robot 1 plays Shiritori with the child 12, thereby outputting an action control command for causing the robot 1 to output speech corresponding to Shiritori. The speech is, for example, "Taro, let's play Shiritori with me."

In addition, the main controller 107 outputs, to the driving mechanism controller 117, an action control command for causing the robot 1 to move so that the display unit 111 is oriented toward the child 12.

In this case, the duration of interaction between the robot 1 and the child 12 does not exceed the threshold (for example, 60 minutes), and thus the robot 1 promotes the interaction with the child 12.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to provide the interaction partner with conversation or play by using only the speech output from the speaker 113.

The main controller 107 may output only an action control command for displaying a character string representing speech in the text format to the display information output controller 112, and may cause the robot 1 to provide the interaction partner with conversation or play by using only an input/output operation in the display unit 111. Alternatively, the main controller 107 may cause the robot 1 to provide the interaction partner with conversation or play by using both speech and a character string representing the speech in the text format.

After step S515, the process proceeds to step S507 in FIG. 19. Step S507 is the same as step S207 in FIG. 3, and thus the description thereof is not given here.

In the second embodiment, the main controller 107 obtains only a charging flag indicating the power state of the power source 109 from the power source controller 110, and generates an action control command by using the information received from the interaction information manager 108 and the power source controller 110. Alternatively, the main controller 107 may obtain information representing a remaining amount of power from the power source controller 110 in addition to the charging flag indicating the power state of the power source 109, and may generate an action control command by using the information obtained from the interaction information manager 108 and the power source controller 110.

Figure 27:
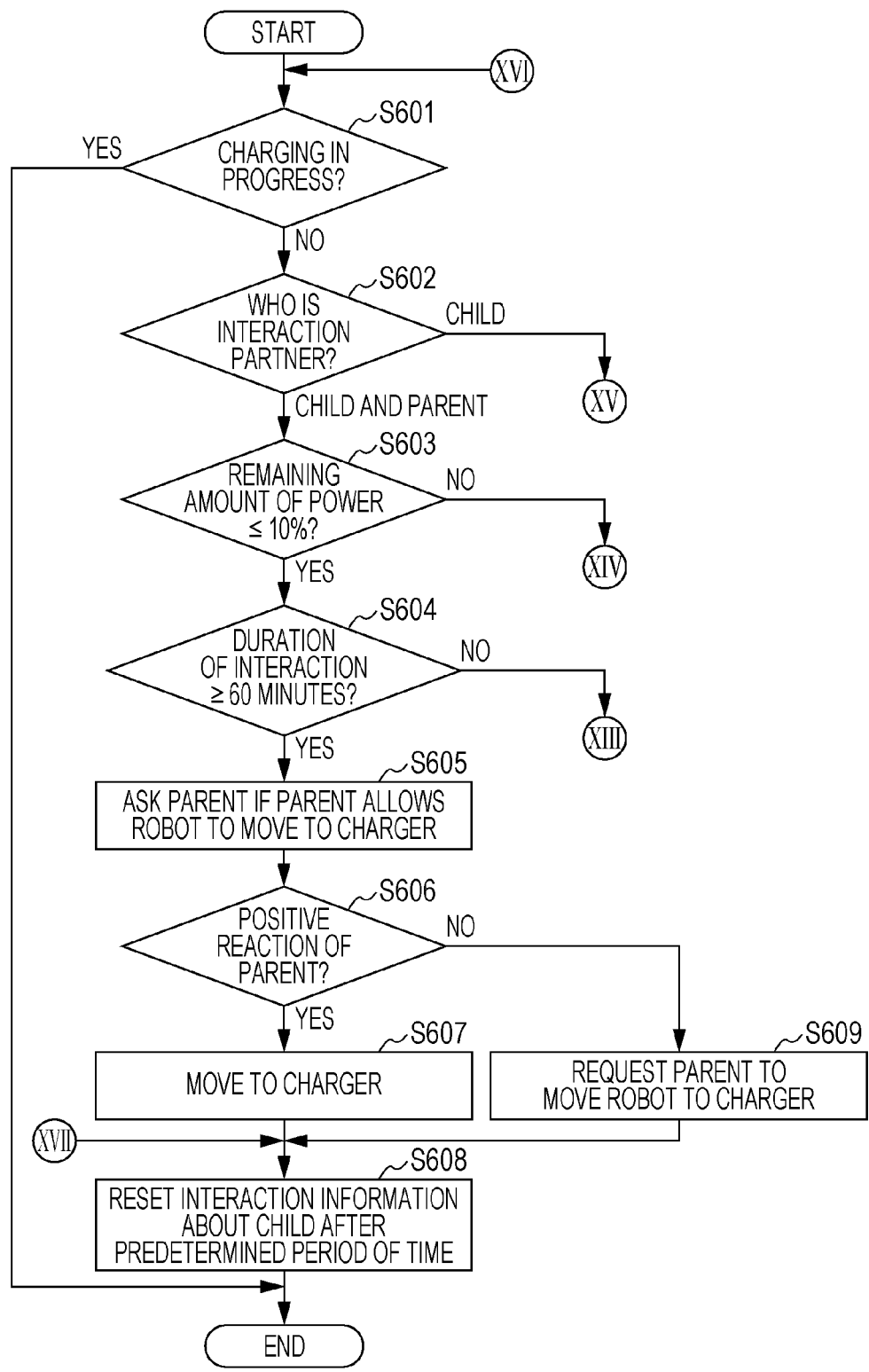
FIG. 27 is a first flowchart illustrating a second action control process in the robot according to the second embodiment of the present disclosure.
Figure 28:
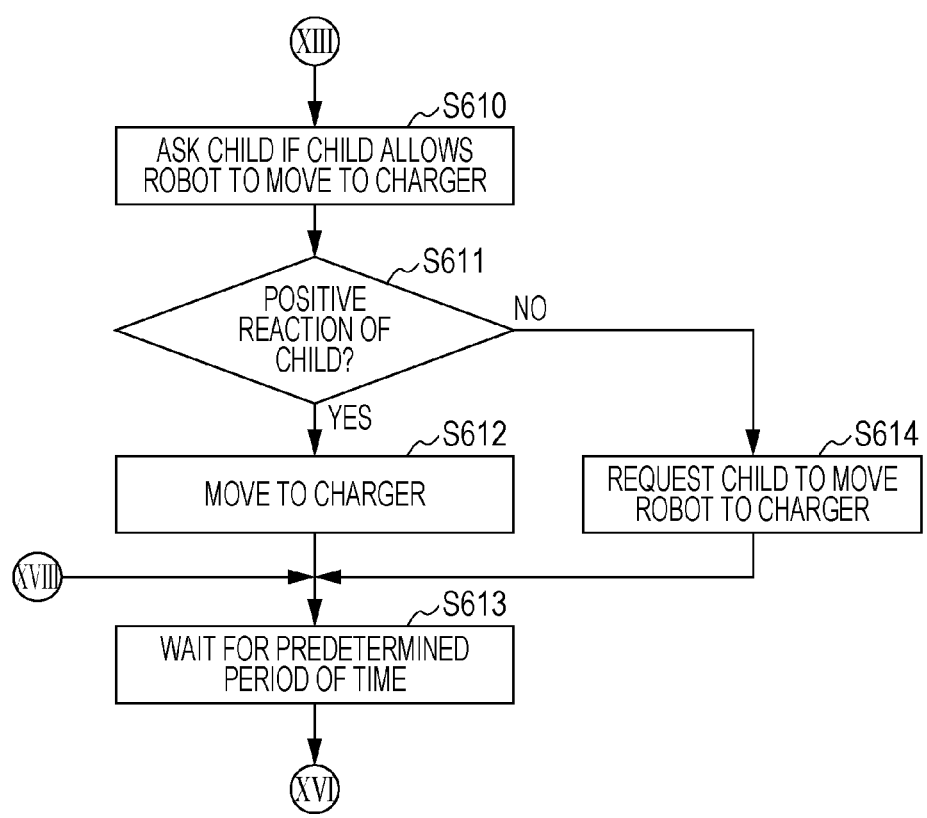
FIG. 28 is a second flowchart illustrating the second action control process in the robot according to the second embodiment of the present disclosure.

Next, a description will be given of a second action control process in the robot 1 according to the second embodiment of the present disclosure with reference to FIGS. 27 to 30. FIG. 27 is a first flowchart illustrating the second action control process in the robot 1 according to the second embodiment of the present disclosure, FIG. 28 is a second flowchart illustrating the second action control process in the robot 1 according to the second embodiment of the present disclosure, FIG. 29 is a third flowchart illustrating the second action control process in the robot 1 according to the second embodiment of the present disclosure, and FIG. 30 is a fourth flowchart illustrating the second action control process in the robot 1 according to the second embodiment of the present disclosure.

Figure 29:
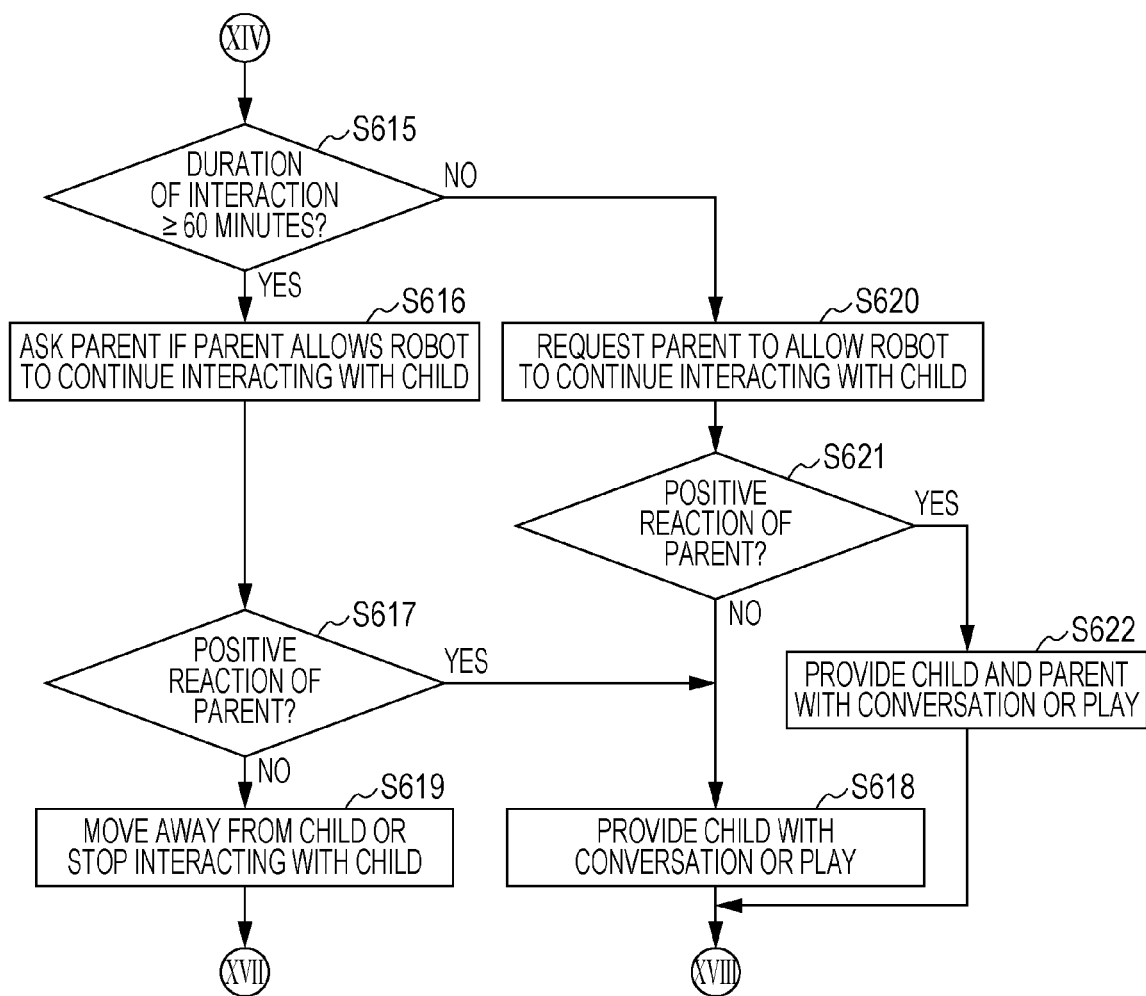
FIG. 29 is a third flowchart illustrating the second action control process in the robot according to the second embodiment of the present disclosure.
Figure 30:
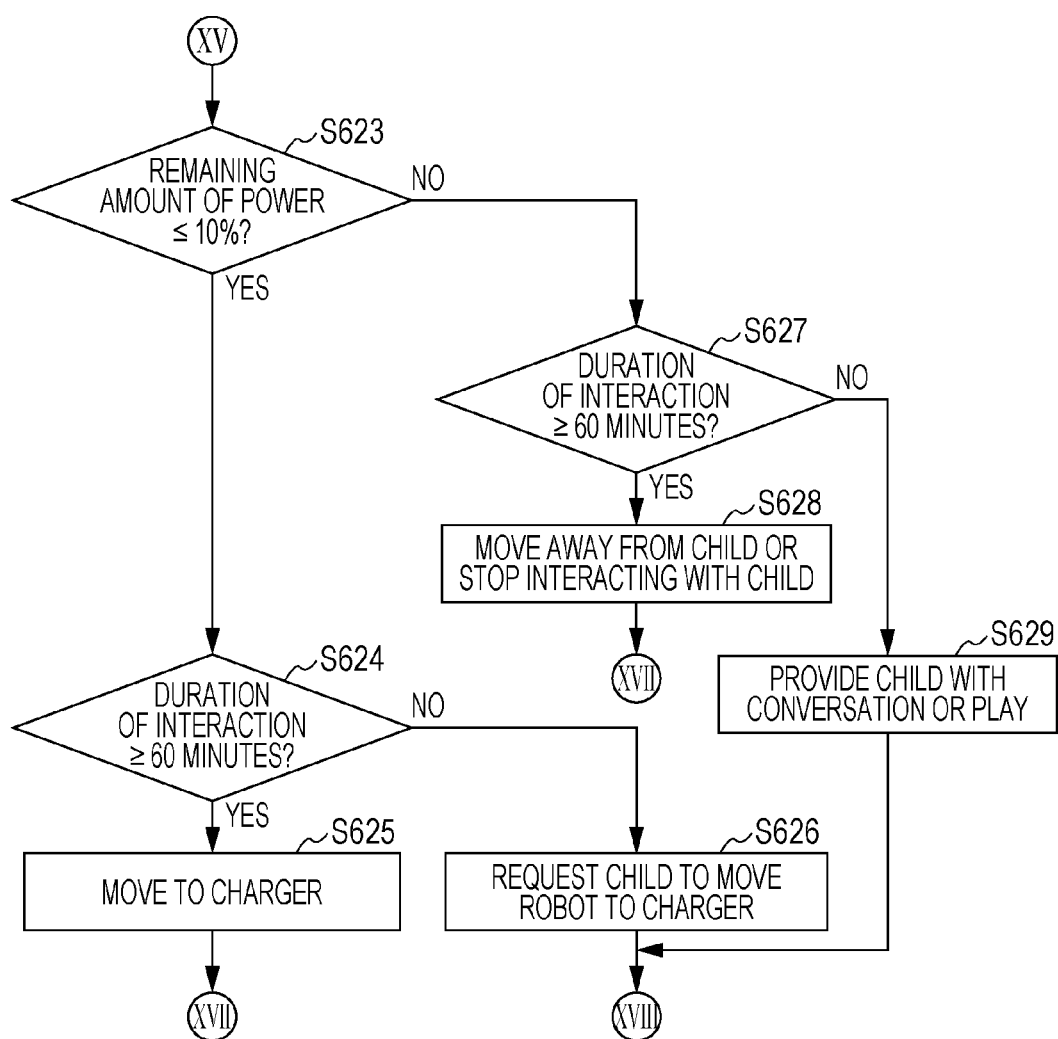
FIG. 30 is a fourth flowchart illustrating the second action control process in the robot according to the second embodiment of the present disclosure.

Steps S601 to S604 in FIG. 27 and step S615 in FIG. 29 are the same as steps S301 to S304 in FIG. 11 and step S309 in FIG. 12, and thus the description thereof is not given here.

If it is determined in step S604 in FIG. 27 that the duration of interaction between the robot 1 and the child 12 is longer than or equal to 60 minutes (YES in step S604), the main controller 107 asks the parent 11 if the parent 11 allows the robot 1 to move to the charger 2 (step S605).

If the target that the robot 1 is interacting with includes the child 12 and the parent 11, if the remaining amount of power is smaller than or equal to the first threshold (for example, 10%), and if the amount of interaction is larger than or equal to the second threshold (for example, 60 minutes), the main controller 107 causes the robot 1 to execute a first movement asking process for asking the parent 11 if the parent 11 allows the robot 1 to move to the charger 2.

Figure 31:
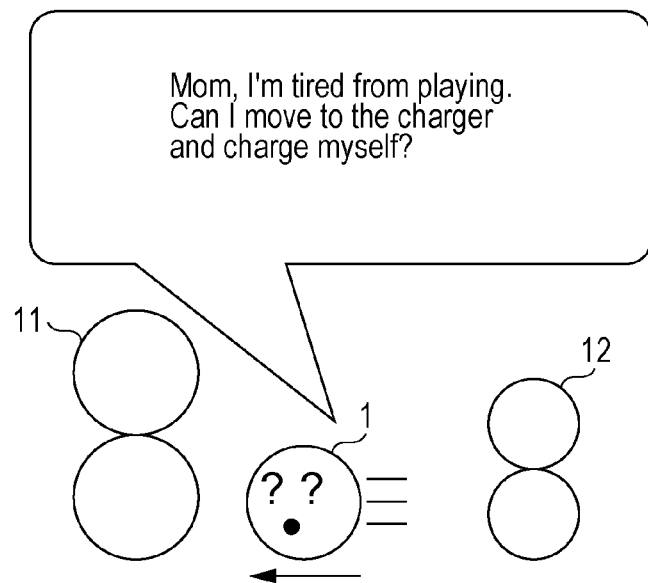
FIG. 31 is a diagram illustrating an example of speech information output from the speaker and display information displayed on the display unit when the robot asks the parent if the parent allows the robot to move to the charger in step S605 in FIG. 27.

FIG. 31 is a diagram illustrating an example of speech information output from the speaker 113 and display information displayed on the display unit 111 when the robot 1 asks the parent 11 if the parent 11 allows the robot 1 to move to the charger 2 in step S605 in FIG. 27.

As illustrated in FIG. 31, the main controller 107 outputs, to the display information output controller 112, an action control command for turning on a plurality of light-emitting diodes located at the coordinates where a facial expression of asking a question can be expressed, for example. The facial expression of asking a question is, for example, a facial expression including two question marks aligned side by side with a predetermined gap therebetween (for example, "? ?"). That is, the main controller 107 displays, on the display unit 111, an indication symbolically representing an action of the robot 1 by using both eyes and a mouth. The indication represents an action in which the robot 1 is asking a question. The indication includes two question marks aligned side by side with a predetermined gap therebetween. The two question marks correspond to both eyes of the robot 1.

As illustrated in FIG. 31, the main controller 107 outputs, to the speech information output controller 114, an action control command for causing the robot 1 to output speech for asking the parent 11 if the parent 11 allows the robot 1 to move to the charger 2, for example, "Mom, I'm tired from playing. Can I move to the charger and charge myself?" That is, the main controller 107 outputs, from the speaker 113, speech for asking the parent 11 if the parent 11 allows the robot 1 to move to the charger 2.

Furthermore, the main controller 107 outputs, to the driving mechanism controller 117, an action control command for causing the robot 1 to move to a position that is a predetermined distance (for example, 50 cm) from the parent 11 and causing the display unit 111 to be oriented toward the parent 11. With this motion, the parent 11 can easily determine an action of the robot 1.

In this way, if the duration of interaction between the robot 1 and the child 12 is longer than or equal to the second threshold (for example, 60 minutes), if the remaining amount of power of the power source 109 of the robot 1 is smaller than or equal to the first threshold (for example, 10%), and if the child 12 and the parent 11 are together as the interaction partner of the robot 1, the robot 1 asks the parent 11 if the parent 11 allows the robot 1 to move to the charger 2. Accordingly, the parent 11 is notified that the power of the power source 109 needs to be recovered by charging the robot 1. In addition, by asking the parent 11, the interaction between the robot 1 and the child 12 is suppressed.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to ask, by using only the speech output from the speaker 113, the interaction partner if the interaction partner allows the robot 1 to move to the charger 2.

The main controller 107 may output only an action control command for displaying a character string representing speech in the text format to the display information output controller 112, and may cause the robot 1 to ask, by using only an input/output operation in the display unit 111, the interaction partner if the interaction partner allows the robot 1 to move to the charger 2. Alternatively, the main controller 107 may cause the robot 1 to ask, by using both speech and a character string representing the speech in the text format, the interaction partner if the interaction partner allows the robot 1 to move to the charger 2. That is, the main controller 107 may display, on the display unit 111, an indication including a character string corresponding to speech.

If the power source 109 of the robot 1 is not a rechargeable battery but is a primary battery, the main controller 107 may perform, for example, action control for requesting the parent 11 to replace the battery of the robot 1.

Subsequently, the main controller 107 determines whether or not a positive reaction is received from the parent 11 within a predetermined period of time (for example, 1 minute) in response to the action of the robot 1 of asking if the parent 11 allows the robot 1 to move to the charger 2 (step S606). If there is a positive response with speech, for example, "Yes, you can move to the charger" or if there is a positive response with a gesture of shaking the head vertically, the main controller 107 determines that a positive reaction is received from the parent 11.

If it is determined that a positive reaction is received from the parent 11 in response to the action of the robot 1 of asking if the parent 11 allows the robot 1 to move to the charger 2 (YES in step S606), the main controller 107 outputs an action control command for causing the robot 1 to move to the charger 2 to the display information output controller 112, the speech information output controller 114, and the driving mechanism controller 117 (step S607).

After causing the robot 1 to execute the first movement asking process, the main controller 107 determines, based on an obtained sound or image, whether or not the parent 11 has a positive reaction. If the main controller 107 determines that the parent 11 has a positive reaction, the main controller 107 causes the robot 1 to execute a movement process for moving to the charger 2.

After causing the robot 1 to execute the first movement asking process, the main controller 107 may determine whether an obtained sound includes an utterance of the parent 11 including a positive word, whether an obtained sound includes an utterance of the parent 11 including a negative word, or whether an obtained sound includes no utterance of the parent 11. If the main controller 107 determines that an obtained sound includes an utterance of the parent 11 including a positive word, the main controller 107 may determine that the parent 11 has a positive reaction.

In addition, after causing the robot 1 to execute the first movement asking process, the main controller 107 may determine, based on an obtained image, whether the parent 11 is shaking the head vertically, whether the parent 11 is shaking the head horizontally, or whether the parent 11 has no reaction. If the main controller 107 determines that the parent 11 is shaking the head vertically, the main controller 107 may determine that the parent 11 has a positive reaction.

Figure 32:
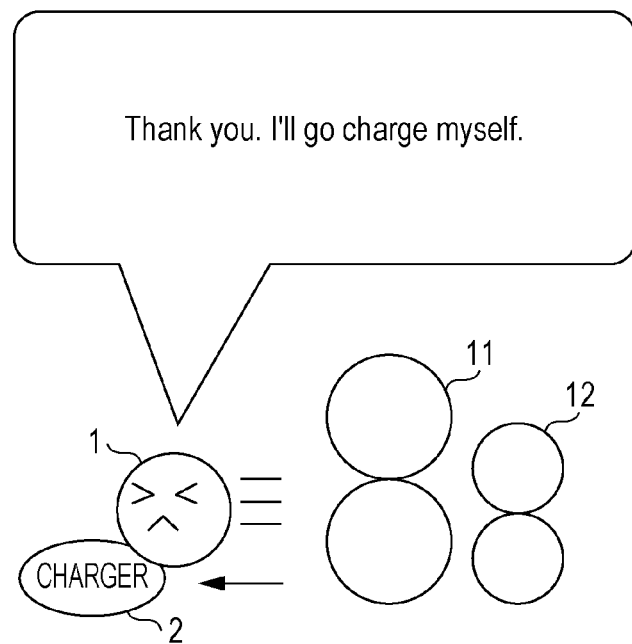
FIG. 32 is a diagram illustrating an example of speech information output from the speaker and display information displayed on the display unit when the robot moves to the charger in step S607 in FIG. 27.

FIG. 32 is a diagram illustrating an example of speech information output from the speaker 113 and display information displayed on the display unit 111 when the robot 1 moves to the charger 2 in step S607 in FIG. 27.

As illustrated in FIG. 32, the main controller 107 outputs, to the display information output controller 112, an action control command for turning on a plurality of light-emitting diodes located at the coordinates where a facial expression of being tired can be expressed, for example. The facial expression of being tired is, for example, an indication represented by two inequality signs aligned side by side with a predetermined gap therebetween (for example, "> <"). That is, the main controller 107 displays, on the display unit 111, an indication symbolically representing a state of the robot 1 by using both eyes and a mouth. The indication represents a state in which the robot 1 is tired. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

As illustrated in FIG. 32, the main controller 107 outputs, to the speech information output controller 114, an action control command for causing the robot 1 to output speech for indicating that the robot 1 will move to the charger 2 in response to permission of the parent 11, for example, "Thank you. I'll go charge myself." That is, the main controller 107 outputs, from the speaker 113, speech for indicating that the robot 1 will move to the charger 2.

Furthermore, the main controller 107 outputs, to the driving mechanism controller 117, an action control command for causing the robot 1 to move to the charger 2 and start charging.

In this way, if the duration of interaction between the robot 1 and the child 12 is longer than or equal to the second threshold (for example, 60 minutes), if the remaining amount of power of the power source 109 of the robot 1 is smaller than or equal to the first threshold (for example, 10%), and if the robot 1 is allowed by the parent 11 to move to the charger 2, the robot 1 moves to the charger 2. Accordingly, the power of the power source 109 is recovered by charging the robot 1, and the interaction between the robot 1 and the child 12 is suppressed.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to notify, by using only the speech output from the speaker 113, the interaction partner that the robot 1 will move to the charger 2.

The main controller 107 may output only an action control command for displaying a character string representing speech in the text format to the display information output controller 112, and may cause the robot 1 to notify, by using only an input/output operation in the display unit 111, the interaction partner that the robot 1 will move to the charger 2. Alternatively, the main controller 107 may cause the robot 1 to notify, by using both speech and a character string representing the speech in the text format, the interaction partner that the robot 1 will move to the charger 2.

After step S607, the process proceeds to step S608 in FIG. 27. Step S608 is the same as step S306 in FIG. 11, and thus the description thereof is not given here. On the other hand, if it is determined that a positive reaction is not received from the parent 11 in response to the action of the robot 1 of asking if the parent 11 allows the robot 1 to move to the charger 2 (NO in step S606), the main controller 107 causes the robot 1 to request the parent 11 to move the robot 1 to the charger 2 (step S609). If there is a negative response with speech, for example, "No, Don't move to the charger," if there is no response from the parent 11, or if there is a negative response with a gesture of shaking the head horizontally, the main controller 107 determines that a positive reaction is not received from the parent 11.

After causing the robot 1 to execute the first movement asking process, the main controller 107 determines, based on an obtained sound or image, whether or not the parent 11 has a positive reaction. If the main controller 107 determines that the parent 11 has a negative reaction, the main controller 107 causes the robot 1 to execute a second movement request process for requesting the parent 11 to move the robot 1 to the charger 2.

After causing the robot 1 to execute the first movement asking process, the main controller 107 may determine whether an obtained sound includes an utterance of the parent 11 including a positive word, whether an obtained sound includes an utterance of the parent 11 including a negative word, or whether an obtained sound includes no utterance of the parent 11. If the main controller 107 determines that an obtained sound includes an utterance of the parent 11 including a negative word or that an obtained sound includes no utterance of the parent 11, the main controller 107 may determine that the parent 11 has a negative reaction.

In addition, after causing the robot 1 to execute the first movement asking process, the main controller 107 may determine, based on an obtained image, whether the parent 11 is shaking the head vertically, whether the parent 11 is shaking the head horizontally, or whether the parent 11 has no reaction. If the main controller 107 determines that the parent 11 is shaking the head horizontally or that the parent 11 has no reaction, the main controller 107 may determine that the parent 11 has a negative reaction.

Figure 33:
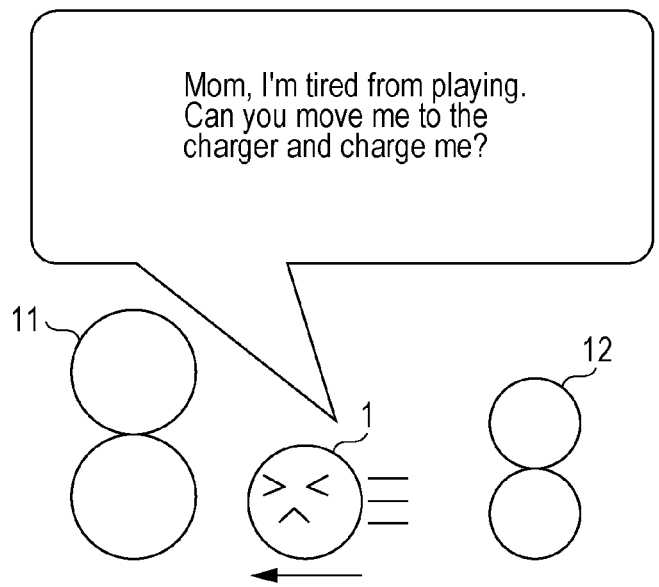
FIG. 33 is a diagram illustrating an example of speech information output from the speaker and display information displayed on the display unit when the robot requests the parent to move the robot to the charger in step S609 in FIG. 27.

FIG. 33 is a diagram illustrating an example of speech information output from the speaker 113 and display information displayed on the display unit 111 when the robot 1 requests the parent 11 to move the robot 1 to the charger 2 in step S609 in FIG. 27.

As illustrated in FIG. 33, the main controller 107 outputs, to the display information output controller 112, an action control command for turning on a plurality of light-emitting diodes located at the coordinates where a facial expression of making a request can be expressed, for example. The facial expression of making a request is, for example, an indication represented by two inequality signs aligned side by side with a predetermined gap therebetween (for example, "> <"). That is, the main controller 107 displays, on the display unit 111, an indication symbolically representing an action of the robot 1 by using both eyes and a mouth. The indication represents an action in which the robot 1 is making a request. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

As illustrated in FIG. 33, the main controller 107 outputs, to the speech information output controller 114, an action control command for causing the robot 1 to output speech for requesting the parent 11 to move the robot 1 to the charger 2. The speech is, for example, "Mom, I'm tired from playing. Can you move me to the charger and charge me?" That is, the main controller 107 outputs, from the speaker 113, speech for requesting the parent 11 to move the robot 1 to the charger 2.

Furthermore, the main controller 107 outputs, to the driving mechanism controller 117, an action control command for causing the robot 1 to move to a position that is a predetermined distance (for example, 50 cm) from the parent 11 and causing the display unit 111 to be oriented toward the parent 11. With this motion, the parent 11 can easily determine an action of the robot 1.

In this way, if the duration of interaction between the robot 1 and the child 12 is longer than or equal to the second threshold (for example, 60 minutes), if the remaining amount of power of the power source 109 of the robot 1 is smaller than or equal to the first threshold (for example, 10%), and if the child 12 and the parent 11 are together as the interaction partner of the robot 1, the robot 1 requests the parent 11 to move the robot 1 to the charger 2, so that the robot 1 is charged to recover the power of the power source 109. By requesting the parent 11 to move the robot 1 to the charger 2, the interaction between the robot 1 and the child 12 is suppressed.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to request, by using only the speech output from the speaker 113, the interaction partner to move the robot 1 to the charger 2.

The main controller 107 may output only an action control command for displaying a character string representing speech in the text format to the display information output controller 112, and may cause the robot 1 to request, by using only an input/output operation in the display unit 111, the interaction partner to move the robot 1 to the charger 2. Alternatively, the main controller 107 may cause the robot 1 to request, by using both speech and a character string representing the speech in the text format, the interaction partner to move the robot 1 to the charger 2. That is, the main controller 107 may display, on the display unit 111, an indication including a character string corresponding to speech.

After step S609, the process proceeds to step S608 in FIG. 27. Step S608 is the same as step S306 in FIG. 11, and thus the description thereof is not given here.

If it is determined in step S604 in FIG. 27 that the duration of interaction between the robot 1 and the child 12 is shorter than 60 minutes (NO in step S604), the main controller 107 asks the child 12 if the child 12 allows the robot 1 to move to the charger 2 (step S610).

If the target that the robot 1 is interacting with includes the child 12 and the parent 11, if the remaining amount of power is smaller than or equal to the first threshold (for example, 10%), and if the amount of interaction is smaller than the second threshold (for example, 60 minutes), the main controller 107 causes the robot 1 to execute a second movement asking process for asking the child 12 if the child 12 allows the robot 1 to move to the charger 2.

Figure 34:
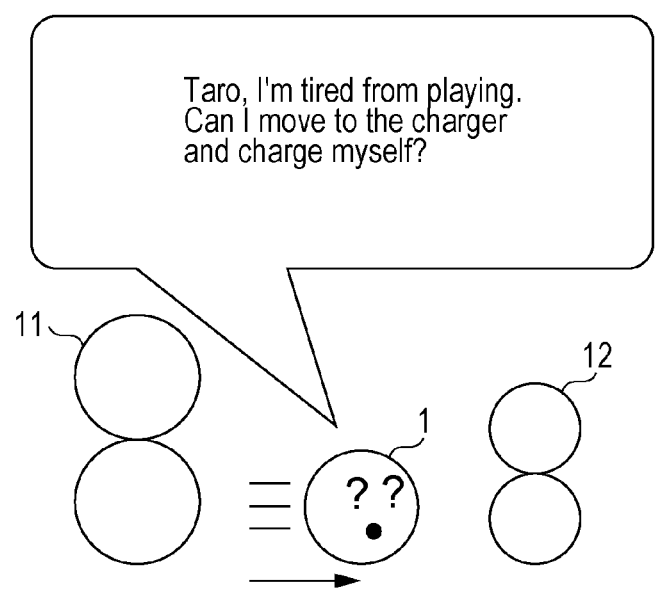
FIG. 34 is a diagram illustrating an example of speech information output from the speaker and display information displayed on the display unit when the robot asks the child if the child allows the robot to move to the charger in step S610 in FIG. 28.

FIG. 34 is a diagram illustrating an example of speech information output from the speaker 113 and display information displayed on the display unit 111 when the robot 1 asks the child 12 if the child 12 allows the robot 1 to move to the charger 2 in step S610 in FIG. 28.

As illustrated in FIG. 34, the main controller 107 outputs, to the display information output controller 112, an action control command for turning on a plurality of light-emitting diodes located at the coordinates where a facial expression of asking a question can be expressed, for example. The facial expression of asking a question is, for example, a facial expression including two question marks aligned side by side with a predetermined gap therebetween (for example, "? ?"). That is, the main controller 107 displays, on the display unit 111, an indication symbolically representing an action of the robot 1 by using both eyes and a mouth. The indication represents an action in which the robot 1 is asking a question. The indication includes two question marks aligned side by side with a predetermined gap therebetween. The two question marks correspond to both eyes of the robot 1.

As illustrated in FIG. 34, the main controller 107 outputs, to the speech information output controller 114, an action control command for causing the robot 1 to output speech for asking the child 12 if the child 12 allows the robot 1 to move to the charger 2, for example, "Taro (the name of the child set by the child or parent in advance), I'm tired from playing. Can I move to the charger and charge myself?" That is, the main controller 107 outputs, from the speaker 113, speech for asking the child 12 if the child 12 allows the robot 1 to move to the charger 2.

Furthermore, the main controller 107 outputs, to the driving mechanism controller 117, an action control command for causing the robot 1 to move to a position that is a predetermined distance (for example, 50 cm) from the child 12 and causing the display unit 111 to be oriented toward the child 12. With this motion, the child 12 can easily determine an action of the robot 1.

In this way, if the duration of interaction between the robot 1 and the child 12 does not exceed the second threshold (for example, 60 minutes) and if the remaining amount of power of the power source 109 of the robot 1 is smaller than or equal to the first threshold (for example, 10%), the robot 1 asks the child 12 if the child 12 allows the robot 1 to move to the charger 2. Accordingly, the child 12 is notified that the power of the power source 109 needs to be recovered by charging the robot 1. In addition, by asking the child 12, the interaction between the robot 1 and the child 12 is promoted.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to ask, by using only the speech output from the speaker 113, the interaction partner if the interaction partner allows the robot 1 to move to the charger 2.

The main controller 107 may output only an action control command for displaying a character string representing speech in the text format to the display information output controller 112, and may cause the robot 1 to ask, by using only an input/output operation in the display unit 111, the interaction partner if the interaction partner allows the robot 1 to move to the charger 2. Alternatively, the main controller 107 may cause the robot 1 to ask, by using both speech and a character string representing the speech in the text format, the interaction partner if the interaction partner allows the robot 1 to move to the charger 2. That is, the main controller 107 may display, on the display unit 111, a character string corresponding to speech.

If the power source 109 of the robot 1 is not a rechargeable battery but is a primary battery, the main controller 107 may perform, for example, action control for requesting the child 12 to replace the battery of the robot 1.

Subsequently, the main controller 107 determines whether or not a positive reaction is received from the child 12 within a predetermined period of time (for example, 1 minute) in response to the action of the robot 1 of asking if the child 12 allows the robot 1 to move to the charger 2 (step S611). If there is a positive response with speech, for example, "Yes, you can move to the charger" or if there is a positive response with a gesture of shaking the head vertically, the main controller 107 determines that a positive reaction is received from the child 12.

If it is determined that a positive reaction is received from the child 12 in response to the action of the robot 1 of asking if the child 12 allows the robot 1 to move to the charger 2 (YES in step S611), the main controller 107 outputs an action control command for causing the robot 1 to move to the charger 2 to the display information output controller 112, the speech information output controller 114, and the driving mechanism controller 117 (step S612).

After causing the robot 1 to execute the second movement asking process, the main controller 107 determines, based on an obtained sound or image, whether or not the child 12 has a positive reaction. If the main controller 107 determines that the child 12 has a positive reaction, the main controller 107 causes the robot 1 to execute a movement process for moving to the charger 2.

After causing the robot 1 to execute the second movement asking process, the main controller 107 may determine whether an obtained sound includes an utterance of the child 12 including a positive word, whether an obtained sound includes an utterance of the child 12 including a negative word, or whether an obtained sound includes no utterance of the child 12. If the main controller 107 determines that an obtained sound includes an utterance of the child 12 including a positive word, the main controller 107 may determine that the child 12 has a positive reaction.

In addition, after causing the robot 1 to execute the second movement asking process, the main controller 107 may determine, based on an obtained image, whether the child 12 is shaking the head vertically, whether the child 12 is shaking the head horizontally, or whether the child 12 has no reaction. If the main controller 107 determines that the child 12 is shaking the head vertically, the main controller 107 may determine that the child 12 has a positive reaction.

Figure 35:
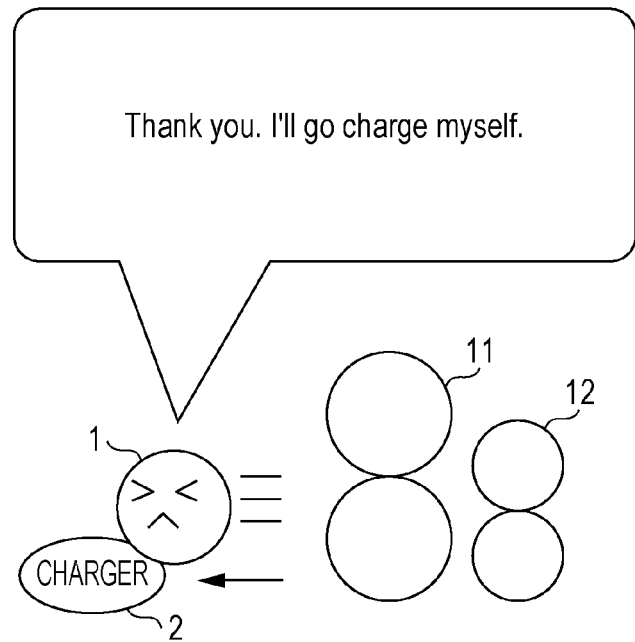
FIG. 35 is a diagram illustrating an example of speech information output from the speaker and display information displayed on the display unit when the robot moves to the charger in step S612 in FIG. 28.

FIG. 35 is a diagram illustrating an example of speech information output from the speaker 113 and display information displayed on the display unit 111 when the robot 1 moves to the charger 2 in step S612 in FIG. 28.

As illustrated in FIG. 35, the main controller 107 outputs, to the display information output controller 112, an action control command for turning on a plurality of light-emitting diodes located at the coordinates where a facial expression of being tired can be expressed, for example. The facial expression of being tired is, for example, an indication represented by two inequality signs aligned side by side with a predetermined gap therebetween (for example, "> <"). That is, the main controller 107 displays, on the display unit 111, an indication symbolically representing a state of the robot 1 by using both eyes and a mouth. The indication represents a state in which the robot 1 is tired. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

As illustrated in FIG. 35, the main controller 107 outputs, to the speech information output controller 114, an action control command for causing the robot 1 to output speech for indicating that the robot 1 will move to the charger 2 in response to permission of the child 12, for example, "Thank you. I'll go charge myself." That is, the main controller 107 outputs, from the speaker 113, speech for indicating that the robot 1 will move to the charger 2.

Furthermore, as illustrated in FIG. 35, the main controller 107 outputs, to the driving mechanism controller 117, an action control command for causing the robot 1 to move to the charger 2 and start charging.

In this way, if the duration of interaction between the robot 1 and the child 12 does not exceed the second threshold (for example, 60 minutes), if the remaining amount of power of the power source 109 of the robot 1 is smaller than or equal to the first threshold (for example, 10%), and if the robot 1 is allowed by the child 12 to move to the charger 2, the robot 1 moves to the charger 2. Accordingly, the power of the power source 109 is recovered by charging the robot 1, and the interaction between the robot 1 and the child 12 is promoted.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to notify, by using only the speech output from the speaker 113, the interaction partner that the robot 1 will move to the charger 2.

The main controller 107 may output only an action control command for displaying a character string representing speech in the text format to the display information output controller 112, and may cause the robot 1 to notify, by using only an input/output operation in the display unit 111, the interaction partner that the robot 1 will move to the charger 2. Alternatively, the main controller 107 may cause the robot 1 to notify, by using both speech and a character string representing the speech in the text format, the interaction partner that the robot 1 will move to the charger 2.

After step S612, the process proceeds to step S613 in FIG. 28. Step S613 is the same as step S308 in FIG. 11, and thus the description thereof is not given here.

On the other hand, if it is determined that a positive reaction is not received from the child 12 in response to the action of the robot 1 of asking if the child 12 allows the robot 1 to move to the charger 2 (NO in step S611), the main controller 107 causes the robot 1 to request the child 12 to move the robot 1 to the charger 2 (step S614). If there is a negative response with speech, for example, "No, Don't move to the charger," if there is no response from the child 12, or if there is a negative response with a gesture of shaking the head horizontally, the main controller 107 determines that a positive reaction is not received from the child 12.

After causing the robot 1 to execute the second movement asking process, the main controller 107 determines, based on an obtained sound or image, whether or not the child 12 has a positive reaction. If the main controller 107 determines that the child 12 has a negative reaction, the main controller 107 causes the robot 1 to execute a first movement request process for requesting the child 12 to move the robot 1 to the charger 2.

After causing the robot 1 to execute the second movement asking process, the main controller 107 may determine whether an obtained sound includes an utterance of the child 12 including a positive word, whether an obtained sound includes an utterance of the child 12 including a negative word, or whether an obtained sound includes no utterance of the child 12. If the main controller 107 determines that an obtained sound includes an utterance of the child 12 including a negative word or that an obtained sound includes no utterance of the child 12, the main controller 107 may determine that the child 12 has a negative reaction.

In addition, after causing the robot 1 to execute the second movement asking process, the main controller 107 may determine, based on an obtained image, whether the child 12 is shaking the head vertically, whether the child 12 is shaking the head horizontally, or whether the child 12 has no reaction. If the main controller 107 determines that the child 12 is shaking the head horizontally or that the child 12 has no reaction, the main controller 107 may determine that the child 12 has a negative reaction.

Figure 36:
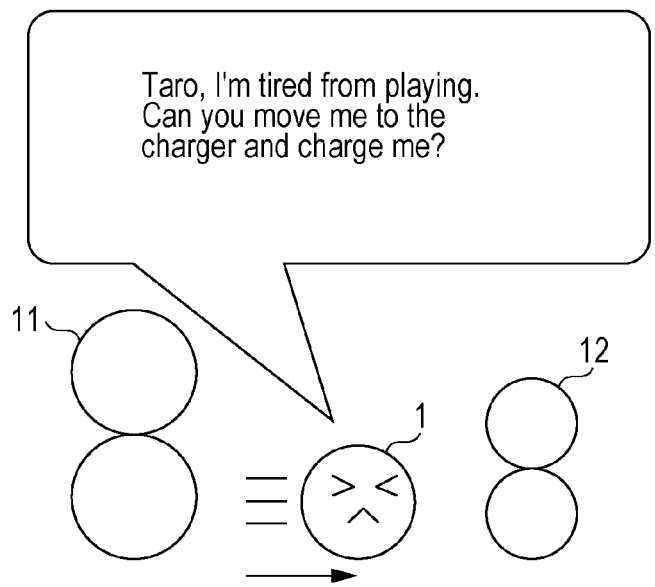
FIG. 36 is a diagram illustrating an example of speech information output from the speaker and display information displayed on the display unit when the robot requests the child to move the robot to the charger in step S614 in FIG. 28.

FIG. 36 is a diagram illustrating an example of speech information output from the speaker 113 and display information displayed on the display unit 111 when the robot 1 requests the child 12 to move the robot 1 to the charger 2 in step S614 in FIG. 28.

As illustrated in FIG. 36, the main controller 107 outputs, to the display information output controller 112, an action control command for turning on a plurality of light-emitting diodes located at the coordinates where a facial expression of making a request can be expressed, for example. The facial expression of making a request is, for example, an indication represented by two inequality signs aligned side by side with a predetermined gap therebetween (for example, "> <"). That is, the main controller 107 displays, on the display unit 111, an indication symbolically representing an action of the robot 1 by using both eyes and a mouth. The indication represents an action in which the robot 1 is making a request. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

As illustrated in FIG. 36, the main controller 107 outputs, to the speech information output controller 114, an action control command for causing the robot 1 to output speech for requesting the child 12 to move the robot 1 to the charger 2. The speech is, for example, "Taro (the name of the child set by the child or parent in advance), I'm tired from playing. Can you move me to the charger and charge me?" That is, the main controller 107 outputs, from the speaker 113, speech for requesting the child 12 to move the robot 1 to the charger 2.

Furthermore, the main controller 107 outputs, to the driving mechanism controller 117, an action control command for causing the robot 1 to move to a position that is a predetermined distance (for example, 50 cm) from the child 12 and causing the display unit 111 to be oriented toward the child 12. With this motion, the child 12 can easily determine an action of the robot 1.

In this way, if the duration of interaction between the robot 1 and the child 12 does not exceed the second threshold (for example, 60 minutes), if the remaining amount of power of the power source 109 of the robot 1 is smaller than or equal to the first threshold (for example, 10%), and if the child 12 and the parent 11 are together as the interaction partner of the robot 1, the robot 1 requests the child 12 to move the robot 1 to the charger 2, so that the robot 1 is charged to recover the power of the power source 109. By requesting the child 12 to move the robot 1 to the charger 2, the interaction between the robot 1 and the child 12 is promoted.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to request, by using only the speech output from the speaker 113, the interaction partner to move the robot 1 to the charger 2.

The main controller 107 may output only an action control command for displaying a character string representing speech in the text format to the display information output controller 112, and may cause the robot 1 to request, by using only an input/output operation in the display unit 111, the interaction partner to move the robot 1 to the charger 2. Alternatively, the main controller 107 may cause the robot 1 to request, by using both speech and a character string representing the speech in the text format, the interaction partner to move the robot 1 to the charger 2. That is, the main controller 107 may display, on the display unit 111, an indication including a character string corresponding to speech.

After step S614, the process proceeds to step S613 in FIG. 28. Step S613 is the same as step S308 in FIG. 11, and thus the description thereof is not given here.

On the other hand, if it is determined that the remaining amount of power of the power source 109 of the robot 1 is larger than 10% (NO in step S603), the process proceeds to step S615 in FIG. 29. Steps S615 to S622 in FIG. 29 are the same as steps S503 to S506, step S508, and steps S510 to S512 in FIGS. 18 and 19 in this order, and thus the description thereof is not given here.

That is, if the target that the robot 1 is interacting with includes the child 12 and the parent 11, if the remaining amount of power is larger than the first threshold (for example, 10%), and if the amount of interaction is larger than or equal to the second threshold (for example, 60 minutes), the main controller 107 causes the robot 1 to execute an interaction asking process for asking the parent 11 if the parent 11 allows the robot 1 to continue interacting with the child 12. The interaction asking process is the same as the above-described asking process according to the first embodiment.

After causing the robot 1 to execute the interaction asking process, the main controller 107 determines, based on an obtained sound or image, whether or not the parent 11 has a positive reaction. If the main controller 107 determines that the parent 11 has a positive reaction, the main controller 107 causes the robot 1 to execute a lead-child-to-interact process for leading the child 12 to continue interacting with the robot 1. The lead-child-to-interact process is the same as the above-described lead-child-to-interact process according to the first embodiment.

After causing the robot 1 to execute the interaction asking process, the main controller 107 determines, based on an obtained sound or image, whether or not the parent 11 has a positive reaction. If the main controller 107 determines that the parent 11 has a negative reaction, the main controller 107 causes the robot 1 to execute an interaction stop process for stopping interacting with the child 12. The interaction stop process is the same as the above-described interaction stop process according to the first embodiment.

If the target that the robot 1 is interacting with includes the child 12 and the parent 11, if the remaining amount of power is larger than the first threshold (for example, 10%), and if the amount of interaction is smaller than the second threshold (for example, 60 minutes), the main controller 107 causes the robot 1 to execute an interaction request process for requesting to the parent 11 that the parent 11 and the child 12 continue interacting with the robot 1. The interaction request process is the same as the above-described interaction request process according to the first embodiment.

After causing the robot 1 to execute the interaction request process, the main controller 107 determines, based on an obtained sound or image, whether or not the parent 11 has a positive reaction. If the main controller 107 determines that the parent 11 has a positive reaction, the main controller 107 causes the robot 1 to execute a lead-parent-and-child-to-interact process for leading the parent 11 and the child 12 to continue interacting with the robot 1. The lead-parent-and-child-to-interact process is the same as the above-described lead-parent-and-child-to-interact process according to the first embodiment.

After causing the robot 1 to execute the interaction request process, the main controller 107 determines, based on an obtained sound or image, whether or not the parent 11 has a positive reaction. If the main controller 107 determines that the parent 11 has a negative reaction, the main controller 107 causes the robot 1 to execute a lead-child-to-interact process. The lead-child-to-interact process is the same as the above-described lead-child-to-interact process according to the first embodiment.

In steps S615 to S622, the remaining amount of power of the power source 109 of the robot 1 is not smaller than the first threshold (for example, 10%), and it is not necessary to recover the power of the power source 109 by charging the robot 1. Thus, the robot 1 does not move to the charger 2, or the robot 1 does not request the interaction partner to move the robot 1 to the charger 2. After step S618 or step S622, the process proceeds to step S613 in FIG. 28. Step S613 is the same as step S308 in FIG. 11, and thus the description thereof is not given here. After step S619, the process proceeds to step S608 in FIG. 27. Step S608 is the same as step S306 in FIG. 11, and thus the description thereof is not given here.

If it is determined in step S602 that the user as the interaction partner of the robot 1 includes only the child 12 ("child" in step S602), the main controller 107 determines whether or not the remaining amount of power of the power source 109 of the robot 1 is smaller than or equal to 10% (step S623). This step is performed to determine the remaining amount of power in the power source 109 and to determine whether or not the robot 1 needs to be charged. The predetermined value, which is 10%, may be freely set by the parent 11 in advance or may be automatically set by the robot 1. Here, a description has been given of the case where the predetermined value of the remaining amount of power of the power source 109 of the robot 1 is 10%, but the embodiment is not limited thereto.

Subsequently, if it is determined that the remaining amount of power of the power source 109 of the robot 1 is smaller than or equal to 10% (YES in step S623), the process proceeds to step S624 in FIG. 30. Step S624 is the same as step S318 in FIG. 13, and thus the description thereof is not given here.

If it is determined in step S624 that the duration of interaction between the robot 1 and the child 12 is longer than or equal to 60 minutes (YES in step S624), the main controller 107 outputs an action control command for causing the robot 1 to move to the charger 2 to the display information output controller 112, the speech information output controller 114, and the driving mechanism controller 117 (step S625).

That is, if the target that the robot 1 is interacting with includes only the child 12, if the remaining amount of power is smaller than or equal to the first threshold (for example, 10%), and if the amount of interaction is larger than or equal to the second threshold (for example, 60 minutes), the main controller 107 causes the robot 1 to execute a movement process for moving to the charger 2.

Figure 37:
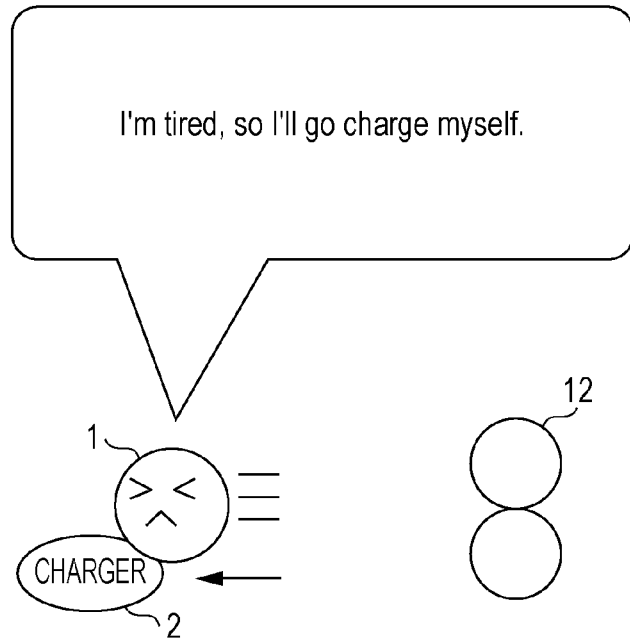
FIG. 37 is a diagram illustrating an example of speech information output from the speaker and display information displayed on the display unit when the robot moves to the charger in step S625 in FIG. 30.

FIG. 37 is a diagram illustrating an example of speech information output from the speaker 113 and display information displayed on the display unit 111 when the robot 1 moves to the charger 2 in step S625 in FIG. 30.

As illustrated in FIG. 37, the main controller 107 outputs, to the display information output controller 112, an action control command for turning on a plurality of light-emitting diodes located at the coordinates where a facial expression of being tired can be expressed, for example. The facial expression of being tired is, for example, an indication represented by two inequality signs aligned side by side with a predetermined gap therebetween (for example, "> <"). That is, the main controller 107 displays, on the display unit 111, an indication symbolically representing a state of the robot 1 by using both eyes and a mouth. The indication represents a state in which the robot 1 is tired. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

As illustrated in FIG. 37, the main controller 107 outputs, to the speech information output controller 114, an action control command for causing the robot 1 to output speech indicating that the robot 1 will move to the charger 2. The speech is, for example, "I'm tired, so I'll go charge myself." That is, the main controller 107 outputs, from the speaker 113, speech indicating that the robot 1 will move to the charger 2.

Furthermore, as illustrated in FIG. 37, the main controller 107 outputs, to the driving mechanism controller 117, an action control command for causing the robot 1 to move to the charger 2 and start charging.

In this way, if the duration of interaction between the robot 1 and the child 12 is longer than or equal to the second threshold (for example, 60 minutes), if the remaining amount of power of the power source 109 of the robot 1 is smaller than or equal to the first threshold (for example, 10%), and if the interaction partner is only the child 12, the robot 1 moves to the charger 2. Accordingly, the power of the power source 109 is recovered by charging the robot 1, and the interaction with the child 12 is suppressed.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to notify, by using only the speech output from the speaker 113, the interaction partner that the robot 1 will move to the charger 2.

The main controller 107 may output only an action control command for displaying a character string representing speech in the text format to the display information output controller 112, and may cause the robot 1 to notify, by using only an input/output operation in the display unit 111, the interaction partner that the robot 1 will move to the charger 2. Alternatively, the main controller 107 may cause the robot 1 to notify, by using both speech and a character string representing the speech in the text format, the interaction partner that the robot 1 will move to the charger 2.

If the power source 109 of the robot 1 is not a rechargeable battery but is a primary battery, the main controller 107 may perform, for example, action control for requesting the child 12 to replace the battery of the robot 1.

After step S625, the process proceeds to step S608 in FIG. 27. Step S608 is the same as step S306 in FIG. 11, and thus the description thereof is not given here.

On the other hand, if it is determined in step S624 that the duration of interaction between the robot 1 and the child 12 is shorter than 60 minutes (NO in step S624), the main controller 107 requests the child 12 to move the robot 1 to the charger 2 (step S626).

If the target that the robot 1 is interacting with includes only the child 12, if the remaining amount of power is smaller than or equal to the first threshold (for example, 10%), and if the amount of interaction is smaller than the second threshold (for example, 60 minutes), the main controller 107 causes the robot 1 to execute a first movement request process for requesting the child 12 to move the robot 1 to the charger 2. The first movement request process is the same as the above-described first movement request process according to the first embodiment.

Figure 38:
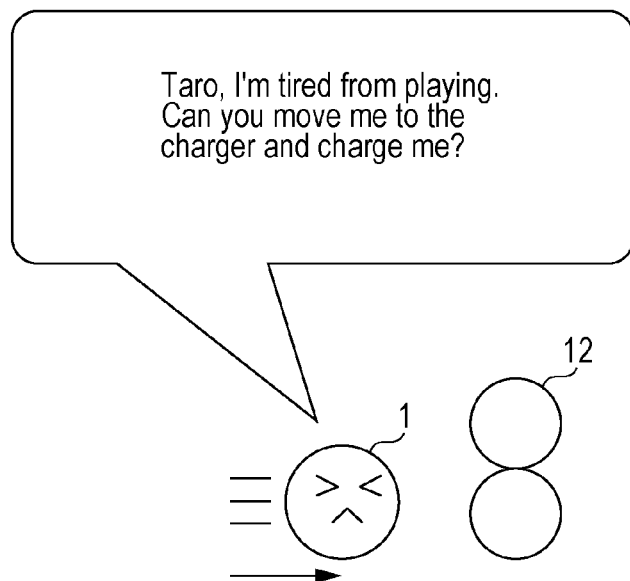
FIG. 38 is a diagram illustrating an example of speech information output from the speaker and display information displayed on the display unit when the robot requests the child to move the robot to the charger in step S626 in FIG. 30.

FIG. 38 is a diagram illustrating an example of speech information output from the speaker 113 and display information displayed on the display unit 111 when the robot 1 requests the child 12 to move the robot 1 to the charger 2 in step S626 in FIG. 30.

As illustrated in FIG. 38, the main controller 107 outputs, to the display information output controller 112, an action control command for turning on a plurality of light-emitting diodes located at the coordinates where a facial expression of making a request can be expressed, for example. The facial expression of making a request is, for example, an indication represented by two inequality signs aligned side by side with a predetermined gap therebetween (for example, "> <"). That is, the main controller 107 displays, on the display unit 111, an indication symbolically representing an action of the robot 1 by using both eyes and a mouth. The indication represents an action in which the robot 1 is making a request. The indication includes two inequality signs aligned side by side with a predetermined gap therebetween. Among the two inequality signs, a left-hand inequality sign opens leftward, and a right-hand inequality sign opens rightward. The two inequality signs correspond to both eyes of the robot 1.

As illustrated in FIG. 38, the main controller 107 outputs, to the speech information output controller 114, an action control command for causing the robot 1 to output speech for requesting the child 12 to move the robot 1 to the charger 2. The speech is, for example, "Taro (the name of the child set by the child or parent in advance), I'm tired from playing. Can you move me to the charger and charge me?" That is, the main controller 107 outputs, from the speaker 113, speech for requesting the child 12 to move the robot 1 to the charger 2.

Furthermore, the main controller 107 outputs, to the driving mechanism controller 117, an action control command for causing the robot 1 to move to a position that is a predetermined distance (for example, 50 cm) from the child 12 and causing the display unit 111 to be oriented toward the child 12. With this motion, the child 12 can easily determine an action of the robot 1.

In this way, if the duration of interaction between the robot 1 and the child 12 does not exceed the second threshold (for example, 60 minutes), if the remaining amount of power of the power source 109 of the robot 1 is smaller than or equal to the first threshold (for example, 10%), and if the interaction partner of the robot 1 includes only the child 12, the robot 1 requests the child 12 to move the robot 1 to the charger 2, so that the robot 1 is charged to recover the power of the power source 109. By requesting the child 12 to move the robot 1 to the charger 2, the interaction between the robot 1 and the child 12 is promoted.

The facial expression, speech, and motion of the robot 1 described here are merely examples, and the embodiment is not limited thereto. The main controller 107 may output only an action control command for causing the robot 1 to output speech to the speech information output controller 114, and may cause the robot 1 to request, by using only the speech output from the speaker 113, the interaction partner to move the robot 1 to the charger 2.

The main controller 107 may output only an action control command for displaying a character string representing speech in the text format to the display information output controller 112, and may cause the robot 1 to request, by using only an input/output operation in the display unit 111, the interaction partner to move the robot 1 to the charger 2. Alternatively, the main controller 107 may cause the robot 1 to request, by using both speech and a character string representing the speech in the text format, the interaction partner to move the robot 1 to the charger 2. That is, the main controller 107 may display, on the display unit 111, an indication including a character string corresponding to speech.

After step S626, the process proceeds to step S613 in FIG. 28. Step S613 is the same as step S308 in FIG. 11, and thus the description thereof is not given here.

If it is determined that the remaining amount of power of the power source 109 of the robot 1 is larger than 10% (NO in step S623), the process proceeds to step S627 in FIG. 30. Step S627 is the same as step S513 in FIG. 18, and thus the description thereof is not given here.

Steps S628 and S629 in FIG. 30 are the same as steps S514 and S515 in FIGS. 18 and 19, and thus the description thereof is not given here.

If the target that the robot 1 is interacting with includes only the child 12, if the remaining amount of power is larger than the first threshold (for example, 10%), and if the amount of interaction is larger than or equal to the second threshold (for example, 60 minutes), the main controller 107 causes the robot 1 to execute an interaction stop process for stopping interacting with the child 12. The interaction stop process is the same as the above-described interaction stop process according to the first embodiment.

If the target that the robot 1 is interacting with includes only the child 12, if the remaining amount of power is larger than the first threshold (for example, 10%), and if the amount of interaction is smaller than the second threshold (for example, 60 minutes), the main controller 107 causes the robot 1 to execute a lead-child-to-interact process for leading the child 12 to continue interacting with the robot 1. The lead-child-to-interact process is the same as the above-described lead-child-to-interact process according to the first embodiment.

In steps S628 and S629, the remaining amount of power of the power source 109 of the robot 1 is not smaller than the first threshold (for example, 10%), and it is not necessary to charge the robot 1 to recover the power of the power source 109. Thus, the robot 1 does not move to the charger 2 and does not request the interaction partner to move the robot 1 to the charger 2.

After step S628, the process proceeds to step S608 in FIG. 27. Step S608 is the same as step S306 in FIG. 11, and thus the description thereof is not given here.

After step S629, the process proceeds to step S613 in FIG. 28. Step S613 is the same as step S308 in FIG. 11, and thus the description thereof is not given here.

In the second action control process of the second embodiment, when the robot 1 is not being charged with power by the charger 2, the main controller 107 causes the robot 1 to execute any one of the first movement asking process, the second movement asking process, the interaction asking process, the interaction request process, the movement process, the first movement request process, the interaction stop process, and the lead-child-to-interact process.

As described above, according to the second embodiment, the actions of the robot 1 with facial expressions, speech, and motions can be controlled based on the relationship between the robot 1 and a user as an interaction partner. For example, it is possible to prevent the robot 1 from playing too much with the child 12 while promoting play with the child 12 and reflecting the intention of the parent 11.

Outline of Embodiments of Present Disclosure

An apparatus according to an aspect of the present disclosure is an apparatus that interacts with a human to communicate with the human. The apparatus includes a camera that obtains an image of a target around the apparatus; a microphone that obtains a sound around the apparatus; a sensor that detects a touching of the apparatus; a power source that is charged with power by an external charger and supplies the power to the apparatus; and a processor. The processor determines, based on either the image that has been obtained by the camera or the sound that has been obtained by the microphone, whether the target that the apparatus is interacting with includes a child and an adult, or only the child. The processor detects, based on any one of the image that has been obtained by the camera, the sound that has been obtained by the microphone, and the touching detected by the sensor, an amount of interaction between the apparatus and the target. The processor detects a remaining amount of power of the power source. If the target includes the child and the adult, if the remaining amount of power is smaller than or equal to a first threshold, and if the amount of interaction is larger than or equal to a second threshold, the processor causes the apparatus to execute a first process for asking the adult if the adult allows the apparatus to move to the charger. If the target includes the child and the adult, if the remaining amount of power is smaller than or equal to the first threshold, and if the amount of interaction is smaller than the second threshold, the processor causes the apparatus to execute a second process for asking the child if the child allows the apparatus to move to the charger. If the target includes the child and the adult, if the remaining amount of power is larger than the first threshold, and if the amount of interaction is larger than or equal to the second threshold, the processor causes the apparatus to execute a third process for asking the adult if the adult allows the apparatus to continue interacting with the child. If the target includes the child and the adult, if the remaining amount of power is larger than the first threshold, and if the amount of interaction is smaller than the second threshold, the processor causes the apparatus to execute a fourth process for requesting to the adult that the adult and the child continue interacting with the apparatus. If the target includes only the child, if the remaining amount of power is smaller than or equal to the first threshold, and if the amount of interaction is larger than or equal to the second threshold, the processor causes the apparatus to execute a fifth process for moving to the charger. If the target includes only the child, if the remaining amount of power is smaller than or equal to the first threshold, and if the amount of interaction is smaller than the second threshold, the processor causes the apparatus to execute a sixth process for requesting the child to move the apparatus to the charger. If the target includes only the child, if the remaining amount of power is larger than the first threshold, and if the amount of interaction is larger than or equal to the second threshold, the processor causes the apparatus to execute a seventh process for stopping interacting with the child. If the target includes only the child, if the remaining amount of power is larger than the first threshold, and if the amount of interaction is smaller than the second threshold, the processor causes the apparatus to execute an eighth process for leading the child to continue interacting with the apparatus.

With this configuration, an image of a subject around the apparatus is obtained by the camera. A sound around the apparatus is obtained by the microphone. A human touching the apparatus is detected by the sensor. The power source is charged with power by an external charger and the power is supplied to the apparatus by the power source. Based on either the image that has been obtained or the sound that has been obtained, it is determined whether a target that the apparatus is interacting with includes a child and an adult or only the child. Based on any one of the image that has been obtained, the sound that has been obtained, and a detection result obtained by the sensor, an amount of interaction between the apparatus and the target is detected. A remaining amount of power of the power source is detected. If the target includes the child and the adult, if the remaining amount of power is smaller than or equal to a first threshold, and if the amount of interaction is larger than or equal to a second threshold, the apparatus executes a first process for asking the adult if the adult allows the apparatus to move to the charger. If the target includes the child and the adult, if the remaining amount of power is smaller than or equal to the first threshold, and if the amount of interaction is smaller than the second threshold, the apparatus executes a second process for asking the child if the child allows the apparatus to move to the charger. If the target includes the child and the adult, if the remaining amount of power is larger than the first threshold, and if the amount of interaction is larger than or equal to the second threshold, the apparatus executes a third process for asking the adult if the adult allows the apparatus to continue interacting with the child. If the target includes the child and the adult, if the remaining amount of power is larger than the first threshold, and if the amount of interaction is smaller than the second threshold, the apparatus executes a fourth process for requesting to the adult that the adult and the child continue interacting with the apparatus. If the target includes only the child, if the remaining amount of power is smaller than or equal to the first threshold, and if the amount of interaction is larger than or equal to the second threshold, the apparatus executes a fifth process for moving to the charger. If the target includes only the child, if the remaining amount of power is smaller than or equal to the first threshold, and if the amount of interaction is smaller than the second threshold, the apparatus executes a sixth process for requesting the child to move the apparatus to the charger. If the target includes only the child, if the remaining amount of power is larger than the first threshold, and if the amount of interaction is larger than or equal to the second threshold, the apparatus executes a seventh process for stopping interacting with the child. If the target includes only the child, if the remaining amount of power is larger than the first threshold, and if the amount of interaction is smaller than the second threshold, the apparatus executes an eighth process for leading the child to continue interacting with the apparatus.

Accordingly, an action of the apparatus can be controlled based on the relationship between the apparatus and an interaction partner, and the interaction between the apparatus and a target that the apparatus is interacting with can be promoted or suppressed based on an amount of interaction between the apparatus and the target.

In the apparatus, the processor may cause the apparatus to execute any one of the first process, the second process, the third process, the fourth process, the fifth process, the sixth process, the seventh process, and the eighth process when the apparatus is not being charged with the power by the charger.

With this configuration, the apparatus is capable of executing any one of the first process, the second process, the third process, the fourth process, the fifth process, the sixth process, the seventh process, and the eighth process when the apparatus is not being charged with the power by the charger.

In the apparatus, the amount of interaction may include a time over which the apparatus continuously interacts with the target or a total time over which the apparatus interacts with the target within a predetermined period.

With this configuration, a time over which the apparatus continuously interacts with the target or a total time over which the apparatus interacts with the target within a predetermined period can be detected as an amount of interaction. The comparison between the amount of interaction and a threshold enables excessive interaction between the apparatus and the target to be suppressed.

In the apparatus, the amount of interaction may include a number of times the apparatus interacts with the target within a predetermined period.

With this configuration, the number of times the apparatus interacts with the target within a predetermined period can be detected as an amount of interaction. The comparison between the amount of interaction and a threshold enables excessive interaction between the apparatus and the target to be suppressed.

In the apparatus, the amount of interaction may include a number of times the target has a predetermined facial expression within a predetermined period, a total time over which the target has the predetermined facial expression within the predetermined period, or a continuous time over which the target has the predetermined facial expression within the predetermined period, and the predetermined facial expression may include at least one of a smiling face and a surprised face.

With this configuration, the number of times the target has at least one of a smiling face and a surprised face within a predetermined period, a total time over which the target has at least one of a smiling face and a surprised face within the predetermined period, or a continuous time over which the target has at least one of a smiling face and a surprised face within the predetermined period can be detected as an amount of interaction. The comparison between the amount of interaction and a threshold enables excessive interaction between the apparatus and the target to be suppressed.

In the apparatus, the apparatus may further include a memory, the amount of interaction may include a number of times the target makes a predetermined utterance within a predetermined period, and the predetermined utterance may include a positive expression for the apparatus, the positive expression being included in a dictionary stored in the memory.

With this configuration, the number of times the target makes an utterance including a positive expression for the apparatus, the positive expression being included in a dictionary stored in the memory, within a predetermined period can be detected as an amount of interaction. The comparison between the amount of interaction and a threshold enables excessive interaction between the apparatus and the target to be suppressed.

In the apparatus, the amount of interaction may include a time over which the apparatus is continuously touched by the target within a predetermined period, and a size of a region at which the apparatus is continuously touched by the target within the predetermined period.

With this configuration, a time over which the apparatus is continuously touched by the target within a predetermined period and a size of a region at which the apparatus is continuously touched by the target within the predetermined period can be detected as an amount of interaction. The comparison between the amount of interaction and a threshold enables excessive interaction between the apparatus and the target to be suppressed.

In the apparatus, the sensor may include at least one of a pressure sensitive sensor, an illuminance sensor, a gyro sensor, an acceleration sensor, a geomagnetic sensor, a fingerprint authentication sensor, and a vein authentication sensor.

With this configuration, a human touching the apparatus can be detected by at least one of a pressure sensitive sensor, an illuminance sensor, a gyro sensor, an acceleration sensor, a geomagnetic sensor, a fingerprint authentication sensor, and a vein authentication sensor.

In the apparatus, when the target is within a predetermined distance range, the processor may determine that the target is present.

With this configuration, a person who is present within a predetermined range from the apparatus can be determined to be the target.

In the apparatus, the processor may determine a person who is looking at the apparatus to be the target.

With this configuration, a person who is looking at the apparatus can be determined to be the target.

In the apparatus, the processor may determine a person whom the apparatus is talking with to be the target.

With this configuration, a person whom the apparatus is talking with can be determined to be the target.

In the apparatus, the processor may determine a person who is touching the apparatus to be the target.

With this configuration, a person who is touching the apparatus can be determined to be the target.

In the apparatus, the processor may determine a person who generates a predetermined sound around the apparatus to be the target.

With this configuration, a person who generates a predetermined sound around the apparatus can be determined to be the target.

In the apparatus, the processor may determine a person who makes a predetermined gesture around the apparatus to be the target.

With this configuration, a person who makes a predetermined gesture around the apparatus can be determined to be the target.

In the apparatus, the apparatus may further include a display, the processor may include a controller, the first process may include orienting, by the controller, the display toward the adult, and displaying, on the display, a first indication symbolically representing an action of the apparatus by using eyes and a mouth, and the first indication may represent a question being asked by the apparatus.

With this configuration, when the first process for asking the adult if the adult allows the apparatus to move to the charger is executed, the display is oriented toward the adult, and the first indication symbolically representing an action of the apparatus of asking a question by using both eyes and a mouth is displayed on the display. Accordingly, it is possible to reliably cause the adult to recognize that the apparatus is asking a question.

In the apparatus, the first indication may include two question marks aligned side by side with a predetermined gap therebetween, and the two question marks may correspond to the eyes of the apparatus.

With this configuration in which the two question marks aligned side by side with a predetermined gap therebetween are displayed as both the eyes of the apparatus, it is possible to reliably cause the adult to recognize that the apparatus is asking a question.

In the apparatus, the apparatus may further include a speaker, and the first process may include outputting, from the speaker, speech for asking the adult if the adult allows the apparatus to move to the charger.

With this configuration, the speech for asking the adult if the adult allows the apparatus to move to the charger is output from the speaker when the first process is executed. In accordance with determination by the adult, it can be determined whether the apparatus may move to the charger.

In the apparatus, the apparatus may further include a display, the first process may include displaying a first indication on the display, and the first indication may include a character string corresponding to the speech.

With this configuration, a character string corresponding to the speech is displayed on the display when the first process is executed. Thus, it is possible to more reliably cause the adult to recognize that the apparatus is asking a question.

In the apparatus, the apparatus may further include a display, the processor may include a controller, the second process may include orienting, by the controller, the display toward the child, and displaying, on the display, a second indication symbolically representing an action of the apparatus by using eyes and a mouth, and the second indication may represent a question being asked by the apparatus.

With this configuration, when the second process for asking the child if the child allows the apparatus to move to the charger is executed, the display is oriented toward the child, and the second indication symbolically representing an action of the apparatus of asking a question by using both eyes and a mouth is displayed on the display. Accordingly, it is possible to reliably cause the child to recognize that the apparatus is asking a question.

In the apparatus, the second indication may include two question marks aligned side by side with a predetermined gap therebetween, and the two question marks may correspond to the eyes of the apparatus.

With this configuration in which the two question marks aligned side by side with a predetermined gap therebetween are displayed as both the eyes of the apparatus, it is possible to reliably cause the child to recognize that the apparatus is asking a question.

In the apparatus, the apparatus may further include a speaker, and the second process may include outputting, from the speaker, speech for asking the child if the child allows the apparatus to move to the charger.

With this configuration, the speech for asking the child if the child allows the apparatus to move to the charger is output from the speaker when the second process is executed. In accordance with determination by the child, it can be determined whether the apparatus may move to the charger.

In the apparatus, the apparatus may further include a display, the second process may include displaying a second indication on the display, and the second indication may include a character string corresponding to the speech.

With this configuration, a character string corresponding to the speech is displayed on the display when the second process is executed. Thus, it is possible to more reliably cause the child to recognize that the apparatus is asking a question.

In the apparatus, the apparatus may further include a display, the processor may include a controller, the third process may include orienting, by the controller, the display toward the adult, and displaying, on the display, a third indication symbolically representing an action of the apparatus by using eyes and a mouth, and the third indication may represent a question being asked by the apparatus.

With this configuration, when the third process for asking the adult if the adult allows the apparatus to continue interacting with the child is executed, the display is oriented toward the adult, and the third indication symbolically representing an action of the apparatus of asking a question by using both eyes and a mouth is displayed on the display. Accordingly, it is possible to reliably cause the adult to recognize that the apparatus is asking a question.

In the apparatus, the third indication may include two question marks aligned side by side with a predetermined gap therebetween, and the two question marks may correspond to the eyes of the apparatus.

With this configuration in which the two question marks aligned side by side with a predetermined gap therebetween are displayed as both the eyes of the apparatus, it is possible to reliably cause the adult to recognize that the apparatus is asking a question.

In the apparatus, the apparatus may further include a speaker, and the third process may include outputting, from the speaker, speech for asking the adult if the adult allows the apparatus to continue interacting with the child.

With this configuration, the speech for asking the adult if the adult allows the apparatus to continue interacting with the child is output from the speaker when the third process is executed. In accordance with determination by the adult, it can be determined whether or not to allow the apparatus to continue interacting with the child.

In the apparatus, the apparatus may further include a display, the third process may include displaying a third indication on the display, and the third indication may include a character string corresponding to the speech.

With this configuration, a character string corresponding to the speech is displayed on the display when the third process is executed. Thus, it is possible to more reliably cause the adult to recognize that the apparatus is asking a question.

In the apparatus, the apparatus may further include a display, the processor may include a controller, the fourth process may include orienting, by the controller, the display toward the adult, and displaying, on the display, a fourth indication symbolically representing an action of the apparatus by using eyes and a mouth, and the fourth indication may represent a request being made by the apparatus.

With this configuration, when the fourth process for requesting to the adult that the adult and the child continue interacting with the apparatus is executed, the display is oriented toward the adult, and the fourth indication symbolically representing an action of the apparatus of making a request by using both eyes and a mouth is displayed on the display. Accordingly, it is possible to reliably cause the adult to recognize that the apparatus is making a request.

In the apparatus, the fourth indication may include two inequality signs aligned side by side with a predetermined gap therebetween, the two inequality signs may include a left-hand inequality sign that may open leftward and a right-hand inequality sign that may open rightward, and the two inequality signs may correspond to the eyes of the apparatus.

With this configuration in which the two inequality signs aligned side by side with a predetermined gap therebetween are displayed as both the eyes of the apparatus, the left-hand inequality sign opening leftward, the right-hand inequality sign opening rightward, it is possible to reliably cause the adult to recognize that the apparatus is making a request.

In the apparatus, the apparatus may further include a speaker, and the fourth process may include outputting, from the speaker, speech for requesting to the adult that the adult and the child continue interacting with the apparatus.

With this configuration, the speech for requesting to the adult that the adult and the child continue interacting with the apparatus is output from the speaker when the fourth process is executed. In accordance with determination by the adult, it can be determined whether or not the adult and the child continue interacting with the apparatus.

In the apparatus, the apparatus may further include a display, the fourth process may include displaying a fourth indication on the display, and the fourth indication may include a character string corresponding to the speech.

With this configuration, a character string corresponding to the speech is displayed on the display when the fourth process is executed. Thus, it is possible to more reliably cause the adult to recognize that the apparatus is making a request.

In the apparatus, the apparatus may further include a display, the processor may include a controller, the fifth process may include orienting, by the controller, the display toward the child, and displaying, on the display, a fifth indication symbolically representing a tired state of the apparatus by using eyes and a mouth.

With this configuration, when the fifth process for moving to the charger is executed, the display is oriented toward the child, and the fifth indication symbolically representing a state in which the apparatus is tired by using both eyes and a mouth is displayed on the display. Accordingly, it is possible to reliably cause the child to recognize that the apparatus will move to the charger.

In the apparatus, the fifth indication may include two inequality signs aligned side by side with a predetermined gap therebetween, the two inequality signs may include a left-hand inequality sign that may open leftward and a right-hand inequality sign that may open rightward, and the two inequality signs may correspond to the eyes of the apparatus.

With this configuration in which the two inequality signs aligned side by side with a predetermined gap therebetween are displayed as both the eyes of the apparatus, the left-hand inequality sign opening leftward, the right-hand inequality sign opening rightward, it is possible to reliably cause the child to recognize that the apparatus will move to the charger.

In the apparatus, the apparatus may further include a speaker, and the fifth process may include outputting, from the speaker, speech for indicating that the apparatus will move to the charger.

With this configuration, the speech for notifying the child that the apparatus will move to the charger is output from the speaker when the fifth process is executed. Thus, it is possible to more reliably cause the child to recognize that the apparatus will move to the charger.

In the apparatus, the apparatus may further include a display, the fifth process may include displaying a fifth indication on the display, and the fifth indication may include a character string corresponding to the speech.

With this configuration, a character string corresponding to the speech is displayed on the display when the fifth process is executed. Thus, it is possible to more reliably cause the child to recognize that the apparatus will move to the charger.

In the apparatus, the apparatus may further include a display, the processor may include a controller, the sixth process may include orienting, by the controller, the display toward the child, and displaying, on the display, a sixth indication symbolically representing an action of the apparatus by using eyes and a mouth, and the sixth indication may represent a request being made by the apparatus.

With this configuration, when the sixth process for requesting the child to move the apparatus to the charger is executed, the display is oriented toward the child, and the sixth indication symbolically representing an action in which the apparatus is making a request by using both eyes and a mouth is displayed on the display. Accordingly, it is possible to reliably cause the child to recognize that the apparatus is making a request.

In the apparatus, the sixth indication may include two inequality signs aligned side by side with a predetermined gap therebetween, the two inequality signs may include a left-hand inequality sign that may open leftward and a right-hand inequality sign that may open rightward, and the two inequality signs may correspond to the eyes of the apparatus.

With this configuration in which the two inequality signs aligned side by side with a predetermined gap therebetween are displayed as both the eyes of the apparatus, the left-hand inequality sign opening leftward, the right-hand inequality sign opening rightward, it is possible to reliably cause the child to recognize that the apparatus is making a request.

In the apparatus, the apparatus may further include a speaker, and the sixth process may include outputting, from the speaker, speech for requesting the child to move the apparatus to the charger.

With this configuration, the speech for requesting the child to move the apparatus to the charger is output from the speaker when the sixth process is executed. In accordance with determination by the child, it can be determined whether or not to move the apparatus to the charger.

In the apparatus, the apparatus may further include a display, the sixth process may include displaying a sixth indication on the display, and the sixth indication may include a character string corresponding to the speech.

With this configuration, a character string corresponding to the speech is displayed on the display when the sixth process is executed. Thus, it is possible to more reliably cause the child to recognize that the apparatus is making a request.

In the apparatus, the apparatus may further include a display, the processor may include a controller, the seventh process may include orienting, by the controller, the display toward the child, and displaying, on the display, a seventh indication symbolically representing a sleeping state of the apparatus by using eyes and a mouth.

With this configuration, when the seventh process for stopping interacting with the child is executed, the display is oriented toward the child, and the seventh indication symbolically representing a state in which the apparatus is sleeping by using both eyes and a mouth is displayed on the display. Accordingly, it is possible to reliably cause the child to recognize that the apparatus stops interacting with the child.

In the apparatus, the seventh indication may include two minus signs aligned side by side with a predetermined gap therebetween, and the two minus signs may correspond to the eyes of the apparatus.

With this configuration in which the two minus signs aligned side by side with a predetermined gap therebetween are displayed as both the eyes of the apparatus, it is possible to reliably cause the child to recognize that the apparatus stops interacting with the child.

In the apparatus, the apparatus may further include a speaker, and the seventh process may include outputting, from the speaker, a sound effect representing a snoring noise.

With this configuration, a sound effect representing a snoring noise is output from the speaker when the seventh process is executed. Thus, it is possible to reliably cause the child to recognize that the apparatus stops interacting with the child.

In the apparatus, the apparatus may further include a speaker, and the seventh process may include outputting, from the speaker, speech for notifying the child that the apparatus discontinue interaction.

With this configuration, the speech for notifying the child that the apparatus will fall asleep soon is output from the speaker when the seventh process is executed. Thus, it is possible to reliably cause the child to recognize that the apparatus stops interacting with the child.

In the apparatus, the apparatus may further include a display, the seventh process may include displaying a seventh indication on the display, and the seventh indication may include a character string corresponding to the speech.

With this configuration, a character string corresponding to the speech is displayed on the display when the seventh process is executed. Thus, it is possible to more reliably cause the child to recognize that the apparatus stops interacting with the child.

In the apparatus, the apparatus may further include a display, the seventh process may include displaying, on the display, a seventh indication symbolically representing a facial expression of the apparatus by using eyes and a mouth for expressing sadness or suffering.

With this configuration, the seventh indication symbolically representing the facial expression corresponding to sadness or suffering by using both eyes and a mouth is displayed on the display when the seventh process is executed. Accordingly, it is possible to reliably cause the child to recognize that the apparatus stops interacting with the child.

In the apparatus, the processor may include a controller, and the seventh process may include causing, by the controller, the apparatus to move away from the child.

With this configuration, the apparatus is caused to move away from the child when the seventh process is performed. Thus, it is possible to reliably cause the child to recognize that the apparatus stops interacting with the child.

In the apparatus, the apparatus may further include a display, the processor may include a controller, and the seventh process may include orienting, by the controller, the display in a direction different from a direction of the child.

With this configuration, the display is oriented in a direction different from a direction of the child when the seventh process is performed. Thus, it is possible to reliably cause the child to recognize that the apparatus stops interacting with the child.

In the apparatus, the apparatus may further include a memory and a speaker, the memory may store a program for causing the apparatus to implement content with which the apparatus interacts with the child, and the eighth process may include outputting, from the speaker, speech corresponding to the content by executing the program corresponding to the content.

With this configuration, when the eighth process for leading the child to continue interacting with the apparatus is executed, the program corresponding to content with which the apparatus plays with the child is executed. Accordingly, it is possible to continue the interaction between the apparatus and the child.

In the apparatus, the content may include any one of Shiritori, quiz, rock-paper-scissors, doll play, book reading, singing, promotion of lifestyle behavior, and hide-and-seek.

With this configuration, a program corresponding to content including any one of Shiritori, quiz, rock-paper-scissors, doll play, book reading, singing, promotion of lifestyle behavior, and hide-and-seek is executed. Thus, it is possible to continue the interaction between the apparatus and the child.

In the apparatus, the apparatus may further include a memory and a speaker, the memory may store a program for causing the apparatus to talk with the child on a predetermined topic, and the eighth process may include outputting, from the speaker, speech associated with the predetermined topic.

With this configuration, when the eighth process is executed, the program for causing the apparatus to talk with the child on a predetermined topic is executed, and the speech including the predetermined topic is output from the speaker. Accordingly, it is possible to continue the interaction between the apparatus and the child.

In the apparatus, the predetermined topic may include any one of greeting to the child, current weather, self-introduction by the apparatus, a schedule of the child set in advance, and miscellaneous topics.

With this configuration, the apparatus and the child can talk with each other on a topic including any one of greeting to the child, current weather, self-introduction by the apparatus, a schedule of the child set by the adult in advance, and miscellaneous topics.

In the apparatus, the apparatus may further include a speaker, and the eighth process may include outputting, from the speaker, speech for leading the child to continue interacting with the apparatus.

With this configuration, when the eighth process is executed, the speech for leading the child to continue interacting with the apparatus is output from the speaker. Accordingly, it is possible to continue the interaction between the apparatus and the child.

In the apparatus, the apparatus may further include a display, the eighth process may include displaying an eighth indication on the display, and the eighth indication may include a character string corresponding to the speech.

With this configuration, when the eighth process is executed, a character string corresponding to the speech is displayed on the display. Thus, it is possible to continue the interaction between the apparatus and the child.

In the apparatus, after causing the apparatus to execute the first process, the processor may determine, based on the sound that has been obtained by the microphone or the image that has been obtained by the camera, whether or not the adult has a positive reaction. If the processor determines that the adult has the positive reaction, the processor may cause the apparatus to execute the fifth process. If the processor determines that the adult has a negative reaction, the processor may cause the apparatus to execute a ninth process for requesting the adult to move the apparatus to the charger.

With this configuration, after the adult is asked if the adult allows the apparatus to move to the charger, it is determined, based on the sound that has been obtained or the image that has been obtained, whether or not the adult has a positive reaction. If it is determined that the adult has a positive reaction, the apparatus moves to the charger. If it is determined that the adult has a negative reaction, the adult is requested to move the apparatus to the charger.

Accordingly, it can be determined whether or not to move the apparatus to the charger by reflecting the intention of the adult.

In the apparatus, after causing the apparatus to execute the first process, the processor may determine whether the sound that has been obtained by the microphone includes an utterance of the adult including a positive word, whether the sound that has been obtained by the microphone includes an utterance of the adult including a negative word, or whether the sound that has been obtained includes no utterance of the adult. If the processor determines that the sound that has been obtained by the microphone includes the utterance of the adult including the positive word, the processor may determine that the adult has the positive reaction. If the processor determines that the sound that has been obtained by the microphone includes the utterance of the adult including the negative word or that the sound that has been obtained by the microphone includes no utterance of the adult, the processor may determine that the adult has the negative reaction.

With this configuration, after the adult is asked if the adult allows the apparatus to move to the charger, it is determined whether the sound that has been obtained includes an utterance of the adult including a positive word, whether the sound that has been obtained includes an utterance of the adult including a negative word, or whether the sound that has been obtained includes no utterance of the adult. If it is determined that the sound that has been obtained includes the utterance of the adult including the positive word, it is determined that the adult has a positive reaction. If it is determined that the sound that has been obtained includes the utterance of the adult including the negative word or that the sound that has been obtained includes no utterance of the adult, it is determined that the adult has a negative reaction.

Accordingly, it can be determined whether or not to move the apparatus to the charger in accordance with the utterance of the adult included in the sound that has been obtained.

In the apparatus, after causing the apparatus to execute the first process, the processor may determine, based on the image that has been obtained by the camera, whether the adult is shaking a head vertically, whether the adult is shaking the head horizontally, or whether the adult has no reaction. If the processor determines that the adult is shaking the head vertically, the processor may determine that the adult has the positive reaction. If the processor determines that the adult is shaking the head horizontally or that the adult has no reaction, the processor may determine that the adult has the negative reaction.

With this configuration, after the adult is asked if the adult allows the apparatus to move to the charger, it is determined, based on the image that has been obtained, whether the adult is shaking a head vertically, whether the adult is shaking the head horizontally, or whether the adult has no reaction. If it is determined that the adult is shaking the head vertically, it is determined that the adult has a positive reaction. If it is determined that the adult is shaking the head horizontally or that the adult has no reaction, it is determined that the adult has a negative reaction.

Accordingly, it can be determined whether or not to move the apparatus to the charger in accordance with the gesture of the adult obtained from the image that has been obtained.

In the apparatus, the apparatus may further include a display, the processor may include a controller, the ninth process may include orienting, by the controller, the display toward the adult, and displaying, on the display, a ninth indication symbolically representing an action of the apparatus by using eyes and a mouth, and the ninth indication may represent a request being made by the apparatus.

With this configuration, when the ninth process for requesting the adult to move the apparatus to the charger is executed, the display is oriented toward the adult, and the ninth indication symbolically representing an action in which the apparatus is making a request by using both eyes and a mouth is displayed on the display. Accordingly, it is possible to reliably cause the adult to recognize that the apparatus is making a request.

In the apparatus, the ninth indication may include two inequality signs aligned side by side with a predetermined gap therebetween, the two inequality signs may include a left-hand inequality sign that may open leftward and a right-hand inequality sign that may open rightward, and the two inequality signs may correspond to the eyes of the apparatus.

With this configuration in which the two inequality signs aligned side by side with a predetermined gap therebetween are displayed as both the eyes of the apparatus, the left-hand inequality sign opening leftward, the right-hand inequality sign opening rightward, it is possible to reliably cause the adult to recognize that the apparatus is making a request.

In the apparatus, the apparatus may further include a speaker, and the ninth process may include outputting, from the speaker, speech for requesting the adult to move the apparatus to the charger.

With this configuration, the speech for requesting the adult to move the apparatus to the charger is output from the speaker when the ninth process is executed. In accordance with determination by the adult, it can be determined whether or not to move the apparatus to the charger.

In the apparatus, the apparatus may further include a display, the ninth process may include displaying a ninth indication on the display, and the ninth indication may include a character string corresponding to the speech.

With this configuration, a character string corresponding to the speech is displayed on the display when the ninth process is executed. Thus, it is possible to more reliably cause the adult to recognize that the apparatus is making a request.

In the apparatus, after causing the apparatus to execute the second process, the processor may determine, based on the sound that has been obtained by the microphone or the image that has been obtained by the camera, whether or not the child has a positive reaction. If the processor determines that the child has the positive reaction, the processor may cause the apparatus to execute the fifth process. If the processor determines that the child has a negative reaction, the processor may cause the apparatus to execute the sixth process.

With this configuration, after the child is asked if the child allows the apparatus to move to the charger, it is determined, based on the sound that has been obtained or the image that has been obtained, whether or not the child has a positive reaction. If it is determined that the child has a positive reaction, the apparatus moves to the charger. If it is determined that the child has a negative reaction, the child is requested to move the apparatus to the charger.

Accordingly, it can be determined whether or not to move the apparatus to the charger by reflecting the intention of the child.

In the apparatus, after causing the apparatus to execute the second process, the processor may determine whether the sound that has been obtained by the microphone includes an utterance of the child including a positive word, whether the sound that has been obtained by the microphone includes an utterance of the child including a negative word, or whether the sound that has been obtained by the microphone includes no utterance of the child. If the processor determines that the sound that has been obtained includes the utterance of the child including the positive word, the processor may determine that the child has the positive reaction. If the processor determines that the sound that has been obtained includes the utterance of the child including the negative word or that the sound that has been obtained includes no utterance of the child, the processor may determine that the child has the negative reaction.

With this configuration, after the child is asked if the child allows the apparatus to move to the charger, it is determined whether the sound that has been obtained includes an utterance of the child including a positive word, whether the sound that has been obtained includes an utterance of the child including a negative word, or whether the sound that has been obtained includes no utterance of the child. If it is determined that the sound that has been obtained includes the utterance of the child including the positive word, it is determined that the child has a positive reaction. If it is determined that the sound that has been obtained includes the utterance of the child including the negative word or that the sound that has been obtained includes no utterance of the child, it is determined that the child has a negative reaction.

Accordingly, it can be determined whether or not to move the apparatus to the charger in accordance with the utterance of the child included in the sound that has been obtained.

In the apparatus, after causing the apparatus to execute the second process, the processor may determine, based on the image that has been obtained by the camera, whether the child is shaking a head vertically, whether the child is shaking the head horizontally, or whether the child has no reaction. If the processor determines that the child is shaking the head vertically, the processor may determine that the child has the positive reaction. If the processor determines that the child is shaking the head horizontally or that the child has no reaction, the processor may determine that the child has the negative reaction.

With this configuration, after the child is asked if the child allows the apparatus to move to the charger, it is determined, based on the image that has been obtained, whether the child is shaking a head vertically, whether the child is shaking the head horizontally, or whether the child has no reaction. If it is determined that the child is shaking the head vertically, it is determined that the child has a positive reaction. If it is determined that the child is shaking the head horizontally or that the child has no reaction, it is determined that the child has a negative reaction.

Accordingly, it can be determined whether or not to move the apparatus to the charger in accordance with the gesture of the child obtained from the image that has been obtained.

In the apparatus, after causing the apparatus to execute the third process, the processor may determine, based on the sound that has been obtained by the microphone or the image that has been obtained by the camera, whether or not the adult has a positive reaction. If the processor determines that the adult has the positive reaction, the processor may cause the apparatus to execute the eighth process. If the processor determines that the adult has a negative reaction, the processor may cause the apparatus to execute the seventh process.

With this configuration, after the adult is asked if the adult allows the apparatus to continue interacting with the child, it is determined, based on the sound that has been obtained or the image that has been obtained, whether or not the adult has a positive reaction. If it is determined that the adult has a positive reaction, the child is led to continue interacting with the apparatus. If it is determined that the adult has a negative reaction, the apparatus stops interacting with the child.

Accordingly, it can be determined whether or not to allow the apparatus to continue interacting with the child by reflecting the intention of the adult.

In the apparatus, after causing the apparatus to execute the third process, the processor may determine whether the sound that has been obtained by the microphone includes an utterance of the adult including a positive word, whether the sound that has been obtained by the microphone includes an utterance of the adult including a negative word, or whether the sound that has been obtained by the microphone includes no utterance of the adult. If the processor determines that the sound that has been obtained by the microphone includes the utterance of the adult including the positive word, the processor may determine that the adult has the positive reaction. If the processor determines that the sound that has been obtained includes the utterance of the adult including the negative word or that the sound that has been obtained includes no utterance of the adult, the processor may determine that the adult has the negative reaction.

With this configuration, after the adult is asked if the adult allows the apparatus to continue interacting with the child, it is determined whether the sound that has been obtained includes an utterance of the adult including a positive word, whether the sound that has been obtained includes an utterance of the adult including a negative word, or whether the sound that has been obtained includes no utterance of the adult. If it is determined that the sound that has been obtained includes the utterance of the adult including the positive word, it is determined that the adult has a positive reaction. If it is determined that the sound that has been obtained includes the utterance of the adult including the negative word or that the sound that has been obtained includes no utterance of the adult, it is determined that the adult has a negative reaction.

Accordingly, it can be determined whether or not to allow the apparatus to continue interacting with the child in accordance with the utterance of the adult included in the sound that has been obtained.

In the apparatus, after causing the apparatus to execute the third process, the processor may determine, based on the image that has been obtained by the camera, whether the adult is shaking a head vertically, whether the adult is shaking the head horizontally, or whether the adult has no reaction. If the processor determines that the adult is shaking the head vertically, the processor may determine that the adult has the positive reaction. If the processor determines that the adult is shaking the head horizontally or that the adult has no reaction, the processor may determine that the adult has the negative reaction.

With this configuration, after the adult is asked if the adult allows the apparatus to continue interacting with the child, it is determined, based on the image that has been obtained, whether the adult is shaking a head vertically, whether the adult is shaking the head horizontally, or whether the adult has no reaction. If it is determined that the adult is shaking the head vertically, it is determined that the adult has a positive reaction. If it is determined that the adult is shaking the head horizontally or that the adult has no reaction, it is determined that the adult has a negative reaction.

Accordingly, it can be determined whether or not to allow the apparatus to continue interacting with the child in accordance with the gesture of the adult obtained from the image that has been obtained.

In the apparatus, after causing the apparatus to execute the fourth process, the processor may determine, based on the sound that has been obtained by the microphone or the image that has been obtained by the camera, whether or not the adult has a positive reaction. If the processor determines that the adult has the positive reaction, the processor may cause the apparatus to execute a tenth process for leading the child and the adult to continue interacting with the apparatus. If the processor determines that the adult has a negative reaction, the processor may cause the apparatus to execute the eighth process.

With this configuration, after a request is made to the adult that the adult and the child continue interacting with the apparatus, it is determined, based on the sound that has been obtained or the image that has been obtained, whether or not the adult has a positive reaction. If it is determined that the adult has a positive reaction, the child and the adult are led to continue interacting with the apparatus. If it is determined that the adult has a negative reaction, the child is led to continue interacting with the apparatus.

Accordingly, it can be determined whether or not to allow the apparatus to continue interacting with the child and the adult or with only the child by reflecting the intention of the adult.

In the apparatus, after causing the apparatus to execute the fourth process, the processor may determine whether the sound that has been obtained by the microphone includes an utterance of the adult including a positive word, whether the sound that has been obtained by the microphone includes an utterance of the adult including a negative word, or whether the sound that has been obtained by the microphone includes no utterance of the adult. If the processor determines that the sound that has been obtained includes the utterance of the adult including the positive word, the processor may determine that the adult has the positive reaction. If the processor determines that the sound that has been obtained includes the utterance of the adult including the negative word or that the sound that has been obtained includes no utterance of the adult, the processor may determine that the adult has the negative reaction.

With this configuration, after a request is made to the adult that the adult and the child continue interacting with the apparatus, it is determined whether the sound that has been obtained includes an utterance of the adult including a positive word, whether the sound that has been obtained includes an utterance of the adult including a negative word, or whether the sound that has been obtained includes no utterance of the adult. If it is determined that the sound that has been obtained includes the utterance of the adult including the positive word, it is determined that the adult has a positive reaction. If it is determined that the sound that has been obtained includes the utterance of the adult including the negative word or that the sound that has been obtained includes no utterance of the adult, it is determined that the adult has a negative reaction.

Accordingly, it can be determined whether or not to allow the apparatus to continue interacting with the child and the adult or with only the child in accordance with the utterance of the adult included in the sound that has been obtained.

In the apparatus, after causing the apparatus to execute the fourth process, the processor may determine, based on the image that has been obtained by the camera, whether the adult is shaking a head vertically, whether the adult is shaking the head horizontally, or whether the adult has no reaction. If the processor determines that the adult is shaking the head vertically, the processor may determine that the adult has the positive reaction. If the processor determines that the adult is shaking the head horizontally or that the adult has no reaction, the processor may determine that the adult has the negative reaction.

With this configuration, after a request is made to the adult that the adult and the child continue interacting with the apparatus, it is determined, based on the image that has been obtained, whether the adult is shaking a head vertically, whether the adult is shaking the head horizontally, or whether the adult has no reaction. If it is determined that the adult is shaking the head vertically, it is determined that the adult has a positive reaction. If it is determined that the adult is shaking the head horizontally or that the adult has no reaction, it is determined that the adult has a negative reaction.

Accordingly, it can be determined whether or not to allow the apparatus to continue interacting with the child and the adult or with only the child in accordance with the gesture of the adult obtained from the image that has been obtained.

In the apparatus, the apparatus may further include a memory and a speaker, the memory may store a program for causing the apparatus to implement content with which the apparatus interacts with the child and the adult, and the tenth process may include outputting, from the speaker, speech corresponding to the content by executing the program corresponding to the content.

With this configuration, when the tenth process for leading the child and the adult to continue interacting with the apparatus is executed, the program corresponding to the content with which the apparatus plays with the child and the adult is executed and the speech corresponding to the content is output from the speaker. Accordingly, it is possible to continue the interaction among the apparatus, the child, and the adult.

In the apparatus, the content may include any one of Shiritori, quiz, rock-paper-scissors, doll play, book reading, singing, promotion of lifestyle behavior, and hide-and-seek.

With this configuration, a program corresponding to content including any one of Shiritori, quiz, rock-paper-scissors, doll play, book reading, singing, promotion of lifestyle behavior, and hide-and-seek is executed. Thus, it is possible to continue the interaction among the apparatus, the child, and the adult.

In the apparatus, the apparatus may further include a memory and a speaker, the memory may store a program for causing the apparatus to talk with the child on a predetermined topic, and the tenth process may include outputting, from the speaker, speech associated with the predetermined topic.

With this configuration, when the tenth process is executed, the program for causing the apparatus to talk with the child on a predetermined topic is executed, and the speech including the predetermined topic is output from the speaker. Accordingly, it is possible to continue the interaction among the apparatus, the child, and the adult.

In the apparatus, the predetermined topic may include any one of greeting to the child, current weather, self-introduction by the apparatus, a schedule of the child set in advance, and miscellaneous topics.

With this configuration, the apparatus, the child, and the adult can talk with each other on a topic including any one of greeting to the child, current weather, self-introduction by the apparatus, a schedule of the child set by the adult in advance, and miscellaneous topics.

In the apparatus, the apparatus may further include a speaker, and the tenth process may include outputting, from the speaker, speech for leading the child and the adult to continue interacting with the apparatus.

With this configuration, when the tenth process is executed, the speech for leading the child and the adult to continue interacting with the apparatus is output from the speaker. Accordingly, it is possible to continue the interaction among the apparatus, the child, and the adult.

In the apparatus, the apparatus may further include a display, the tenth process may include displaying a tenth indication on the display, and the tenth indication may include a character string corresponding to the speech.

With this configuration, when the tenth process is executed, a character string corresponding to the speech is displayed on the display. Thus, it is possible to continue the interaction among the apparatus, the child, and the adult.

A method according to another aspect of the present disclosure is a method for an apparatus that interacts with a human to communicate with the human. The method includes obtaining an image of a target around the apparatus by a camera; obtaining a sound around the apparatus by a microphone; detecting a touching of the apparatus by a sensor; determining, based on either the image that has been obtained by the camera or the sound that has been obtained by the microphone, whether the target that the apparatus is interacting with includes a child and an adult, or only the child; detecting, based on any one of the image that has been obtained by the camera, the sound that has been obtained by the microphone, and the touching detected by the sensor, an amount of interaction between the apparatus and the target; detecting a remaining amount of power of a power source that is charged with power by an external charger and supplies the power to the apparatus; if the target includes the child and the adult, if the remaining amount of power is smaller than or equal to a first threshold, and if the amount of interaction is larger than or equal to a second threshold, causing the apparatus to execute a first process for asking the adult if the adult allows the apparatus to move to the charger; if the target includes the child and the adult, if the remaining amount of power is smaller than or equal to the first threshold, and if the amount of interaction is smaller than the second threshold, causing the apparatus to execute a second process for asking the child if the child allows the apparatus to move to the charger; if the target includes the child and the adult, if the remaining amount of power is larger than the first threshold, and if the amount of interaction is larger than or equal to the second threshold, causing the apparatus to execute a third process for asking the adult if the adult allows the apparatus to continue interacting with the child; if the target includes the child and the adult, if the remaining amount of power is larger than the first threshold, and if the amount of interaction is smaller than the second threshold, causing the apparatus to execute a fourth process for requesting to the adult that the adult and the child continue interacting with the apparatus; if the target includes only the child, if the remaining amount of power is smaller than or equal to the first threshold, and if the amount of interaction is larger than or equal to the second threshold, causing the apparatus to execute a fifth process for moving to the charger; if the target includes only the child, if the remaining amount of power is smaller than or equal to the first threshold, and if the amount of interaction is smaller than the second threshold, causing the apparatus to execute a sixth process for requesting the child to move the apparatus to the charger; if the target includes only the child, if the remaining amount of power is larger than the first threshold, and if the amount of interaction is larger than or equal to the second threshold, causing the apparatus to execute a seventh process for stopping interacting with the child; and if the target includes only the child, if the remaining amount of power is larger than the first threshold, and if the amount of interaction is smaller than the second threshold, causing the apparatus to execute an eighth process for leading the child to continue interacting with the apparatus.

With this configuration, an image of a subject around the apparatus is obtained by the camera. A sound around the apparatus is obtained by the microphone. A human touching the apparatus is detected by the sensor. Based on either the image that has been obtained or the sound that has been obtained, it is determined whether a target that the apparatus is interacting with includes a child and an adult or only the child. Based on any one of the image that has been obtained, the sound that has been obtained, and a detection result obtained by the sensor, an amount of interaction between the apparatus and the target is detected. A remaining amount of power of the power source that is charged with power by an external charger and supplies the power to the apparatus is detected. If the target includes the child and the adult, if the remaining amount of power is smaller than or equal to a first threshold, and if the amount of interaction is larger than or equal to a second threshold, the apparatus executes a first process for asking the adult if the adult allows the apparatus to move to the charger. If the target includes the child and the adult, if the remaining amount of power is smaller than or equal to the first threshold, and if the amount of interaction is smaller than the second threshold, the apparatus executes a second process for asking the child if the child allows the apparatus to move to the charger. If the target includes the child and the adult, if the remaining amount of power is larger than the first threshold, and if the amount of interaction is larger than or equal to the second threshold, the apparatus executes a third process for asking the adult if the adult allows the apparatus to continue interacting with the child. If the target includes the child and the adult, if the remaining amount of power is larger than the first threshold, and if the amount of interaction is smaller than the second threshold, the apparatus executes a fourth process for requesting to the adult that the adult and the child continue interacting with the apparatus. If the target includes only the child, if the remaining amount of power is smaller than or equal to the first threshold, and if the amount of interaction is larger than or equal to the second threshold, the apparatus executes a fifth process for moving to the charger. If the target includes only the child, if the remaining amount of power is smaller than or equal to the first threshold, and if the amount of interaction is smaller than the second threshold, the apparatus executes a sixth process for requesting the child to move the apparatus to the charger. If the target includes only the child, if the remaining amount of power is larger than the first threshold, and if the amount of interaction is larger than or equal to the second threshold, the apparatus executes a seventh process for stopping interacting with the child. If the target includes only the child, if the remaining amount of power is larger than the first threshold, and if the amount of interaction is smaller than the second threshold, the apparatus executes an eighth process for leading the child to continue interacting with the apparatus.

Accordingly, an action of the apparatus can be controlled based on the relationship between the apparatus and an interaction partner, and the interaction between the apparatus and a target that the apparatus is interacting with can be promoted or suppressed based on an amount of interaction between the apparatus and the target.

A non-transitory recording medium according to another aspect of the present disclosure is a non-transitory recording medium storing a computer-readable program for interacting with a human to communicate with the human. The program causes a computer to function as a determiner that determines, based on either an image of a target obtained by a camera around an apparatus or a sound of the target obtained by a microphone around the apparatus, whether the target that the apparatus is interacting with includes a child and an adult, or only the child; an interaction amount detector that detects, based on any one of the image that has been obtained by the camera, the sound that has been obtained by the microphone, and a touching detected by a sensor, an amount of interaction between the apparatus and the target; a remaining power amount detector that detects a remaining amount of power of a power source that is charged with power by an external charger and supplies the power to the apparatus; a first executor that, if the target includes the child and the adult, if the remaining amount of power is smaller than or equal to a first threshold, and if the amount of interaction is larger than or equal to a second threshold, causes the apparatus to execute a first process for asking the adult if the adult allows the apparatus to move to the charger; a second executor that, if the target includes the child and the adult, if the remaining amount of power is smaller than or equal to the first threshold, and if the amount of interaction is smaller than the second threshold, causes the apparatus to execute a second process for asking the child if the child allows the apparatus to move to the charger; a third executor that, if the target includes the child and the adult, if the remaining amount of power is larger than the first threshold, and if the amount of interaction is larger than or equal to the second threshold, causes the apparatus to execute a third process for asking the adult if the adult allows the apparatus to continue interacting with the child; a fourth executor that, if the target includes the child and the adult, if the remaining amount of power is larger than the first threshold, and if the amount of interaction is smaller than the second threshold, causes the apparatus to execute a fourth process for requesting to the adult that the adult and the child continue interacting with the apparatus; a fifth executor that, if the target includes only the child, if the remaining amount of power is smaller than or equal to the first threshold, and if the amount of interaction is larger than or equal to the second threshold, causes the apparatus to execute a fifth process for moving to the charger; a sixth executor that, if the target includes only the child, if the remaining amount of power is smaller than or equal to the first threshold, and if the amount of interaction is smaller than the second threshold, causes the apparatus to execute a sixth process for requesting the child to move the apparatus to the charger; a seventh executor that, if the target includes only the child, if the remaining amount of power is larger than the first threshold, and if the amount of interaction is larger than or equal to the second threshold, causes the apparatus to execute a seventh process for stopping interacting with the child; and an eighth executor that, if the target includes only the child, if the remaining amount of power is larger than the first threshold, and if the amount of interaction is smaller than the second threshold, causes the apparatus to execute an eighth process for leading the child to continue interacting with the apparatus.

With this configuration, it is determined, based on either an image of a subject around the apparatus or a sound around the apparatus, the image being obtained by the camera, the sound being obtained by the microphone, whether a target that the apparatus is interacting with includes a child and an adult or only the child. Based on any one of the image that has been obtained, the sound that has been obtained, and a detection result obtained by the sensor that detects the human touching the apparatus, an amount of interaction between the apparatus and the target is detected. A remaining amount of power of the power source that is charged with power by an external charger and supplies the power to the apparatus is detected. If the target includes the child and the adult, if the remaining amount of power is smaller than or equal to a first threshold, and if the amount of interaction is larger than or equal to a second threshold, the apparatus executes a first process for asking the adult if the adult allows the apparatus to move to the charger. If the target includes the child and the adult, if the remaining amount of power is smaller than or equal to the first threshold, and if the amount of interaction is smaller than the second threshold, the apparatus executes a second process for asking the child if the child allows the apparatus to move to the charger. If the target includes the child and the adult, if the remaining amount of power is larger than the first threshold, and if the amount of interaction is larger than or equal to the second threshold, the apparatus executes a third process for asking the adult if the adult allows the apparatus to continue interacting with the child. If the target includes the child and the adult, if the remaining amount of power is larger than the first threshold, and if the amount of interaction is smaller than the second threshold, the apparatus executes a fourth process for requesting to the adult that the adult and the child continue interacting with the apparatus. If the target includes only the child, if the remaining amount of power is smaller than or equal to the first threshold, and if the amount of interaction is larger than or equal to the second threshold, the apparatus executes a fifth process for moving to the charger. If the target includes only the child, if the remaining amount of power is smaller than or equal to the first threshold, and if the amount of interaction is smaller than the second threshold, the apparatus executes a sixth process for requesting the child to move the apparatus to the charger. If the target includes only the child, if the remaining amount of power is larger than the first threshold, and if the amount of interaction is larger than or equal to the second threshold, the apparatus executes a seventh process for stopping interacting with the child. If the target includes only the child, if the remaining amount of power is larger than the first threshold, and if the amount of interaction is smaller than the second threshold, the apparatus executes an eighth process for leading the child to continue interacting with the apparatus.

Accordingly, an action of the apparatus can be controlled based on the relationship between the apparatus and an interaction partner, and the interaction between the apparatus and a target that the apparatus is interacting with can be promoted or suppressed based on an amount of interaction between the apparatus and the target.

A robot according to another aspect of the present disclosure is a robot that interacts with a human to communicate with the human. The robot includes a camera that obtains an image of a target around the robot; a microphone that obtains a sound around the robot; a sensor that detects a touching of the robot; and a power source that is charged with power by an external charger and supplies the power to the robot a processor. The processor determines, based on either the image that has been obtained by the camera or the sound that has been obtained by the microphone, whether the target that the robot is interacting with includes a child and an adult, or only the child. The processor detects, based on any one of the image that has been obtained by the camera, the sound that has been obtained by the microphone, and the touching detected by the sensor, an amount of interaction between the robot and the target. The processor detects a remaining amount of power of the power source. If the target includes the child and the adult, if the remaining amount of power is smaller than or equal to a first threshold, and if the amount of interaction is larger than or equal to a second threshold, the processor causes the robot to execute a first process for asking the adult if the adult allows the robot to move to the charger. If the target includes the child and the adult, if the remaining amount of power is smaller than or equal to the first threshold, and if the amount of interaction is smaller than the second threshold, the processor causes the robot to execute a second process for asking the child if the child allows the robot to move to the charger. If the target includes the child and the adult, if the remaining amount of power is larger than the first threshold, and if the amount of interaction is larger than or equal to the second threshold, the processor causes the robot to execute a third process for asking the adult if the adult allows the robot to continue interacting with the child. If the target includes the child and the adult, if the remaining amount of power is larger than the first threshold, and if the amount of interaction is smaller than the second threshold, the processor causes the robot to execute a fourth process for requesting to the adult that the adult and the child continue interacting with the robot. If the target includes only the child, if the remaining amount of power is smaller than or equal to the first threshold, and if the amount of interaction is larger than or equal to the second threshold, the processor causes the robot to execute a fifth process for moving to the charger. If the target includes only the child, if the remaining amount of power is smaller than or equal to the first threshold, and if the amount of interaction is smaller than the second threshold, the processor causes the robot to execute a sixth process for requesting the child to move the robot to the charger. If the target includes only the child, if the remaining amount of power is larger than the first threshold, and if the amount of interaction is larger than or equal to the second threshold, the processor causes the robot to execute a seventh process for stopping interacting with the child. If the target includes only the child, if the remaining amount of power is larger than the first threshold, and if the amount of interaction is smaller than the second threshold, the processor causes the robot to execute an eighth process for leading the child to continue interacting with the robot.

With this configuration, an image of a subject around the robot is obtained by the camera. A sound around the robot is obtained by the microphone.

A human touching the robot is detected by the sensor. The power source is charged with power by an external charger and the power is supplied to the robot by the power source. The robot is moved by the moving mechanism. Based on either the image that has been obtained or the sound that has been obtained, it is determined whether a target that the robot is interacting with includes a child and an adult or only the child. Based on any one of the image that has been obtained, the sound that has been obtained, and a detection result obtained by the sensor, an amount of interaction between the robot and the target is detected. A remaining amount of power of the power source is detected. If the target includes the child and the adult, if the remaining amount of power is smaller than or equal to a first threshold, and if the amount of interaction is larger than or equal to a second threshold, the robot executes a first process for asking the adult if the adult allows the robot to move to the charger. If the target includes the child and the adult, if the remaining amount of power is smaller than or equal to the first threshold, and if the amount of interaction is smaller than the second threshold, the robot executes a second process for asking the child if the child allows the robot to move to the charger. If the target includes the child and the adult, if the remaining amount of power is larger than the first threshold, and if the amount of interaction is larger than or equal to the second threshold, the robot executes a third process for asking the adult if the adult allows the robot to continue interacting with the child. If the target includes the child and the adult, if the remaining amount of power is larger than the first threshold, and if the amount of interaction is smaller than the second threshold, the robot executes a fourth process for requesting to the adult that the adult and the child continue interacting with the robot. If the target includes only the child, if the remaining amount of power is smaller than or equal to the first threshold, and if the amount of interaction is larger than or equal to the second threshold, the robot executes a fifth process for moving to the charger. If the target includes only the child, if the remaining amount of power is smaller than or equal to the first threshold, and if the amount of interaction is smaller than the second threshold, the robot executes a sixth process for requesting the child to move the robot to the charger. If the target includes only the child, if the remaining amount of power is larger than the first threshold, and if the amount of interaction is larger than or equal to the second threshold, the robot executes a seventh process for stopping interacting with the child. If the target includes only the child, if the remaining amount of power is larger than the first threshold, and if the amount of interaction is smaller than the second threshold, the robot executes an eighth process for leading the child to continue interacting with the robot.

Accordingly, an action of the robot can be controlled based on the relationship between the robot and an interaction partner, and the interaction between the robot and a target that the robot is interacting with can be promoted or suppressed based on an amount of interaction between the robot and the target.

In an embodiment of the present disclosure, all or some of the functions of the apparatus can be implemented as a computer program executed by a computer including a processor and a memory. In this case, the computer program may be recorded on a non-transitory computer-readable recording medium, such as a CD-ROM.

An interaction apparatus, an interaction method, a non-transitory recording medium, and a robot according to an embodiment of the present disclosure are useful as an interaction apparatus, an interaction method, a non-transitory recording medium, and a robot that are capable of promoting or suppressing interaction between an apparatus and a target and that are for interacting with a human to communicate with the human.

What is claimed is:

1. A method for an apparatus that interacts with a human to communicate with the human, the method comprising:
   obtaining an image of a target around the apparatus by a camera;
   obtaining a sound around the apparatus by a microphone;
   detecting a touching of the apparatus by a sensor;
   determining, based on either the image that has been obtained by the camera or the sound that has been obtained by the microphone, whether the target that the apparatus is interacting with includes a child and an adult, or only the child;
   detecting, based on any one of the image that has been obtained by the camera, the sound that has been obtained by the microphone, and the touching detected by the sensor, an amount of interaction between the apparatus and the target;
   detecting a remaining amount of power of a power source that is charged with power by an external charger and supplies the power to the apparatus;
   if the target includes the child and the adult, if the remaining amount of power is smaller than or equal to a first threshold, and if the amount of interaction is larger than or equal to a second threshold, causing the apparatus to execute a first process for asking the adult if the adult allows the apparatus to move to the charger;
   if the target includes the child and the adult, if the remaining amount of power is smaller than or equal to the first threshold, and if the amount of interaction is smaller than the second threshold, causing the apparatus to execute a second process for asking the child if the child allows the apparatus to move to the charger;
   if the target includes the child and the adult, if the remaining amount of power is larger than the first threshold, and if the amount of interaction is larger than or equal to the second threshold, causing the apparatus to execute a third process for asking the adult if the adult allows the apparatus to continue interacting with the child;
   if the target includes the child and the adult, if the remaining amount of power is larger than the first threshold, and if the amount of interaction is smaller than the second threshold, causing the apparatus to execute a fourth process for requesting to the adult that the adult and the child continue interacting with the apparatus;
   if the target includes only the child, if the remaining amount of power is smaller than or equal to the first threshold, and if the amount of interaction is larger than or equal to the second threshold, causing the apparatus to execute a fifth process for moving to the charger;
   if the target includes only the child, if the remaining amount of power is smaller than or equal to the first threshold, and if the amount of interaction is smaller than the second threshold, causing the apparatus to execute a sixth process for requesting the child to move the apparatus to the charger;
   if the target includes only the child, if the remaining amount of power is larger than the first threshold, and if the amount of interaction is larger than or equal to the second threshold, causing the apparatus to execute a seventh process for stopping interacting with the child; and
   if the target includes only the child, if the remaining amount of power is larger than the first threshold, and if the amount of interaction is smaller than the second threshold, causing the apparatus to execute an eighth process for leading the child to continue interacting with the apparatus.

2. A non-transitory recording medium storing a computer-readable program for interacting with a human to communicate with the human, the program causing a computer to function as:
   a determiner that determines, based on either an image of a target obtained by a camera around an apparatus or a sound of the target obtained by a microphone around the apparatus, whether the target that the apparatus is interacting with includes a child and an adult, or only the child;
   an interaction amount detector that detects, based on any one of the image that has been obtained by the camera, the sound that has been obtained by the microphone, and a touching detected by a sensor, an amount of interaction between the apparatus and the target;
   a remaining power amount detector that detects a remaining amount of power of a power source that is charged with power by an external charger and supplies the power to the apparatus;
   a first executor that, if the target includes the child and the adult, if the remaining amount of power is smaller than or equal to a first threshold, and if the amount of interaction is larger than or equal to a second threshold, causes the apparatus to execute a first process for asking the adult if the adult allows the apparatus to move to the charger;
   a second executor that, if the target includes the child and the adult, if the remaining amount of power is smaller than or equal to the first threshold, and if the amount of interaction is smaller than the second threshold, causes the apparatus to execute a second process for asking the child if the child allows the apparatus to move to the charger;

a third executor that, if the target includes the child and the adult, if the remaining amount of power is larger than the first threshold, and if the amount of interaction is larger than or equal to the second threshold, causes the apparatus to execute a third process for asking the adult if the adult allows the apparatus to continue interacting with the child;

a fourth executor that, if the target includes the child and the adult, if the remaining amount of power is larger than the first threshold, and if the amount of interaction is smaller than the second threshold, causes the apparatus to execute a fourth process for requesting to the adult that the adult and the child continue interacting with the apparatus;

a fifth executor that, if the target includes only the child, if the remaining amount of power is smaller than or equal to the first threshold, and if the amount of interaction is larger than or equal to the second threshold, causes the apparatus to execute a fifth process for moving to the charger;

a sixth executor that, if the target includes only the child, if the remaining amount of power is smaller than or equal to the first threshold, and if the amount of interaction is smaller than the second threshold, causes the apparatus to execute a sixth process for requesting the child to move the apparatus to the charger;

a seventh executor that, if the target includes only the child, if the remaining amount of power is larger than the first threshold, and if the amount of interaction is larger than or equal to the second threshold, causes the apparatus to execute a seventh process for stopping interacting with the child; and an eighth executor that, if the target includes only the child, if the remaining amount of power is larger than the first threshold, and if the amount of interaction is smaller than the second threshold, causes the apparatus to execute an eighth process for leading the child to continue interacting with the apparatus.

3. An apparatus that interacts with a human to communicate with the human, comprising:

a camera that obtains an image of a target around the apparatus;

a microphone that obtains a sound around the apparatus;

a sensor that detects a touching of the apparatus;

a power source that is charged with power by an external charger and supplies the power to the apparatus; and a processor, wherein the processor determines, based on either the image that has been obtained by the camera or the sound that has been obtained by the microphone, whether the target that the apparatus is interacting with includes a child and an adult, or only the child, the processor detects, based on any one of the image that has been obtained by the camera, the sound that has been obtained by the microphone, and the touching detected by the sensor, an amount of interaction between the apparatus and the target, the processor detects a remaining amount of power of the power source, if the target includes the child and the adult, if the remaining amount of power is smaller than or equal to a first threshold, and if the amount of interaction is larger than or equal to a second threshold, the processor causes the apparatus to execute a first process for asking the adult if the adult allows the apparatus to move to the charger, if the target includes the child and the adult, if the remaining amount of power is smaller than or equal to the first threshold, and if the amount of interaction is smaller than the second threshold, the processor causes the apparatus to execute a second process for asking the child if the child allows the apparatus to move to the charger, if the target includes the child and the adult, if the remaining amount of power is larger than the first threshold, and if the amount of interaction is larger than or equal to the second threshold, the processor causes the apparatus to execute a third process for asking the adult if the adult allows the apparatus to continue interacting with the child, if the target includes the child and the adult, if the remaining amount of power is larger than the first threshold, and if the amount of interaction is smaller than the second threshold, the processor causes the apparatus to execute a fourth process for requesting to the adult that the adult and the child continue interacting with the apparatus, if the target includes only the child, if the remaining amount of power is smaller than or equal to the first threshold, and if the amount of interaction is larger than or equal to the second threshold, the processor causes the apparatus to execute a fifth process for moving to the charger, if the target includes only the child, if the remaining amount of power is smaller than or equal to the first threshold, and if the amount of interaction is smaller than the second threshold, the processor causes the apparatus to execute a sixth process for requesting the child to move the apparatus to the charger, if the target includes only the child, if the remaining amount of power is larger than the first threshold, and if the amount of interaction is larger than or equal to the second threshold, the processor causes the apparatus to execute a seventh process for stopping interacting with the child, and if the target includes only the child, if the remaining amount of power is larger than the first threshold, and if the amount of interaction is smaller than the second threshold, the processor causes the apparatus to execute an eighth process for leading the child to continue interacting with the apparatus.

4. The apparatus according to claim 3, wherein the processor causes the apparatus to execute any one of the first process, the second process, the third process, the fourth process, the fifth process, the sixth process, the seventh process, and the eighth process when the apparatus is not being charged with the power by the charger.

5. The apparatus according to claim 3, wherein the sensor includes at least one of a pressure sensitive sensor, an illuminance sensor, a gyro sensor, an acceleration sensor, a geomagnetic sensor, a fingerprint authentication sensor, and a vein authentication sensor.

6. The apparatus according to claim 3, further comprising:

a speaker, wherein the first process includes outputting, from the speaker, speech for asking the adult if the adult allows the apparatus to move to the charger.

7. The apparatus according to claim 3, further comprising:

a speaker, wherein the second process includes outputting, from the speaker, speech for asking the child if the child allows the apparatus to move to the charger.

8. The apparatus according to claim 3, further comprising:
a speaker, wherein
the third process includes outputting, from the speaker, speech for asking the adult if the adult allows the apparatus to continue interacting with the child.

9. The apparatus according to claim 3, further comprising:
a speaker, wherein
the fourth process includes outputting, from the speaker, speech for requesting to the adult that the adult and the child continue interacting with the apparatus.

10. The apparatus according to claim 3, further comprising:
a speaker, wherein
the fifth process includes outputting, from the speaker, speech for indicating that the apparatus will move to the charger.

11. The apparatus according to claim 3, further comprising:
a speaker, wherein
the sixth process includes outputting, from the speaker, speech for requesting the child to move the apparatus to the charger.

12. The apparatus according to claim 3, further comprising:
a speaker, wherein
the seventh process includes outputting, from the speaker, a sound effect representing a snoring noise.

13. The apparatus according to claim 3, further comprising:
a speaker, wherein
the seventh process includes outputting, from the speaker, speech for notifying the child that the apparatus will discontinue interaction.

14. The apparatus according to claim 3, wherein
the processor includes a controller, and
the seventh process includes causing, by the controller, the apparatus to move away from the child.

15. The apparatus according to claim 3, further comprising:
a memory; and
a speaker, wherein
the memory stores a program for causing the apparatus to implement content with which the apparatus interacts with the child, and
the eighth process includes outputting, from the speaker, speech corresponding to the content by executing the program corresponding to the content.

16. The apparatus according to claim 3, further comprising:
a memory; and
a speaker, wherein
the memory stores a program for causing the apparatus to talk with the child on a predetermined topic, and
the eighth process includes outputting, from the speaker, speech associated with the predetermined topic.

17. The apparatus according to claim 3, further comprising:
a speaker, wherein
the eighth process includes outputting, from the speaker, speech for leading the child to continue interacting with the apparatus.

18. The apparatus according to claim 3, wherein
after causing the apparatus to execute the first process, the processor determines, based on the sound that has been obtained by the microphone or the image that has been obtained by the camera, whether or not the adult has a positive reaction,
if the processor determines that the adult has the positive reaction, the processor causes the apparatus to execute the fifth process, and
if the processor determines that the adult has a negative reaction, the processor causes the apparatus to execute a ninth process for requesting the adult to move the apparatus to the charger.

19. The apparatus according to claim 3, wherein
after causing the apparatus to execute the second process, the processor determines, based on the sound that has been obtained by the microphone or the image that has been obtained by the camera, whether or not the child has a positive reaction,
if the processor determines that the child has the positive reaction, the processor causes the apparatus to execute the fifth process, and
if the processor determines that the child has a negative reaction, the processor causes the apparatus to execute the sixth process.

20. The apparatus according to claim 3, wherein
after causing the apparatus to execute the third process, the processor determines, based on the sound that has been obtained by the microphone or the image that has been obtained by the camera, whether or not the adult has a positive reaction,
if the processor determines that the adult has the positive reaction, the processor causes the apparatus to execute the eighth process, and
if the processor determines that the adult has a negative reaction, the processor causes the apparatus to execute the seventh process.

21. The apparatus according to claim 3, wherein
after causing the apparatus to execute the fourth process, the processor determines, based on the sound that has been obtained by the microphone or the image that has been obtained by the camera, whether or not the adult has a positive reaction,
if the processor determines that the adult has the positive reaction, the processor causes the apparatus to execute a tenth process for leading the child and the adult to continue interacting with the apparatus, and
if the processor determines that the adult has a negative reaction, the processor causes the apparatus to execute the eighth process.

22. A robot that interacts with a human to communicate with the human, comprising:
a camera that obtains an image of a target around the robot;
a microphone that obtains a sound around the robot;
a sensor that detects a touching of the robot;
a power source that is charged with power by an external charger and supplies the power to the robot; and
a processor, wherein
the processor determines, based on either the image that has been obtained by the camera or the sound that has been obtained by the microphone, whether the target that the robot is interacting with includes a child and an adult, or only the child,
the processor detects, based on any one of the image that has been obtained by the camera, the sound that has been obtained by the microphone, and the touching detected by the sensor, an amount of interaction between the robot and the target, the processor detects a remaining amount of power of the power source, if the target includes the child and the adult, if the remaining amount of power is smaller than or equal to a first threshold, and if the amount of interaction is larger than or equal to a second threshold, the processor causes the robot to execute a first process for asking the adult if the adult allows the robot to move to the charger, if the target includes the child and the adult, if the remaining amount of power is smaller than or equal to the first threshold, and if the amount of interaction is smaller than the second threshold, the processor causes the robot to execute a second process for asking the child if the child allows the robot to move to the charger, if the target includes the child and the adult, if the remaining amount of power is larger than the first threshold, and if the amount of interaction is larger than or equal to the second threshold, the processor causes the robot to execute a third process for asking the adult if the adult allows the robot to continue interacting with the child, if the target includes the child and the adult, if the remaining amount of power is larger than the first threshold, and if the amount of interaction is smaller than the second threshold, the processor causes the robot to execute a fourth process for requesting to the adult that the adult and the child continue interacting with the robot, if the target includes only the child, if the remaining amount of power is smaller than or equal to the first threshold, and if the amount of interaction is larger than or equal to the second threshold, the processor causes the robot to execute a fifth process for moving to the charger, if the target includes only the child, if the remaining amount of power is smaller than or equal to the first threshold, and if the amount of interaction is smaller than the second threshold, the processor causes the robot to execute a sixth process for requesting the child to move the robot to the charger, if the target includes only the child, if the remaining amount of power is larger than the first threshold, and if the amount of interaction is larger than or equal to the second threshold, the processor causes the robot to execute a seventh process for stopping interacting with the child, and if the target includes only the child, if the remaining amount of power is larger than the first threshold, and if the amount of interaction is smaller than the second threshold, the processor causes the robot to execute an eighth process for leading the child to continue interacting with the robot.

* * * * *